(12) United States Patent
Kim et al.

(10) Patent No.: US 10,158,539 B2
(45) Date of Patent: Dec. 18, 2018

(54) MESH NETWORK TRANSMISSION DECISIONS BASED ON NODE PERFORMANCE METRICS

(71) Applicant: Belkin International Inc., Playa Vista, CA (US)

(72) Inventors: Ryan Yong Kim, Rolling Hills Estates, CA (US); Venkata Subba Rao Pathuri, Alpharetta, GA (US); Gursharan Sidhu, Moorpark, CA (US); Aaron Schneider, Los Angeles, CA (US); Brian Knopf, Woodland Hills, CA (US)

(73) Assignee: Belkin International, Inc., Playa Vista, CA (US)

(*) Notice: Subject to any disclaimer, the term of this patent is extended or adjusted under 35 U.S.C. 154(b) by 0 days.

(21) Appl. No.: 14/512,853

(22) Filed: Oct. 13, 2014

(65) Prior Publication Data
US 2016/0105359 A1    Apr. 14, 2016

Related U.S. Application Data

(63) Continuation of application No. 14/512,658, filed on Oct. 13, 2014.

(51) Int. Cl.
*H04L 12/26* (2006.01)

(52) U.S. Cl.
CPC .............. *H04L 43/04* (2013.01); *H04L 43/08* (2013.01); *H04L 43/065* (2013.01); *H04L 43/0817* (2013.01); *H04L 43/0847* (2013.01); *H04L 43/0852* (2013.01)

(58) Field of Classification Search
None
See application file for complete search history.

(56) References Cited

U.S. PATENT DOCUMENTS

| | | | | |
|---|---|---|---|---|
| 8,917,607 B2* | 12/2014 | Kakadia | ............... | H04L 12/462 370/237 |
| 2002/0186665 A1* | 12/2002 | Chaffee | .................. | H04L 41/12 370/254 |
| 2007/0053295 A1* | 3/2007 | Cleveland et al. | .......... | 370/235 |
| 2008/0240055 A1* | 10/2008 | Dean et al. | .................. | 370/338 |

(Continued)

*Primary Examiner* — Peter Chen
(74) *Attorney, Agent, or Firm* — Kilpatrick Townsend & Stockton, LLP

(57) ABSTRACT

Systems and methods for transmission of data through mesh networks are disclosed. Specifically, various techniques and systems are provided for using performance metrics of nodes in a mesh network to make data transmission decisions. Exemplary embodiments of the present invention include a computer-implemented method. The method comprises receiving, at a network device on a network, performance metrics associated with an additional network device on the network; generating performance metrics associated with the network device; storing the performance metrics associated with the network device and the performance metrics associated with the additional network device; and transmitting the performance metrics associated with the network device and the performance metrics associated with an additional network device, wherein when the performance metrics are received, the performance metrics are used to determine whether data will be transmitted to the network device.

27 Claims, 28 Drawing Sheets

(56) References Cited

U.S. PATENT DOCUMENTS

| | | | |
|---|---|---|---|
| 2009/0010189 A1* | 1/2009 | Nagra | H04W 40/10 370/311 |
| 2009/0147722 A1* | 6/2009 | Ramachandran | H04L 45/122 370/315 |
| 2010/0091669 A1* | 4/2010 | Liu et al. | 370/252 |

* cited by examiner

E Metrics

| Metric | Value |
|---|---|
| Latency < 1 GB | 0.01 seconds |
| Latency 1GB-3GB | 0.03 seconds |
| Latency > 3GB | 0.06 seconds |
| Reliability | 96% |
| # Hops to Gateway | 2 via D |
| # Hops to Gateway | 4 via C |
| # Clients | 5 |
| Client 1 bandwidth | 5% |
| Client 2 bandwidth | 11% |
| Client 3 bandwidth | 25% |
| Client 4 bandwidth | 8% |
| Client 5 bandwidth | 3% |

C Metrics

| Metric | Value |
|---|---|
| Latency < 1 GB | 0.04 seconds |
| Latency 1GB-3GB | 0.08 seconds |
| Latency > 3GB | 0.13 seconds |
| Reliability | 74% |
| # Hops to Gateway | 2 via D |
| # Hops to Gateway | 3 via B |
| # Hops to Gateway | 3 via E |
| # Clients | 9 |
| Client 1 bandwidth | 2% |
| Client 2 bandwidth | 13% |
| Client 3 bandwidth | 6% |
| Client 4 bandwidth | 10% |
| Client 5 bandwidth | 1% |
| Client 6 bandwidth | 2% |
| Client 7 bandwidth | 1% |
| Client 8 bandwidth | 22% |
| Client 9 bandwidth | 5% |

| 10:30:25 AM | | |
|---|---|---|
| Node | Reliability | Latency |
| 402A | 96% | 0.01 seconds |
| 402B | 80% | 0.03 seconds |
| 402C | 88% | 0.02 seconds |
| 402D | 92% | 0.03 seconds |
| 502E | 98% | 0.05 seconds |

1300A

| 10:31:13 AM | | |
|---|---|---|
| Node | Reliability | Latency |
| 402A | 85% | 0.07 seconds |
| 402B | 81% | 0.03 seconds |
| 402C | 86% | 0.01 seconds |
| 402D | 95% | 0.02 seconds |
| 502E | 99% | 0.02 seconds |

1300B

| 10:31:32 AM | | |
|---|---|---|
| Node | Reliability | Latency |
| 402A | 71% | 0.14 seconds |
| 402B | 83% | 0.02 seconds |
| 402C | 87% | 0.01 seconds |
| 402D | 96% | 0.02 seconds |
| 502E | 98% | 0.01 seconds |

| Mesh Metrics Profile | | | | |
|---|---|---|---|---|
| Node | Reliability Profile | Latency Profile | # Hops Profile | # Clients Profile |
| 402A | 92% | 0.03 | 1 | 4 |
| 402B | 50% | 0.08 | 2 | 7 |
| 402C | 89% | 0.02 | 3 | 5 |
| 502E | 85% | 0.05 | 2 | 10 |
| Profile rec. | 402A | 402C | 402A | 402A |
| 402D rec. | 402A | | | |

1700B

| Mesh/WiFi Decision Profile | | |
|---|---|---|
| Node | Mobile Phone | Computer |
| Streaming Video | Mesh > WiFi | Mesh > WiFi |
| Streaming Music | Mesh > WiFi | Mesh > WiFi |
| Browse Internet | Mesh > WiFi | Mesh > WiFi |
| Backup to Cloud | Mesh > WiFi | Mesh > WiFi |
| Send Credentials | Mesh < WiFi | Mesh < WiFi |
| Send email | Mesh > WiFi | Mesh > WiFi |
| Status Update | Mesh > WiFi | Mesh > WiFi |
| Download antivirus software | Mesh < WiFi | Mesh < WiFi |
| Download video/audio file | Mesh > WiFi | Mesh > WiFi |
| Backup Dropbox | Mesh > WiFi | Mesh > WiFi |
| GPS location | Mesh > WiFi | Mesh > WiFi |

FIG. 17

MESH NETWORK TRANSMISSION DECISIONS BASED ON NODE PERFORMANCE METRICS

CROSS-REFERENCE TO RELATED APPLICATIONS

This application is a continuation of U.S. application Ser. No. 14/512,658, filed Oct. 13, 2014, which is hereby incorporated by reference in its entirety.

FIELD

The present disclosure relates to transmission of data through mesh networks. Specifically, various techniques and systems are provided for using performance metrics of nodes in a mesh network to make data transmission decisions.

BRIEF SUMMARY

Exemplary embodiments of the present invention include a computer-implemented method. The method comprises receiving, at a network device on a network, performance metrics associated with an additional network device on the network; generating performance metrics associated with the network device; storing the performance metrics associated with the network device and the performance metrics associated with the additional network device; and transmitting the performance metrics associated with the network device and the performance metrics associated with an additional network device, wherein when the performance metrics are received, the performance metrics are used to determine whether data will be transmitted to the network device.

Alternative exemplary embodiments of the present invention include a computing device. The computing device comprises one or more processors; and a memory having instructions stored thereon, which when executed by the one or more processors, cause the computing device to perform operations. The operations include receiving, at a network device on a network, performance metrics associated with an additional network device on the network; generating performance metrics associated with the network device; storing the performance metrics associated with the network device and the performance metrics associated with the additional network device; and transmitting the performance metrics associated with the network device and the performance metrics associated with an additional network device, wherein when the performance metrics are received, the performance metrics are used to determine whether data will be transmitted to the network device.

Alternative exemplary embodiments of the present invention include a non-transitory computer-readable storage medium having instructions stored thereon. When executed by a computing device, the instructions cause the computing device to receive, at a network device on a network, performance metrics associated with an additional network device on the network; generate performance metrics associated with the network device; store the performance metrics associated with the network device and the performance metrics associated with the additional network device; and transmit the performance metrics associated with the network device and the performance metrics associated with an additional network device, wherein when the performance metrics are received, the performance metrics are used to determine whether data will be transmitted to the network device.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

Illustrative embodiments of the present invention are described in detail below with reference to the following drawing figures:

FIG. 9 illustrates tables that include a compilation of exemplary performance metrics for two nodes in a mesh network, according to embodiments of the present invention.

FIG. 13 illustrates tables that include a compilation of exemplary performance metrics for the nodes in a mesh network, according to embodiments of the present invention.

FIG. 17 illustrates tables that include two decision profiles, according to embodiments of the present invention.

DETAILED DESCRIPTION

Figure 1:
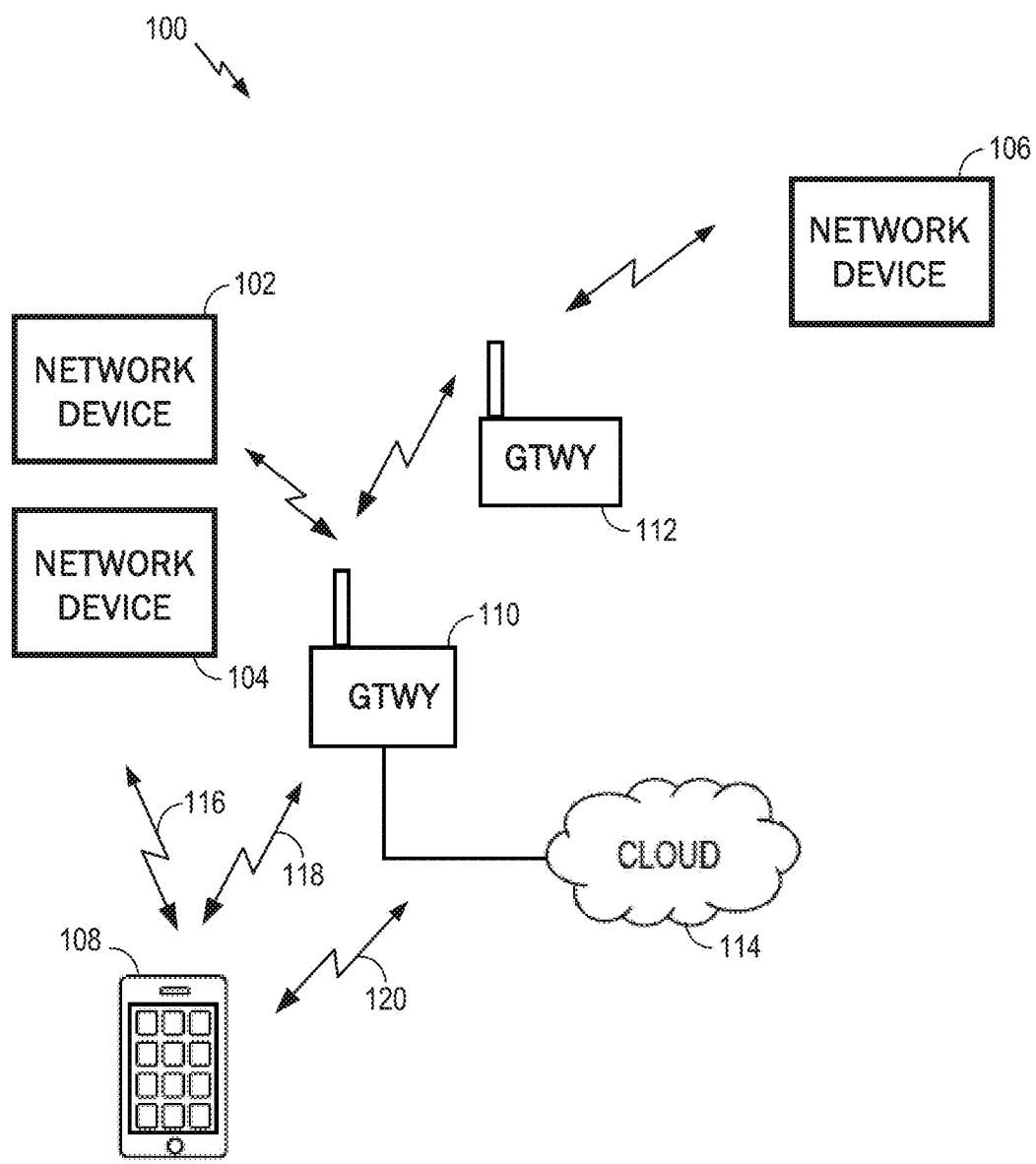
FIG. 1 is an illustration of an example of a wireless network environment in accordance with some embodiments.

In the following description, for the purposes of explanation, specific details are set forth in order to provide a thorough understanding of embodiments of the invention. However, it will be apparent that various embodiments may be practiced without these specific details. The figures and description are not intended to be restrictive.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "machine-readable storage medium" or "computer-readable storage medium" includes, but is not limited to, portable or non-portable storage devices, optical storage devices, and various other mediums capable of storing, containing, or carrying instruction(s) and/or data. A machine-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-program product may include code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a machine-readable medium. A processor(s) may perform the necessary tasks.

Systems depicted in some of the figures may be provided in various configurations. In some embodiments, the systems may be configured as a distributed system where one or more components of the system are distributed across one or more networks in a cloud computing system.

A network may be set up to provide an access device user with access to various devices connected to the network. For example, a network may include one or more network devices that provide a user with the ability to remotely configure or control one or more electronic devices (e.g., appliances) within an environment that can support the network. An environment can include, for example, a home, an office, a business, an automobile, a park, or the like. A network may include one or more gateways that allow client devices (e.g., network devices, access devices, or the like) to access the network by providing wired connections and/or wireless connections using radio frequency channels in one or more frequency bands. The one or more gateways may also provide the client devices with access to one or more external networks, such as a cloud network, the Internet, and/or other wide area networks.

A local area network, such as a user's home local area network, can include multiple network devices that provide various functionalities. Network devices may be accessed and controlled using an access device and/or one or more network gateways. One or more gateways in the local area network may be designated as a primary gateway that provides the local area network with access to an external network. The local area network can also extend outside of the user's home and may include network devices located outside of the user's home. For instance, the local area network can include network devices such as exterior motion sensors, exterior lighting (e.g., porch lights, walkway lights, security lights, or the like), garage door openers, sprinkler systems, or other network devices that are exterior to the user's home. It is desirable for a user to be able to access the network devices while located within the local area network and also while located remotely from the local area network. For example, a user may access the network devices using an access device within the local area network or remotely from the local area network.

In some embodiments, a user may create an account with login information that is used to authenticate the user and allow access to the network devices. For example, once an account is created, a user may enter the login information in order to access a network device in a logical network.

In some embodiments, an accountless authentication process may be performed so that the user can access one or more network devices within a logical network without having to enter network device login credentials each time access is requested. While located locally within the local area network, an access device may be authenticated based on the access device's authentication with the logical network. For example, if the access device has authorized access to the logical network (e.g., a WiFi network provided by a gateway), the network devices paired with that logical network may allow the access device to connect to them without requiring a login. Accordingly, only users of access devices that have authorization to access the logical network are authorized to access network devices within the logical network, and these users are authorized without having to provide login credentials for the network devices.

An accountless authentication process may also be performed when the user is remote so that the user can access network devices within the logical network, using an access device, without having to enter network device login credentials. While remote, the access device may access the network devices in the local area network using an external network, such as a cloud network, the Internet, or the like. One or more gateways may provide the network devices and/or access device connected to the local area network with access to the external network. To allow accountless authentication, a cloud network server may provide a network ID and/or one or more keys to a network device and/or to the access device (e.g., running an application, program, or the like). In some cases, a unique key may be generated for the network device and a separate unique key may be generated for the access device. The keys may be specifically encrypted with unique information identifiable only to the network device and the access device. The network device and the access device may be authenticated using the network ID and/or each device's corresponding key each time the network device or access device attempts to access the cloud network server.

In some embodiments, a home local area network may include a single gateway, such as a router. A network device within the local area network may pair with or connect to the gateway and may obtain credentials from the gateway. For example, when the network device is powered on, a list of gateways that are detected by the network device may be displayed on an access device (e.g., via an application, program, or the like installed on and executed by the access device). In this example, only the single gateway is included in the home local area network (e.g., any other displayed gateways may be part of other local area networks). In some embodiments, only the single gateway may be displayed (e.g., when only the single gateway is detected by the network device). A user may select the single gateway as the gateway with which the network device is to pair and may enter login information for accessing the gateway. The login information may be the same information that was originally set up for accessing the gateway. The access device may send the login information to the network device and the network device may use the login information to pair with the gateway. The network device may then obtain the credentials from the gateway. The credentials may include a service set identification (SSID) of the home local area network, a media access control (MAC) address of the gateway, and/or the like. The network device may transmit the credentials to a server, such as a cloud network server. In some embodiments, the network device may also send to the server information relating to the network device (e.g., MAC address, serial number, or the like) and/or information relating to the access device (e.g., MAC address, serial number, application unique identifier, or the like).

The cloud network server may register the gateway as a logical network and may assign the first logical network a network identifier (ID). The cloud network server may further generate a set of security keys, which may include one or more security keys. For example, the server may generate a unique key for the network device and a separate unique key for the access device. The server may associate the network device and the access device with the logical network by storing the network ID and the set of security keys in a record or profile. The cloud network server may then transmit the network ID and the set of security keys to the network device. The network device may store the network ID and its unique security key. The network device may also send the network ID and the access device's unique security key to the access device. The network device and the access device may then communicate with the cloud server using the network ID and the unique key generated for each device. Accordingly, the user may remotely access the network device via the cloud network without logging in each time access is requested. Also, the network device can communicate with the server regarding the logical network.

In some embodiments, a local area network may include multiple gateways (e.g., a router and a range extender) and multiple network devices. For example, a local area network may include a first gateway paired with a first network device, and a second gateway paired with a second network device. In the event credentials for each gateway are used to create a logical network, a server (e.g., a cloud network server) may register the first gateway as a first logical network and may register the second gateway as a second logical network. The server may generate a first network ID and a first set of security keys for the first logical network. The first set of security keys may include a unique security key for the first network device and a unique security key for the access device for use in accessing the first network device on the first logical network. The server may register the second gateway as the second logical network due to differences in the credentials between the first gateway and second gateway. The server may assign the second gateway a second network ID and may generate a second set of security keys. For example, the server may generate a unique security key for the second network device and may generate a unique security key for the access device for use in accessing the second network device on the second logical network. The server may associate the first network device and the access device with the first logical network by storing the first network ID and the first set of security keys in a first record or profile. The server may also associate the second network device and the access device with the second logical network by storing the second network ID and the second set of security keys in a record or profile. The server may then transmit the first network ID and the first set of security keys to the first network device, and may transmit the second network ID and the second set of security keys to the second network device. The two network devices may store the respective network ID and set of security keys of the gateway with which each network device is connected. Each network device may send the respective network ID and the access device's unique security key to the access device. The network devices and the access device may then communicate with the cloud server using the respective network ID and the unique key generated for each device.

Accordingly, when multiple gateways are included in the home local area network, multiple logical networks associated with different network identifiers may be generated for the local area network. When the access device is located within range of both gateways in the local area network, there is no problem accessing both network devices due to the ability of the access device to perform local discovery techniques (e.g., universal plug and play (UPnP)). However, when the user is located remotely from the local area network, the access device may only be associated with one logical network at a time, which prevents the access device from accessing network devices of other logical networks within the local area network.

FIG. 1 illustrates an example of a local area network 100. The local area network 100 includes network device 102, network device 104, and network device 106. In some embodiments, the network devices 102, 104, 106 may include home automation network devices that allow a user to access, control, and/or configure various home appliances located within the user's home (e.g., a television, radio, light, fan, humidifier, sensor, microwave, iron, and/or the like), or outside of the user's home (e.g., exterior motion sensors, exterior lighting, garage door openers, sprinkler systems, or the like). For example, network device 102 may include a home automation switch that may be coupled with a home appliance. In some embodiments, network devices such as a home automation network device may be used in other environments, such as a business, a school, an establishment, a park, or any place that can support the local area network 100 to enable communication with network devices. For example, a network device can allow a user to access, control, and/or configure devices, such as office-related devices (e.g., copy machine, printer, fax machine, or the like), audio and/or video related devices (e.g., a receiver, a speaker, a projector, a DVD player, a television, or the like), media-playback devices (e.g., a compact disc player, a CD player, or the like), computing devices (e.g., a home computer, a laptop computer, a tablet, a personal digital assistant (PDA), a computing device, a wearable device, or the like), lighting devices (e.g., a lamp, recessed lighting, or the like), devices associated with a security system, devices associated with an alarm system, devices that can be operated in an automobile (e.g., radio devices, navigation devices), and/or the like.

A user may communicate with the network devices 102, 104, 106 using an access device 108. The access device 108 may include any human-to-machine interface with network connection capability that allows access to a network. For example, the access device 108 may include a stand-alone interface (e.g., a cellular telephone, a smartphone, a home computer, a laptop computer, a tablet, a personal digital assistant (PDA), a computing device, a wearable device such as a smart watch, a wall panel, a keypad, or the like), an interface that is built into an appliance or other device e.g., a television, a refrigerator, a security system, a game console, a browser, or the like), a speech or gesture interface (e.g., a Kinect™ sensor, a Wiimote™, or the like), an internet of things (IoT) device interface (e.g., an Internet enabled appliance such as a wall switch, a control interface, or the like). While only a single access device 108 is shown in FIG. 1, one of ordinary skill in the art will appreciate that multiple access devices may communicate with the network devices 102, 104, 106. The user may interact with the network devices 102, 104, or 106 using an application, a web browser, a proprietary program, or any other program executed and operated by the access device 108. In some embodiments, the access device 108 may communicate directly with the network devices 102, 104, 106 (e.g., communication signal 116). For example, the access device 108 may communicate directly with network device 102, 104, 106 using Zigbee™ signals, Bluetooth™ signals, WiFi™ signals, infrared (IR) signals, or the like. In some embodiments, the access device 108 may communicate with the network devices 102, 104, 106 via the gateways 110, 112 (e.g., communication signal 118) and/or the cloud network 114 (e.g., communication signal 120).

The local area network 100 may include a wireless network, a wired network, or a combination of a wired and wireless network. A wireless network may include any wireless interface or combination of wireless interfaces (e.g., Zigbee™, Bluetooth™, WiFi™, IR, cellular, long-term evolution (LTE), WiMax™, or the like). A wired network may include any wired interface (e.g., fiber, ethernet, powerline ethernet, ethernet over coaxial cable, digital signal line (DSL), or the like). The wired and/or wireless networks may be implemented using various routers, access points, bridges, gateways, or the like, to connect devices in the local area network 100. For example, the local area network may include gateway 110 and gateway 112. Gateway 110 or 112 can provide communication capabilities to network devices 102, 104, 106 and/or access device 108 via radio signals in order to provide communication, location, and/or other services to the devices. While two gateways 110 and 112 are shown in FIG. 1, one of ordinary skill in the art will appreciate that any number of gateways may be present within the local area network 100.

The network access provided by gateway 110 and gateway 112 may be of any type of network familiar to those skilled in the art that can support data communications using any of a variety of commercially-available protocols. For example, gateways 110, 112 may provide wireless communication capabilities for the local area network 100 using particular communications protocols, such as WiFi™ (e.g., IEEE 802.11 family standards, or other wireless communication technologies, or any combination thereof). Using the communications protocol(s), the gateways 110, 112 may provide radio frequencies on which wireless enabled devices in the local area network 100 can communicate. A gateway may also be referred to as a base station, an access point, Node B, Evolved Node B (eNodeB), access point base station, a Femtocell, home base station, home Node B, home eNodeB, or the like. The gateways 110, 112 may include a router, a modem, a range extender, and/or any other device that provides network access among one or more computing devices and/or external networks. For example, gateway 110 may include a router and gateway 112 may include a range extender.

The gateways 110 and 112 may also provide the access device 108 and the network devices 102, 104, 106 with access to one or more external networks, such as the cloud network 114, the Internet, and/or other wide area networks. The cloud network 114 may include a cloud infrastructure system that provides cloud services. In certain embodiments, services provided by the cloud network 114 may include a host of services that are made available to users of the cloud infrastructure system on demand, such as registration and access control of network devices 102, 104, 106. Services provided by the cloud infrastructure system can dynamically scale to meet the needs of its users. The cloud network 114 may comprise one or more computers, servers, and/or systems. In some embodiments, the computers, servers, and/or systems that make up the cloud network 114 are different from the user's own on-premises computers, servers, and/or systems. For example, the cloud network 114 may host an application, and a user may, via a communication network such as the Internet, on demand, order and use the application.

In some embodiments, the cloud network 114 may host a Network Address Translation (NAT) Traversal application in order to establish a secure connection between the cloud network 114 and one or more of the network devices 102, 104, 106. For example, a separate secure Transmission Control Protocol (TCP) connection may be established by each network device 102, 104, 106 for communicating between each network device 102, 104, 106 and the cloud network 114. In some embodiments, each secure connection may be kept open for an indefinite period of time so that the cloud network 114 can initiate communications with each respective network device 102, 104, or 106 at any time. In some cases, other types of communications between the cloud network 114 and the network devices 102, 104, 106 and/or the access device 108 may be supported using other types of communication protocols, such as a Hypertext Transfer Protocol (HTTP) protocol, a Hypertext Transfer Protocol Secure (HTTPS) protocol, or the like. In some embodiments, communications initiated by the cloud network 114 may be conducted over the TCP connection, and communications initiated by a network device may be conducted over a HTTP or HTTPS connection. In certain embodiments, the cloud network 114 may include a suite of applications, middleware, and database service offerings that are delivered to a customer in a self-service, subscription-based, elastically scalable, reliable, highly available, and secure manner.

It should be appreciated that the local area network 100 may have other components than those depicted. Further, the embodiment shown in the figure is only one example of a local area network that may incorporate an embodiment of the invention. In some other embodiments, local area network 100 may have more or fewer components than shown in the figure, may combine two or more components, or may have a different configuration or arrangement of components.

Figure 2:
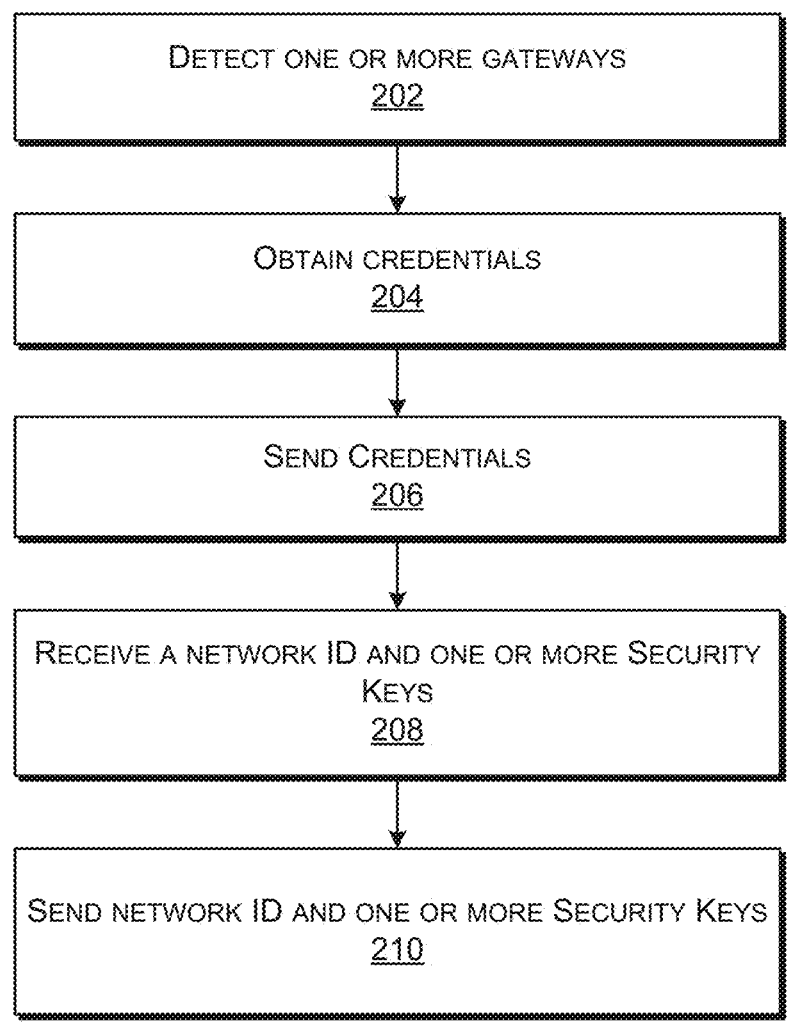
FIG. 2 is a flowchart illustrating an embodiment of a process for registering one or more network devices in accordance with some embodiments.

Upon being powered on or reset, the network devices 102, 104, 106 may be registered with the cloud network 114 and associated with a logical network within the local area network 100. FIG. 2 illustrates an example of a process 200 for registering one or more network devices, such as the network devices 102, 104, 106 illustrated in FIG. 1. When multiple network devices 102, 104, 106 and gateways 110, 112 are included within a local area network, the network devices and/or gateways may be installed at different times, resulting in the techniques described with respect to FIG. 2 possibly occurring for each network device and/or gateway at different points in time. For example, a user may install network device 102 at a first point in time on a first floor of the user's house. Gateway 110 may also be located on the first floor, resulting in the network device 102 pairing with gateway 110. The user may later install gateway 112 and network device 106 on a second floor of the user's home, resulting in the network device 106 pairing with gateway 112.

At 202, a network device may detect one or more gateways upon being powered on or reset. In some embodiments, a provisioning process may occur when the network device is powered on or reset and detected by an access device (e.g., access device 108). During the provisioning process, the access device may directly communicate with the network device. In some embodiments, direct communication between network devices (e.g., network devices 102, 104, 106) and access device (e.g., access device 108) may occur using various communications protocols, such as Universal Plug and Play (UPnP), Bluetooth®, Zigbee®, Ultra-Wideband (UWB), WiFi-Direct, WiFi, Bluetooth® Low Energy (BLE), sound frequencies, and/or the like.

The provisioning process may include pairing the network device with a gateway and registering the gateway, network device, and access device with a server, such as a server located within the cloud network 114. For example, upon being powered on or reset to factory settings, the network device may send or broadcast identification information to one or more access devices. The identification information may be sent during a discovery process. For example, the identification information may be sent in response to a discovery request from an access device. In some cases, the identification information may include a name of the network device.

An application, program, or the like that is installed on and executed by the access device may receive the identification information from the network device. When the application on the access device is launched by a user, the access device may display the identification information for selection by the user. Once the network device identification information is selected, the access device may send a signal to the network device indicating that it has been selected. The network device may then send to the access device a list of gateways that are detected by the network device. The access device may receive and display the list of gateways. In some embodiments, the list of gateways includes multiple gateways (e.g., gateways 110 and 112) that are located within the local area network. The user may select the gateway that the user wishes for the network device to pair. For example, the gateway that provides the best signal strength for the network device may be selected. The access device may then prompt the user to enter login information that is required for accessing the network signals provided by the selected gateway. For example, the login information may be the same information that was originally set up to access the gateway network signals (e.g., when the gateway was initially installed). Once entered, the access device may send the login information to the network device. The network device may use the login information to pair with the selected gateway. As one example, network device 102 and network device 104 may be paired with gateway 110, and network device 106 may be paired with gateway 112.

Once paired with a gateway, the network device may be registered with a cloud network (e.g., cloud network 114). For example, the access device (e.g., via the application, program, or the like) may instruct the network device to register with the cloud network upon receiving confirmation from the network device that it has been successfully paired with a gateway. At 204, the network device may obtain credentials from the gateway as part of the registration process. For example, network device 102 may obtain credentials from gateway 110. At a same or later point in time, network devices 104 and 106 may obtain credentials from gateways 110 and 112, respectively. In some embodiments, the credentials may include a SSID of the local area network and a MAC address of the gateway. An SSID received from two gateways (e.g., gateways 110, 112) may be the same due to the gateways both being within the same local area network. In some cases, the SSID of the two gateways may be different. The MAC address of each of the gateways may be unique to each gateway. As a result of each gateway having a unique MAC address, the credentials obtained from a gateway may be unique to that particular gateway. One of ordinary skill in the art will appreciate that other credentials may be obtained from a gateway, such as an Internet Protocol address, or the like.

The network device may then send the gateway credentials to the cloud network at 206. For example, the network devices 102, 104, 106 may send credentials for the gateway with which each is paired to the server located within the cloud network 114. For example, network device 102 may transmit the credentials obtained from gateway 110 to the server, and network device 106 may transmit the credentials obtained from gateway 112 to the server. In some embodiments, the network device may also send information relating to the network device (e.g., MAC address, serial number, make, model number, firmware version, and/or an interface module identifier, or the like) to the server, and/or information relating to the access device (e.g., MAC address, serial number, application unique identifier, or the like) to the server. In some embodiments, the communication of the credentials, the network device information, and/or the access device information sent from the network device to the cloud network server may be in a Hypertext Transfer Protocol (HTTP) format, a Hypertext Transfer Protocol Secure (HTTPS) format, a secure Transmission Control Protocol (TCP) format, or the like. One of ordinary skill in the art will appreciate that other communication formats may be used to communicate between the network device and the cloud network server.

Once the credentials, network device information, and/or access device information are received by the server, the server may register each gateway as a logical network within the local area network and may generate a network ID for each logical network. For example, the server may register the gateway 110 as a first logical network. During the registration process, the server may generate a first network ID for identifying the first logical network. As noted above, one of ordinary skill in the art will appreciate that any number of gateways may be present within the local area network, and thus that any number of logical networks may be registered for the local area network. The server may further generate a first set of security keys for authenticating the network device and the access device. For example, the server may generate a unique key for the network device 102 and a separate unique key for the access device 108.

In some embodiments, as previously described, network device 104 may also be paired with gateway 110 at the same or a later point in time as the network device 102. During registration of the network device 104, the server may determine that the access device 108 has already been registered with another network device (e.g., network device 102) that is associated with the same logical network of gateway 110. In such embodiments, the server may retrieve the first network ID that was used in registering the first logical network. The server may also generate a new unique security key for the network device 104, and may retrieve the unique key that was previously generated for the access device 108 when registering the gateway 110 as the first logical network.

The gateway 112 may also be registered by the server as a second logical network with a second network ID. A second set of security keys may be generated for the network device 106 and the access device 108. For example, the server may generate a unique security key for the network device 106 and a unique security key for the access device 108 as it relates to the second logical network. In some embodiments, the gateway may 112 be installed at a later point in time after the gateway 110 is installed, and thus may be registered as the second logical network at the later point in time.

A record or profile may then be created for associating each network ID with the credentials of a corresponding gateway, the corresponding network device(s), and the access device. For example, the server of the cloud network 114 may associate the first network ID with the credentials of gateway 110. Similarly, the server may associate the second network ID with the credentials of gateway 112. In some embodiments, the server performs the association by generating and storing a record including the network ID, the set of security keys, the gateway credentials, the network devices associated with the network ID (e.g., MAC address or serial number of a network device), the access devices associated with the network ID (e.g., MAC address, serial number, application unique identifier, or the like), and/or any other information relevant to the network devices and/or gateways. For example, the server may store the first network ID and the first set of security keys in a first record at a first memory space (e.g., in Flash, DRAM, a database, or the like) along with the SSID and MAC address for gateway 110 and an identifier of the network devices 102 and/or 104. The server may also store the second network ID and the second set of security keys in a second record at a second memory space along with the SSID and MAC address for gateway 112 and an identifier of the network device 106. In some embodiments, an example of a network device identifier may include a MAC address of the network device, a serial number of the network device, or any other unique identifier.

Each of the first and second network IDs may include a unique number or alphanumeric string generated sequentially or randomly. For example, the first time a network device and an associated gateway are registered on the cloud network 114, the unique network ID for the logical network of the gateway may start with 7000000. Each subsequent logical network that is created may be a sequential increment of the initial network ID (e.g., 7000001, 7000002, 7000003, etc.). As another example, the network ID may be generated by a random or pseudo-random number generator. One of ordinary skill in the art will appreciate that other techniques for generating a unique ID may be used. The technique used to generate the network IDs may be dependent on a type of database that is included in the cloud network 114. For example, different databases may have different proprietary mechanisms for creating a unique identifier.

The set of keys generated for each logical network may be generated using database specific technique. For example, a MySQL technique may be used to generate the sets of keys. Each key may include a universally unique identifier (UUID) or a globally unique identifier (GUID). As described above, for each logical network, the server may generate a unique key for a network device and a separate unique key for an access device.

At 208, the network device may receive the network ID and the set of security keys. For example, once the server has generated a record or profile associating the network device 102 with the first logical network, the server may transmit the first network ID and the first set of security keys to the network device 102. The network device 102 may store the first network ID and one or more keys of the first set of keys. For example, the network device 102 may store the unique security key that was created by the server for the network device 102.

As noted previously, the network devices 102, 104, 106 and gateways 110, 112 may be installed at different times. For example, in some embodiments, network device 104 may be installed at a point in time after the first logical network is created based on the pairing between gateway 110 and network device 102. In such embodiments, upon being powered on, the network device 104 may pair with gateway 110, obtain credentials from gateway 110, and transmit the credentials to the server in the cloud network 114 using similar techniques as those described above. The server may associate the network device 104 with the previously generated first network ID. As described above, the server may also generate a new unique security key for the network device 104, and may retrieve the unique key that was previously generated for the access device 108 when registering the first logical network. The network device 104 may then receive and store the first network ID and the security keys from the server.

At 210, the network device may send the network ID and the set of security keys to the access device. For example, the network device 102 may send to the access device 108 the first network ID and the unique security key generated for the access device 108. The network device 102 and the access device 108 may then communicate with the cloud network server using the first network ID and each device's unique key. In some embodiments, the network device and the access device may generate a signature using their respective security key. The signature is sent to the cloud network server along with a communication from the network device or access device. The cloud network server may process the signature in order to authenticate each device, as described below. The network device and access device may use different techniques to generate a signature.

A network device may generate a signature using its uniquely generated security key. For example, the signature may be expressed as: Authorization=MacAddress":"Signature":"ExpirationTime. The Authorization term may be an attribute, and the MacAddress, Signature, and ExpirationTime terms may include values for the Authorization attribute. In particular, the MacAddress value may include the MAC address of the network device, which may include a unique alphanumeric or numeric string. The network device may retrieve its MAC address from memory and place it in the MacAddress field. The Signature value may be expressed as: Signature=Base64(HMAC-SHA1(PrivateKey, StringToSign)). The Signature value may include an alphanumeric or numeric string. HMAC-SHA1 is an open source technique that includes a Hash-based Message Authentication Code (HMAC) using a SHA1 hash function. The HMAC-SHA1 technique uses the values PrivateKey and StringToSign as inputs. The PrivateKey input includes the unique security key that was generated by the server for the network device. The StringToSign input may be expressed as StringToSign=MacAddress+"\n"+SerialNumber+"\n"+ExpirationTime. Accordingly, the StringToSign input is generated by appending a serial number of the network device and an expiration time to the network device's MAC address. The ExpirationTime term may indicate the period of time for which the signature is valid. In some embodiments, the ExpirationTime term may include a current time at which the signature is generated plus period of time for which the signature is valid. In one example, the ExpirationTime term may be expressed as ExpirationTime=Number of seconds since Jan. 1, 1970.

The network device may place the signature in a data packet for transmission with a communication signal to the cloud network server. The network device may also place the network ID in the data packet. The signature and the network ID, if included, may be used by the cloud network server to verify that the network device is associated with the logical network. In some embodiments, a signature is provided with each communication sent from the network device to the server. Once the signature is received by the server, the server generates a signature using the same expression as that used by the network device. For example, the server may retrieve the network device's key and other relevant information from storage and generate the signature using the key and the other information using the expression described above. The server then verifies whether the signatures match. Upon determining that the signatures match, the server authenticates the network device's communication.

An access device may also generate a signature using its uniquely generated security key. For example, the access device signature may be expressed as: Authorization=SDU UniqueId":"Signature":"ExpirationTime. The Authorization term may be an attribute, and the SDU UniqueId, Signature, and ExpirationTime terms may include values for the Authorization attribute. The SDU UniqueId term may include a unique phone identifier. The SDU UniqueId value may depend on the type of access device that is used and the type of values that may be accessed and/or generated by the type of access device. In some cases, one type of access device may not allow an application to access a unique identifier of the access device (e.g., a serial number, UUID, or the like). In such cases, the SDU UniqueId value may include a value generated by an application or program installed on and executed on the access device that is used to access the network device. The value may be unique to the application or program that generated the value. In other cases, another type of access device may allow an application to access a unique identifier of the access device. In such cases, the SDU UniqueId value may include a value that is unique to the access device itself, such as a serial number, UUID, or the like. In this example, the access device may retrieve the unique value from storage within the access device. One of ordinary skill in the art will appreciate that other unique identifiers may be used to uniquely identify the access device. The Signature value may be expressed as: Signature=Base64(HMAC-SHA1(PrivateKey, StringToSign)). Using this expression, the input to the HMAC-SHA1 technique may include a PrivateKey term and a StringToSign term. The PrivateKey input includes the unique security key that was generated by the server for the access device with regard to a particular logical network. The StringToSign input may be expressed as StringToSign=UniqueId+"\n"+"\n"+Expiration Time. The StringToSign value is different from the StringToSign value generated by network device in that no serial number is included. Accordingly, the StringToSign input is generated by appending an expiration time to the access device's unique identifier. The ExpirationTime term may indicate the period of time for which the signature is valid, similar to that above for the signature generated by the network device.

The access device may place the signature in a data packet and may transmit the data packet to the cloud network server with a communication signal. The network device may also place the network ID in the data packet. The signature and the network ID, if included, may be used by the cloud network server to verify that the access device is associated with the logical network and authorized to communicate with one or more network devices associated with the logical network. In some embodiments, a signature is provided with each communication sent from the access device to the server. The cloud server may receive the signature and may generate a signature using the same expression as that used by the access device. For example, the server may retrieve the access device's key and other relevant information from storage and generate the signature using the key and the other information using the expression described above. The server then verifies whether the signatures match. Upon determining that the signatures match, the server authenticates the access device and allows it to communicate with one or more of the network devices associated with logical network.

Once the provisioning process is completed, the access device 108 may access the network device 102 locally via the gateway 110 (e.g., communication signal 118) or remotely via the cloud network 114 (e.g., communication signal 120). In some embodiments, the communication between the access device 108 and the cloud network 114 may be a HTTP or HTTPS communication. One of ordinary skill in the art will appreciate that other communication mechanisms may be used to communicate between the access device 108 and the cloud network 114.

The network 100 may enable a user to monitor and/or control operation of the devices 102 and 104. For example, a user may monitor and/or control operation of devices by interacting with a visual interface of the gateway 110 (i.e., a web page for gateway 110) and/or a visual interface rendered on a display of an access device, such as access device 108. In some embodiments, an application may be run on the access device. The application may cause the access device to present a graphical interface that includes a visual interface for each device accessible on the network 100.

A network device may generate and/or provide a "status" of the network device. In certain embodiments, the status or state of a network device can be indicated on a visual interface on the access device, for example within the tile with text and/or graphically. The status of the network device can change based on time (e.g., a period, an interval, or other time schedule). The status of a network device may be any piece of information pertinent to that particular network device. The status of a network device may be any changeable variable of that particular network device. For example, the status of a network device may include a state of the network device itself (e.g., on or off) or how the network device is situated within the network with respect to the other network and other network devices throughout the network. For example, the status of a network device may refer to the network device's proximity to another network device and/or its ability to communicate with another network device because of the relative signal strength between the two network devices. In certain embodiments, the status can include a value or some other information indicating a unit of measure for a setting or an attribute related to operation of a device connected to the network device. The setting or the attribute can be adjustable within a range of values. For example, the device connected to the network device can be a light bulb and the status can include a value corresponding to brightness (e.g., a percentage of total brightness) emitted by the light bulb when the light bulb is powered-on. In another example, the device can be a motion sensor and the status can include a value corresponding to sensitivity of the sensor in a range of values between 0 to 100 when the sensor is powered-on. In yet another example, the device can be a fan and the status can include a value corresponding to a speed of the fan on a scale of 0 to 100 when the fan is powered-on.

As described above, upon being powered on or reset, the network devices 102 and/or 104 may be registered with the cloud network 114 and associated with a logical network within the local area network 100. Similarly, upon being powered or switched off or otherwise being disconnected from the network 100, the status of the network device 102 would be known and stored by a cache (not shown) associated with the network 100. For example, cloud network 114 may include storage (e.g. cache) that stores the status of the network devices within each local area network 100 it is connected to and/or provides access to. In another example, the gateway 110 may include storage that stores the status of the network devices within each local area network it is connected to and/or provides access to. More specifically, the status stored in the cache may include a status table which indicates the current status of each network device (as of its last communication with each network device). A status table may include all statuses of each network device, or individual storage tables for each local area network or other subset of its network devices/networks. In one embodiment, a change in status may prompt the network device to push its change in in status to the cloud network 114 for storage or updating of the cloud's stored status table. In another embodiment, cloud network 114 and/or gateway 110 may continuously (or periodically) communicate with each network device to check to see if its status has changed.

In some embodiments, a network device (e.g. network device 102 and/or 104) may, upon connecting to the local area network 100, check the status of the network devices on the network 100. In other embodiments, one network device may check the status of one or more of the other network devices on the network 100. The network device may seek to check the status of another network device or access device for various reasons, including to display such status(es) to a user on a display or otherwise, to check whether that network device belongs to the same network, to synchronize or coordinate any scheduled executions, to update an attribute based on adjustment received among others. For example, a network device or user may desire to check various statuses on a connected device, such as power level, timestamped activity history (e.g. temperature for a thermostat, motion for a motion detector, etc.), how long it has been active/turned on, attributes for operation of the connected device (e.g., a brightness of a lamp, a speed of a fan, or a sensitivity of a sensor, etc.), among many others.

In some embodiments, a device, such as the access device 108 shown in FIG. 1 or the gateway 110, connected to the network 100 can communicate an updated status of a network device, such as the network devices 102 and/or 104. The updated status can be communicated via the network 100 and can include an adjustment that affects a status of the network device. The adjustment can include an amount of change to one or more attributes, one or more settings, or a combination thereof related to operation of the network device connected to the network 100. The access device 108 or the gateway 110 can present a graphical interface that can receive input corresponding to an adjustment to a status of a device. In some embodiments, the updated status of the network device communicated to the network 100 can be received by a network device to which the updated status applies, or can be received by the gateway 110, the cloud network 110, or any other device in communication with the network. If the device cannot directly receive the updated status, it can also receive the updated status from the cloud network 114, the gateway 110, or the other devices in the network 100. In some embodiments, the network device can communicate its updated status to the network 100, which can indicate whether the status has been updated. The updated status can be received by the access device or any other device in the network 100. In some embodiments where the access device is not located within the network 100, the access device may not immediately receive the updated status. The updated status can be stored by the cloud network 114 or the gateway 110 for communication to the access device. The status of the network device can indicate whether an adjustment was made based on an adjustment in a setting or an attribute transmitted by the access device. Alternatively, or additionally, the access device can receive, from any other network device connected to the network 100, a status update indicating whether the adjustment was in fact made at a network device.

A network device seeking to check the status of any other device on the network 100 may communicate with the cloud network 114, to which all devices on the network 100 are connected either directly or indirectly. Since the cloud network 114 and/or the gateway 110 can store an updated table/list of the statuses of each of the network devices 102 and 104 within the requesting network's local area network, the cloud network 114 and/or gateway 110 may communicate such status data to the network devices 102 and 104 and the access device. For example, if network devices 102 and 104 were to each turn on and communicate their statuses to cloud network 114, cloud network 114 may analyze the status of network devices 102 and 104 and communicate to network devices 102 and 104 that they are each connected to the same local area network 100.

Figure 3:
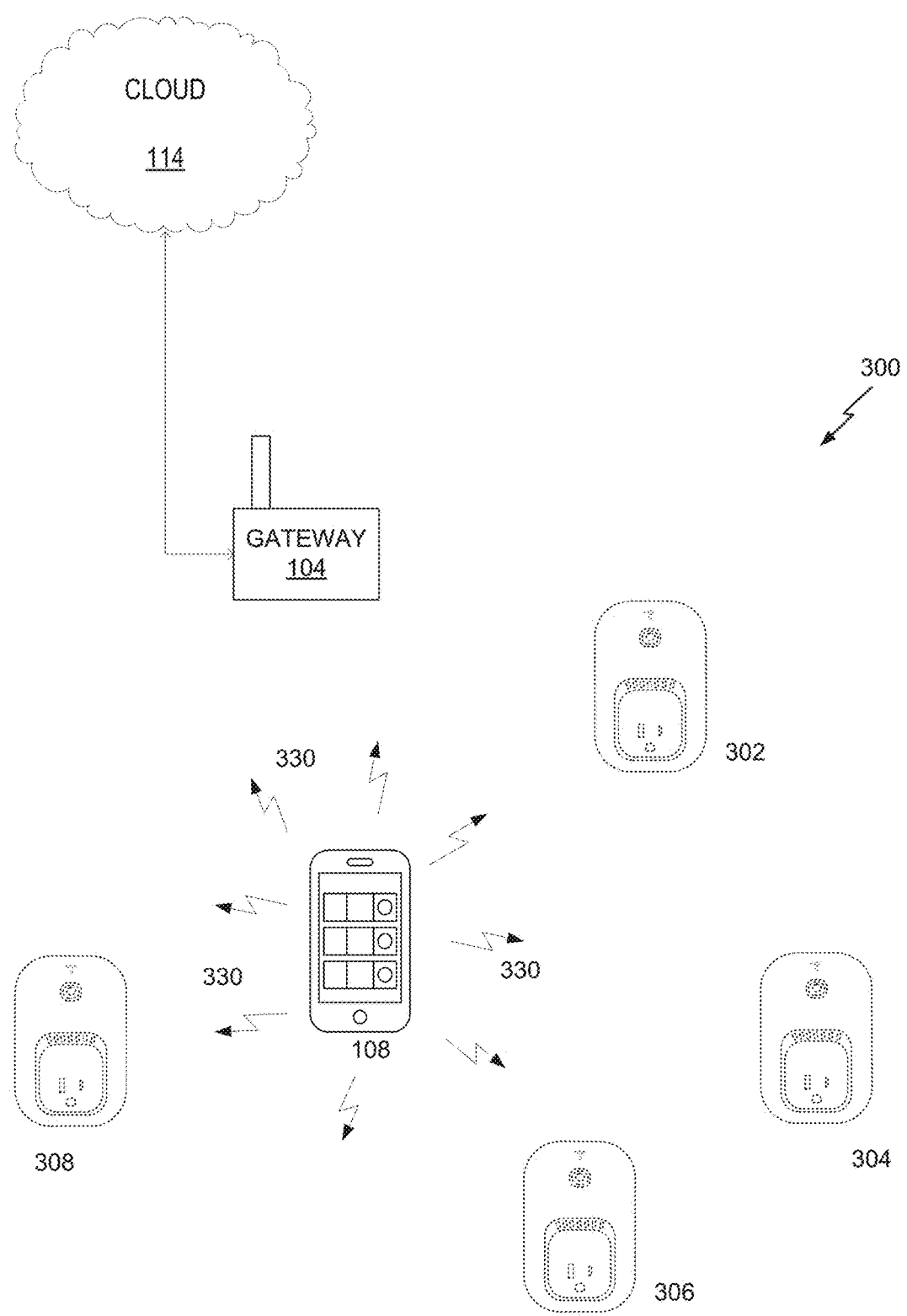
FIG. 3 illustrates an example of a network environment, according to embodiments of the present invention.

FIG. 3 illustrates an example of a network 300, according to embodiments of the present invention. Specifically, the network 300 can be a wireless local area network enabling an access device to communicate with network devices to control adjustment of attributes related to operation of the network devices. Network 300 includes network device 302, network device 304, network device 306, and network device 308. The network 300 also includes access device 108. In other words, the network 300 may be substantially similar to the network 100 except that access device 108 has been turned on near the network 300, to which it is associated, or has entered the an area to which the network 300 can reach.

When access device 108 can enter the network 300 as shown in FIG. 3, access device 108 may be authenticated based on the access device's authentication with the logical network or may otherwise commence communication with cloud network 114. Access device 108 may also communicate notification of its presence or other information directly to other network devices 302-308 within network 300, as shown in FIG. 3 by communication paths 330. As noted, such communication may include various communications protocols, such as Universal Plug and Play (UPnP), Bluetooth®, Zigbee®, Ultra-Wideband (UWB), WiFi-Direct, WiFi, Bluetooth® Low Energy (BLE), sound frequencies, and/or the like. For example, access device 108 may communicate to all other devices in network 300, including network device 302, network device 304, network device 306, and network device 308, information/data regarding its status. Such status data may include the fact that it is present and turned on, or other status data/information. At any time that network devices 302, 304, 306 and 308 recognize that access device 108 is present at network 300, the network devices may communicate back to access device 108. For example, the network devices may send an acknowledgement (e.g. ACK signal) back to access device 108 to confirm that they received the status data sent by access device 108. The network devices may also send their own status data to access device 108.

While network devices 302-308 and access device 108 may each receive communication from other network devices around the network 300, including the status of each of those network devices, network devices 302-308 and/or access device 108 may be continuously scanning network 300 (including, for example, running discovery algorithms) to determine whether any devices within the network have moved, turned on/off or otherwise added to or subtracted from the network 300, or have otherwise changed statuses.

Since network devices 302-308 and access device 108 may each receive communication from other devices around network 300, including the status of each of those devices, each network device within network 300 may know the status of each other network device in the network 300. For example, access device 108 or devices 302-308 may not be required to communicate with cloud network 114 in order to obtain one or more of such statuses. Since cloud network 114 is an external network and may be remote from network 300, communication between network devices within the network 300 and cloud 114 may take more time than communication between two devices within network 300. For example, communication between devices within network 300 may take anywhere from 1 millisecond to 100 milliseconds, while communication between a device within network 300 and the cloud network 114 may take anywhere from 50 milliseconds to 1 second or more). Furthermore, if a network device is retrieving information from cloud 114, the request must travel from the network device to cloud network 114, and then the information must travel back from cloud network 114 to the network device. This process may double the latency caused by retrieving information with cloud 114. Therefore, devices within the network 300 may choose to send and receive/retrieve statuses directly with other devices within the network 300 instead of communicating such information via cloud network 114. When a network device receives status data from another network device on the device's local area network 300, it may store that status data so that it may retrieve and use that status data at a later time.

Figure 4:
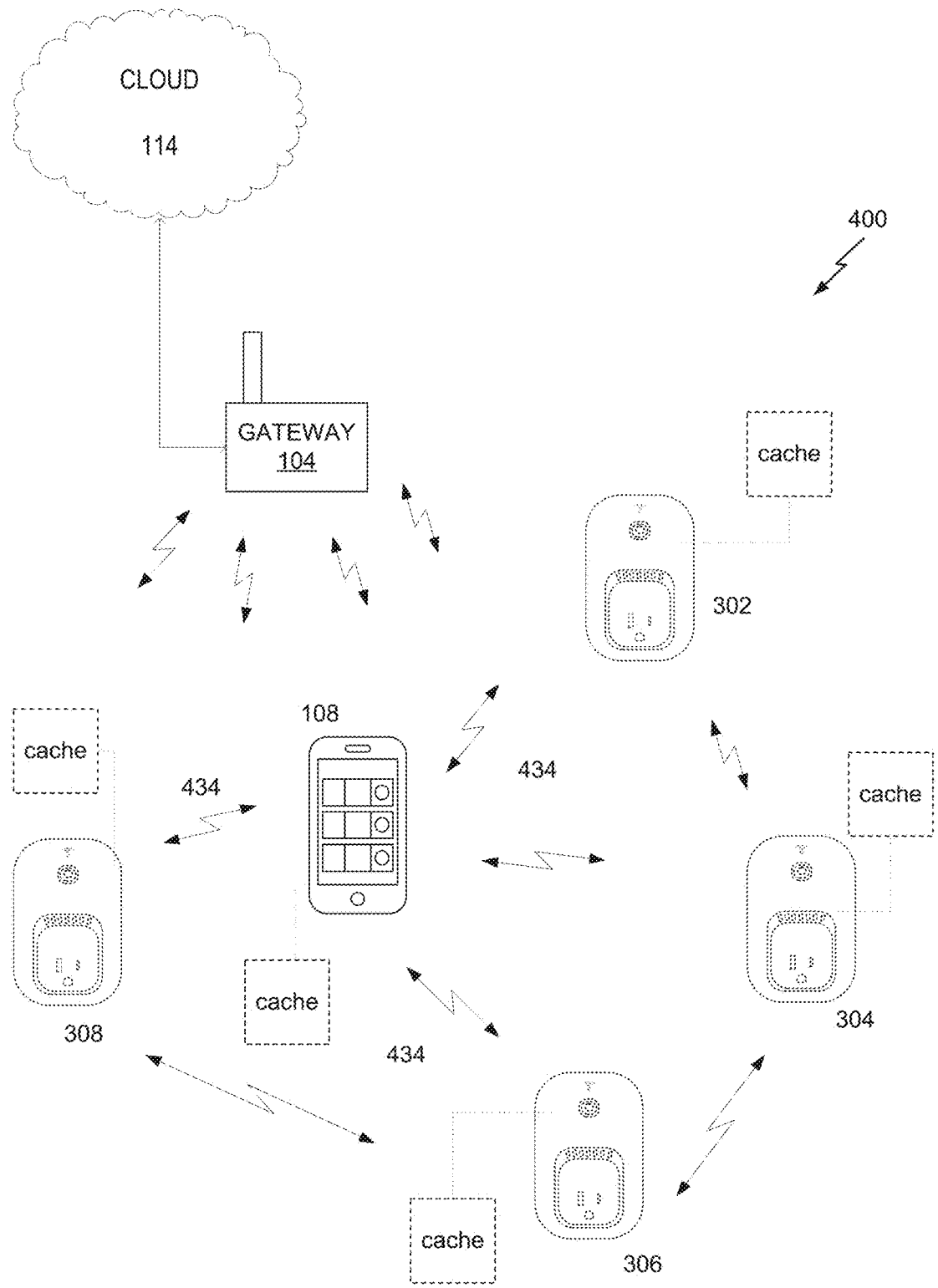
FIG. 4 illustrates an example of a network environment, according to embodiments of the present invention.

FIG. 4 illustrates an example of a network 400, according to embodiments of the present invention. The local area network 400 may include network device 302, network device 304, network device 306, network device 308, and access device 108. FIG. 4 also illustrates that one or more network devices 302-308 and/or access device 108 may include a storage device, such as a cache, for storing data, including data regarding its own status and data regarding statuses received from the other devices within local area network 400. For example, access device 108 may, after being powered up, broadcast/send its status to network device 308 via communication 434. Network device 308 may store the status data received from access device 108 until the next time access device 108 updates its status by sending new/updated status data to network device 308. Cache may be used for storage within network 400 and/or access devices within the local area network 400 so that each of the devices may be able to quickly retrieve the data it needs from storage. An application operating on the access device 108 can access the cache to obtain information to display the visual interface for each network device 302-308 registered within the network 400. Although a caching device may be used to store such data within the network and/or access devices within the local area network 400, other types of storage may be used.

The cache can contain a known interface list including interface information for different, known types of devices. The known list can include a record for each network device known by the access device 108 to exist on the network 400. When an application is run on the access device 108, the access device 108 can access the known interfaces in the cache to present the display of access device 108. The display can present one or more visual interfaces, each corresponding to a network device known to exist on the network 400. Each visual interface can be generated based on a visual interface module corresponding to each device on the network 400. In an example, the display can include a visual interface (e.g., a module tile) for each device in the network 400 having an interface in the known interface list.

The cache can also contain known status information about each network device in the known device list. When the application is run on the access device 108, the access device 108 can access the known status information in the cache to present a status display. The access device 108 can populate each tile with an indicator representing the respective known status information for each device in the known device list. The status display can include an indicator of one or more attributes, one or more settings, or a combination thereof related to operation of each device in the network 400. For example, the status display can include a speed of a fan (e.g., a fan speed of 56 in a range of values between 0 and 100) of the network device 302 (e.g., a fan), a value of sensitivity of a sensor (e.g., a value of 34 in a range of values 0-100) for the network device 304 (e.g., a motion sensor), a value of brightness (e.g., 65 percent brightness) for the network device 306 (e.g., a light bulb), and a value of temperature (e.g. a slow cooker). Although shown as having a single indicator for an attribute or a setting related to operation of a network device, the status display can present a plurality of indicators corresponding to different attributes and/or settings related to operation of a network device.

In some embodiments, the cache can include other information about a network device. The other information can indicate a device's firmware version, last known firmware update status, connectivity to cloud status, registration status (e.g., whether the network device has a key or not), and other such information. The cache can include information that could be used for troubleshooting. In embodiments described below, the access device 108 can access status information from another other device on the network 400 and can use that information to update its own cache, update the status display, and/or pass the information to the cloud network 114 and/or the gateway 110 for trouble shooting and/or storage.

Even though each network device may know and store (e.g. in cache) the state of each other network device within local area network 400, a network device may not know when another network device changes status (e.g. turns/powers off). However, network devices and/or access devices within local area network 400 may broadcast/send any updates in its status to other devices on the network. For example, if network device 302 changes status, it may send status data to the other network devices, such as network devices 304, 306 and 308 and to access device 108. However, network device 302 may not know which devices to update since the other devices may change statuses periodically (e.g. turn off).

Therefore, a network or access device may subscribe to another network or access device within local area network 400. For example, network devices 304, 306 and 308 and access device 108 may subscribe to status data notifications/updates from network device 302. Such a subscription may be registered for upon initial connection with network device 302 when network device 302 first enters local area network 400 or at any other time after network device 302 has been associated with local area network 400. Subscriptions may be controlled to last indefinitely or may expire after a certain predetermined period of time after initial subscription. However, network devices may re-subscribe to another network device before or after their previous subscription has expired.

Subscriptions between network device and/or access devices may be registered, similar to registering a network device upon initial entrance into the local area network, including security registrations described herein with respect to FIGS. 1 and 2. For example, a network device may send its unique security key, which it may have stored along with its network ID after being registered on the network, to a network device to which it wants to subscribe. However, subscriptions may take on many other forms, including sending a different form of identification to a network device to which a network device wants to subscribe. However, subscriptions may take on many other forms, including sending a different form of identification to a network device to which a network device wants to subscribe.

Upon receiving a subscription from another network device or access device, the device being subscribed to may store a list of the devices that subscribed to it. For example, network device 302 may store a list of network devices 304, 306 and 308 and access device 108 after those devices subscribe to network device 302. Then, when network device 302 undergoes a change in status, network device 302 may send that change in status to only the devices that had previously subscribed to it but where the subscription had not yet expired. Furthermore, according to some embodiments, the subscription list of a network device may be automatically updated if that device receives notification that another device has left the range of the local area network, either from that device itself or from a different device. Therefore, the various devices within a given local area network, such as network 400, each contain continuously updated statuses of each other device on the network and obtain those statuses and updates through direct communication without necessary use of the cloud.

Figure 5:
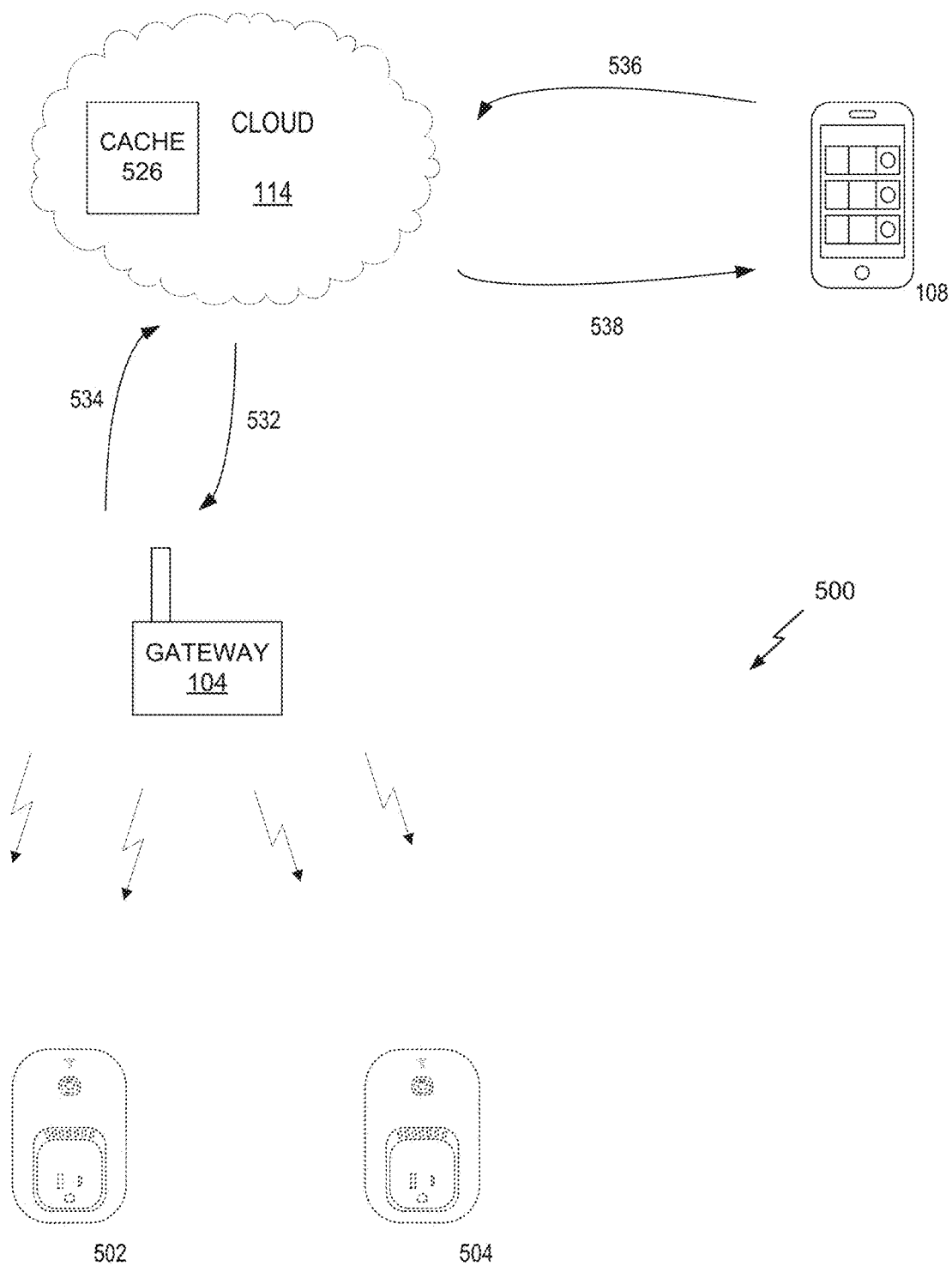
FIG. 5 illustrates an example of a network environment, according to embodiments of the present invention.

FIG. 5 illustrates an access device 108 that is located remotely from network 500 (e.g. local area network), according to embodiments of the present invention. Local area network 500 includes gateway 104 and network devices 502 and 504 (which may be, for example, the same as any of network devices 302-308 in FIGS. 3 and 4), as shown in FIG. 5. However, network 500 may also include a variety of other network devices and one or more access devices directly connected to network 500. Gateway 104 is connected to cloud network 120, and allows network devices 502 and 504 to connect to cloud 120, the internet, or other external networks via gateway 104. In some embodiments, the network devices 502 and 504 may include home automation devices that allow a user to access, control, and/or configure various home appliances located within the user's home, such as a television, radio, light, microwave, iron, and/or the like.

Access device 108 is not directly connected to network 500. Instead, access device 108 is external to network 500 and may connect to cloud network 120 and to network 500 via cloud network 120. As noted, network devices 502 and 504 may change status on a periodic basis. In some embodiments, even when external to and not directly connected to network 500, an access device may request to check the status of the devices on the network. When access device 108 seeks to check the status of any device on the network, the access device 108 may transmit/send a communication 536 to the cloud network 114, to which all devices on the network are connected either directly or indirectly via gateway 104. Since the cloud network 114 stores an updated table/list of the statuses of each of the devices within the requesting access device's network, the cloud network 114 may transmit a communication 538 of such status data to the access device 108. For example, after network devices 502 and 504 are turned on, authenticated and are a part of network 500, network devices 502 and 504 may communicate their statuses to cloud network 114. Furthermore, any time the status of network devices 502 and 504 changes, the device that incurred a status change may push/send information (e.g. an indication) of that status change to cloud network 114. Cloud network 114 may store, in cache 526 or otherwise, the statuses (which may be time stamped in metadata or otherwise) of network devices 502 and 504. Therefore, when access device 108 requests from cloud network 114 the statuses of devices on network 500, cloud 114 may send its most recently stored/updated statuses to access device 108.

To obtain the most updated status data of devices within network 500, cloud 114 may, upon receiving a request for status data related to network devices 502 and 504, transmit/send a communication 532 (e.g. request, query, etc.) for such status data to network devices 502 and 504 via gateway 104. Once network devices 502 and 504 receive this request, network devices 502 and 504 may send a communication 534 (e.g. updated status data) to cloud 114 to replace the previously stored/cached statuses in cache 526. Upon receipt of updated status data 534 from network 500, cloud 114 may send a communication 538 of such status data to the access device 108.

However, the process of cloud network 114 requesting updated statuses from network devices 502 and 504 within network 500 may cause latency within the system. More specifically, the time required for cloud network 114 to request updated statuses from network devices 502 and 504 and to in turn receive updated statuses from network devices 502 and 504 may be substantially greater than the time required for cloud network 114 to send its currently stored statuses (without being updated) for network devices 502 and 504 to access device 108. For example, of the total time required for access device 108 to receive updated statuses from cloud network 114, 80% or more of that total time may include cloud network 114 requesting updated statuses from network devices 502 and 504. On the other hand, of the total time required for access device 108 to receive updated statuses from cloud network 114, 20% or more of that total time may include the status data being transmitted from cloud network 114 to access device 108. Since a majority of the process required for access device 108 to request and receive status data for network devices 502 and 504 is the transmission of data between cloud 114 and network devices 502 and 504, the access device 108 and cloud network 114 may maximize efficiency by minimizing the effect of the transmission of data between cloud 114 and network devices 502 and 504 on the whole process/system.

Accordingly, techniques and systems are described herein for transmission of data through networks, such as, for example, mesh networks. Specifically, various techniques and systems are provided for a network device to generate performance metrics based on its own performance, generate and receive performance metrics based on the performance of other network devices in a network, and sharing that information with the other network devices on the network. Furthermore, techniques and systems are provided for using the performance metrics of nodes in the mesh network to make data transmission decisions. For example, a mesh node may compile data (based on generated and/or received data) based on the performance of itself and other nodes in the network to determine which node it wants to send its data. The performance metrics and/or data used to make such decisions include, for example, latency, reliability, number of hops from destination, IP bandwidth, among other data. The decisions based on compiled performance metrics may include dynamic (e.g. real time), conditional decision making that adjusts based on the state of the network at any given time. The mesh network nodes may also shift or reshape based on the state of the network or node.

Figure 6:
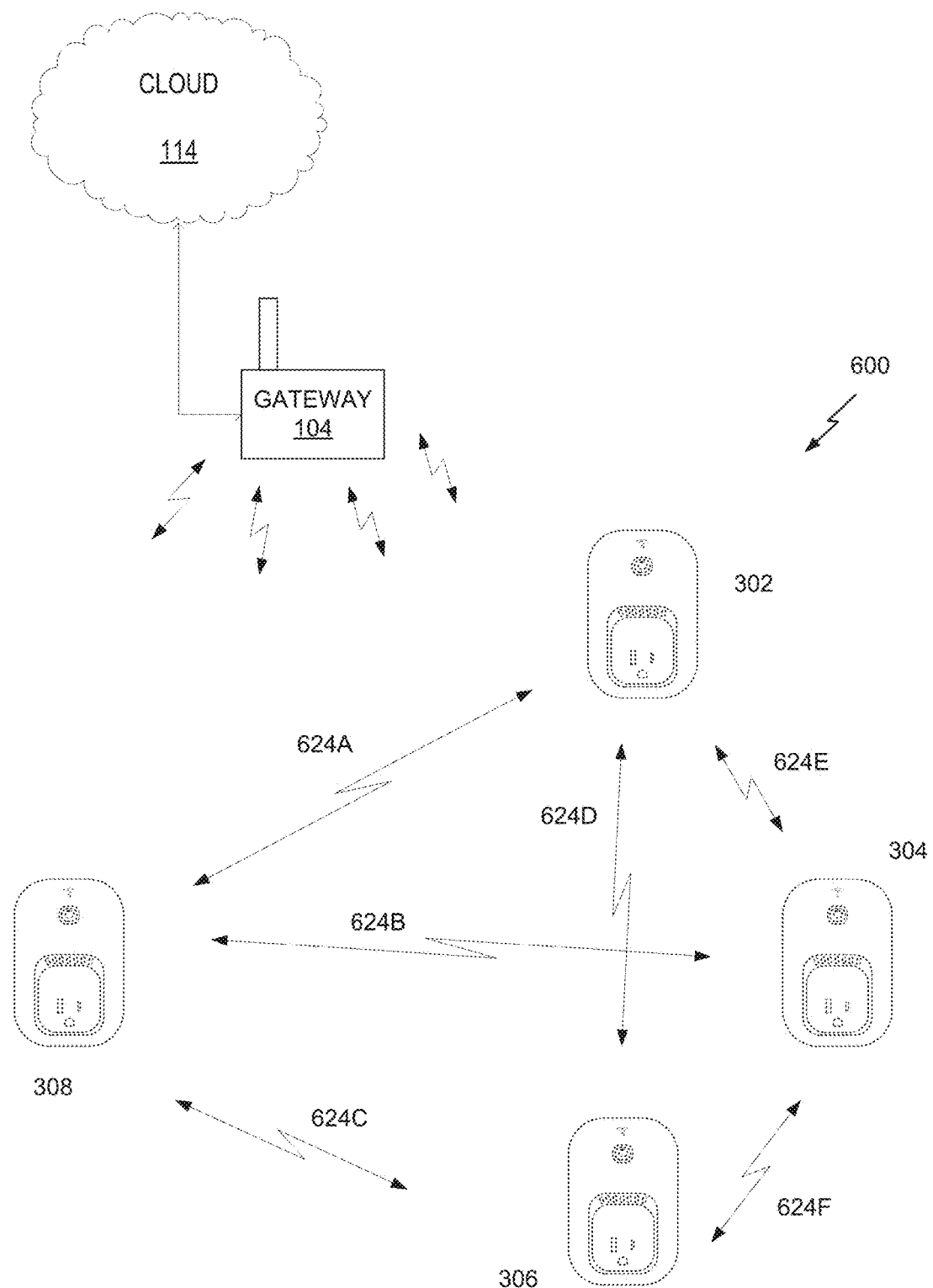
FIG. 6 illustrates a network including a plurality of network devices, according to embodiments of the present invention.

FIG. 6 illustrates an example of a wireless local area network 600, according to embodiments of the present invention. The local area network 600 includes network device 302, network device 304, network device 306 and network device 308. The local area network 600 may be one of a variety of different kinds of networks. For example, local area network 600 may be a mesh network. As noted, in some embodiments, the network devices 302, 304, 306 and 308 may include home automation network devices that allow a user to access, control, and/or configure various home appliances located within the user's home, such as a television, radio, light, microwave, iron, and/or the like, as described further with respect to FIG. 1. As described further with respect to FIGS. 1 and 2, upon being powered on or reset, the network devices 302, 304, 306 and 308 may be registered with the cloud network 114 and associated with a logical network within the local area network 600.

Network devices 302, 304, 306 and 308 may generate, collect, share, and/or receive various information regarding themselves and/or other network devices in the network. As noted with respect to FIG. 3, for example, network devices 302, 304, 306 and 308 may change status or other identifying information on a periodic basis. As another example, network devices 302, 304, 306 and 308 may change their performance on a periodic basis. For example, a network device may be connected to a home appliance that can be controlled by the network device (and also, for example, by an access device that controls the network device). The network device may be responsible to receive, transmit, and transfer data, instructions, or other signals to and from the home appliance it controls. Network devices 302, 304, 306 and 308 may receive, transmit and transfer such signals via, for example, communication paths 624A, 624B, 624C, 624D, 624E, and 624F as shown in FIG. 6. Although local area network 600 in FIG. 6 is shown with network devices 302, 304, 306 and 308 and communication paths 624A, 624B, 624C, 624D, 624E, and 624F, other network devices and communication paths may be a part of network 600.

Furthermore, the network device may fail to perform in its expected manner on some frequency. For example, the network device may receive a packet of information from another network device, access device, or another network device and fail to successfully transmit that data to the home appliance. The network device (e.g. "first" network device)

may also be used as a pass through (e.g. node) as a way to transfer information/data from a second network device on the network to a third network device on the network. For example, if the second network device is unable to communicate directly with the third network device, but the first network device is able to communicate with both the second and third network device, then the second network device may transmit information/data or otherwise communicate with the first network device for the purpose of transmitting that information, data or communication to the third network device. The network device may, therefore, also fail to perform in this expected manner on some frequency. For example, the network device may receive a packet of information from the second network device, access device, or another network device and fail to successfully transmit that data to the third network device (or anywhere else). As such, there are various other ways in which a network device may be responsible to receive, transmit, and transfer data, instructions, or other signals to and from the network device, and the network device may fail to perform its task at some frequency. The network device may share information/data regarding its performance (e.g. success/failure to perform its tasks) with other devices on the network, a cloud network, other devices connected to the network device via the Internet, or other devices/networks.

The success or failure of such a network device may be measured using a variety of different performance metric categories. For example, a network device may be measured based on its reliability. For example, such a reliability may be a percentage of successful transmissions/transfers (e.g. in number of transmissions, packets, etc.) to, through, or from the network device. In other words, if a network device, over a certain period of time, successfully receives a packet and then transmits that packet to its destination, such an action may be considered a successful transfer. If the network device completed, for example, 80 successful transfers out of 100 total transfers attempted over a determined period of time, then the reliability of the network device over that period of time may be characterized as 80%. A network device may also be measured by latency. For example, latency may include a number of seconds per transmission/transfer, a number of seconds per byte or multiple of bytes transmitted, number of seconds above or below an average number of seconds for such a transmission, among others. In other words, if a network device, over a certain number of transfers, received a packet and then transmits that packet to its destination in an average of 0.01 seconds, but receives and then transfers a later packet in 0.05 seconds, the network device may be characterized at that time as having a latency of 0.04 seconds. A variety of other different performance metric categories may also be used to characterize the performance of a network device (or a network device at a mesh network node). Furthermore, a variety of different units of measure and types of data may be used as performance data/metrics.

As used herein in exemplary embodiments of the present invention, the term "performance metric category" may be used to describe different types of categories to describe a device or node's performance (e.g. reliability, latency, etc.). As used herein in exemplary embodiments of the present invention, the term "performance data" may be used to describe raw data compiled within any performance metric category (e.g. a percent of reliability, a number of seconds of latency, etc.). As used herein in exemplary embodiments of the present invention, the term "processed performance information" may be used to describe any information that results from the processing (e.g. calculating, analyzing, etc.) of performance data and that is based, at least in part, on performance data. As used herein in exemplary embodiments of the present invention, the term "performance metric" may be used to describe any performance data and/or processed performance information.

Processed performance information may be computed, calculated or processed by either a network device itself or by an external network or device that the network device is connected to. For example, network device 302 may compile data regarding its performance (i.e. performance data). Performance data may include, for example, a compilation of the number of packets that were successfully transferred through a device/node (aka "reliability" data). For example, network device 302 may compile data regarding how many packets are successfully transferred through device 302 and/or any latency caused by such transfers through device 302. Network device 302 may then subsequently compute its reliability (e.g. a percentage) and latency (e.g. an amount of time) metrics based on that performance data. In an alternative embodiment, network device 302 may transmit its performance data to cloud network 114 so as to allow cloud 114 to compute performance data for device 302 based on the performance data 302 received by cloud network 114. Similarly, network device 304 may transmit its performance data to cloud 114 via network device 302 if network device 304 is not directly communicatively connected to cloud 114. If cloud network 114 computes processed performance information based on performance data from a network device, cloud network 114 may store those processed performance information, may transmit the metrics back to the network device that the processed performance information are associated with, and may also transmit the performance data and/or processed performance information (i.e. performance metrics) to other network devices on the network for local storage on those network devices. Sharing such performance metrics with other network devices on the network will be discussed further herein with respect to FIG. 8.

Aside from recording the performance metrics during normal operations and associated communications, other methods of requesting and collecting performance metrics may also be used. For example, a node may request a performance assessment test. More specifically, any node, at any time, may perform an explicit performance assessment calibration test to it's peer nodes. In such an event, a node may send specific communication packets to one or more other nodes in the network and request that those nodes respond with information about themselves. The requesting node may not only record/collect the contents of the responses from the other nodes, the requesting node may also record the amount of time it took for the responses to arrive and other performance metrics relate to the communications between nodes. The request communication sent by the requesting node may also include a request for the other nodes to run a self-diagnosis, a firmware checksum, a peer calibration test of it's own, or other possible requests for information. The requesting node may then also receive the results of those processes as transmitted by the other nodes, along with any other requested information.

Figure 7:
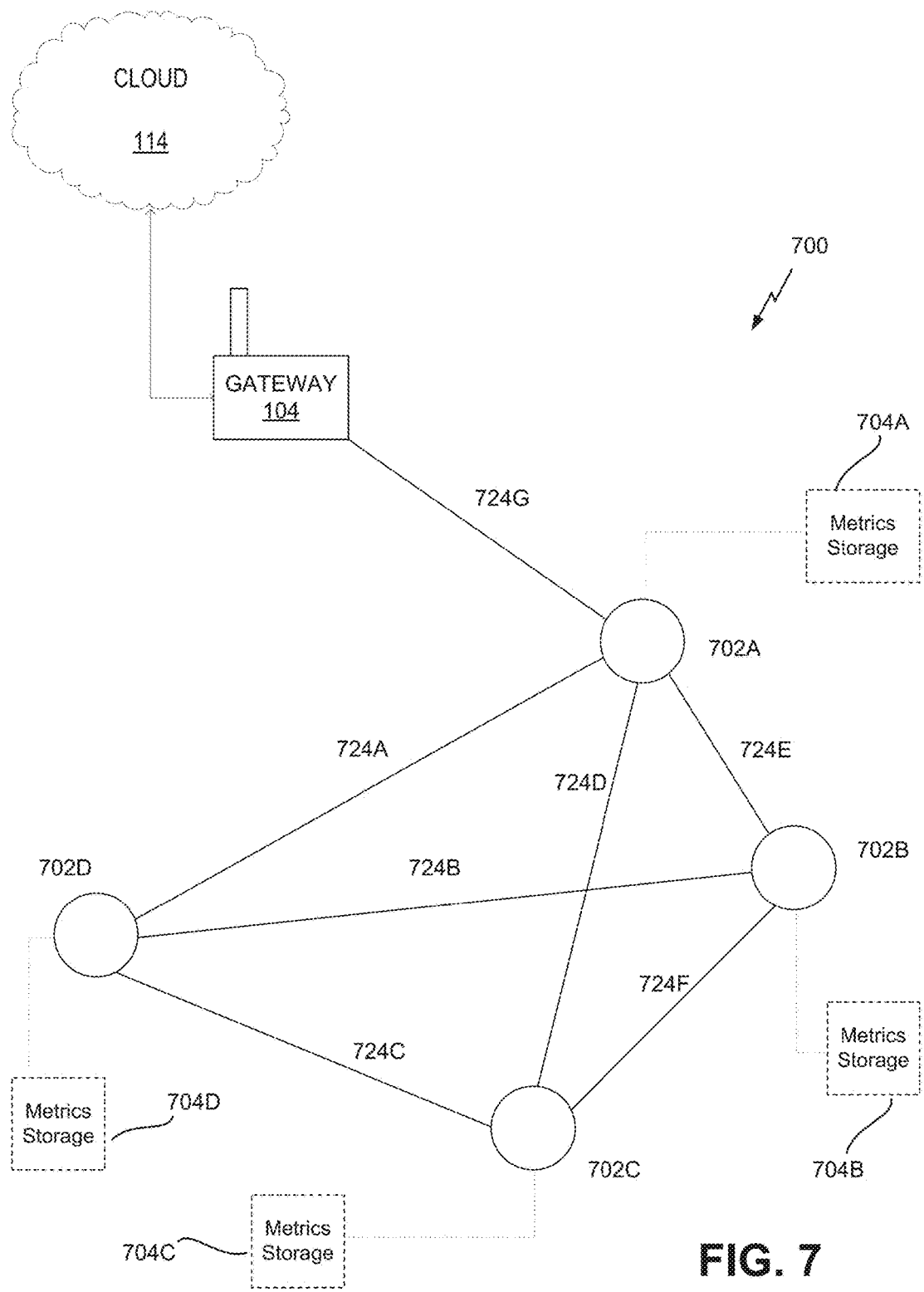
FIG. 7 illustrates a mesh network including nodes and communication paths/links, according to exemplary embodiments of the present invention.

FIG. 7 illustrates a mesh network 700 including multiple nodes and communication paths/links, according to exemplary embodiments of the present invention. Network 700 includes mesh nodes 702A, 702B, 702C and 702D. Network 700 also includes mesh links 724A, 724B, 724C, 724D, 724E and 724F. Each of mesh nodes 702A, 702B, 702C and 702D include a metrics storage 404. More specifically, mesh nodes 702A, 702B, 702C and 702D include metrics storage 704A, 704B, 704C and 704D, respectively. As shown in FIG. 7, mesh node 702A is communicatively connected to gateway 104. Mesh node 702A is also communicatively connected to mesh nodes 702B, 702C and 702D. As such, in the configuration shown in FIG. 7, mesh node 702A provides access to devices external to the network. In other words, the gateway may also provide the user and the nodes (or network devices connected to the nodes) with access to one or more external networks, such as a cloud network, the Internet, and/or other wide area networks. Furthermore, mesh node 702A may provide a user, who may access the network via an access device (e.g. mobile device) connected to gateway 104, with access to the other network devices.

As noted, a gateway, such as gateway 104, may also provide the user and the nodes (or one or more network devices connected to the nodes) with access to one or more external networks, such as a cloud network, the Internet, and/or other wide area networks. More specifically, a node within a mesh network, such as for example network 700 according to embodiments of the present invention, may be connected to a network device of an IoT network. A node, such as nodes 702A-702D, may each be a gateway similar to gateway 104. Alternatively, such a node may be or include a network device, such as one or more of network devices 302-308 as described in FIGS. 3-6. In other words, a network device may perform the operations of a node in the mesh network.

As noted, mesh nodes 702A, 702B, 702C and 702D include metrics storage 704A, 704B, 704C and 704D, respectively. Metrics storage 704A-D each include locations where performance metrics may be stored at each of mesh nodes 702A-D. For example, if node 702A represents a network device, such as network device 302, metrics storage 704A may be storage (i.e. a "storage unit") located within network device 302. Performance metrics may also be stored externally in a cloud network, such as cloud network 114, which may provide access to the stored metrics by the network devices at any time. For example, cloud network 114 may include storage (e.g. cache) that stores all information related to the network devices within the network.

A device represented by node 702A-D in FIG. 7 may store performance metrics in a variety of different ways. For example, a node (or network device connected to or representing the node) may store a table/chart that includes the performance metrics of each node. The cloud network 114 may also store a table that includes the performance metrics of each node (as of its last communication with each node). The storage unit may store a single table with all statuses of each node, or individual storage tables for each network or other subset of its devices/networks. In one embodiment, a change in performance data may prompt the node to push its change in data to the cloud network 114 for storage or updating of the cloud's stored data/metrics table. In another embodiment, cloud network 114 may continuously (or periodically) communicate with each node to check to see if its data or metrics have changed.

In an embodiment where a cloud network receives and/or stores performance metrics for one or more nodes, and/or performs analysis on that data, the cloud network may store a history of each of these performance metrics for each node for some predetermined (or, in other embodiments, indefinite) period of time. Such historical metrics may be used to determine the reliability or other performance metrics of a node over time. Such historical data may be analyzed over time to determine patterns and/or give some level of predictability to future performance of those nodes. Such patterns or other analysis (including predicted future metrics) may be transmitted by the cloud network to one or more of the nodes in the network, and the node(s) may use that data to help make its determinations about where (e.g. which nodes) to transmit its data to.

Figure 8:
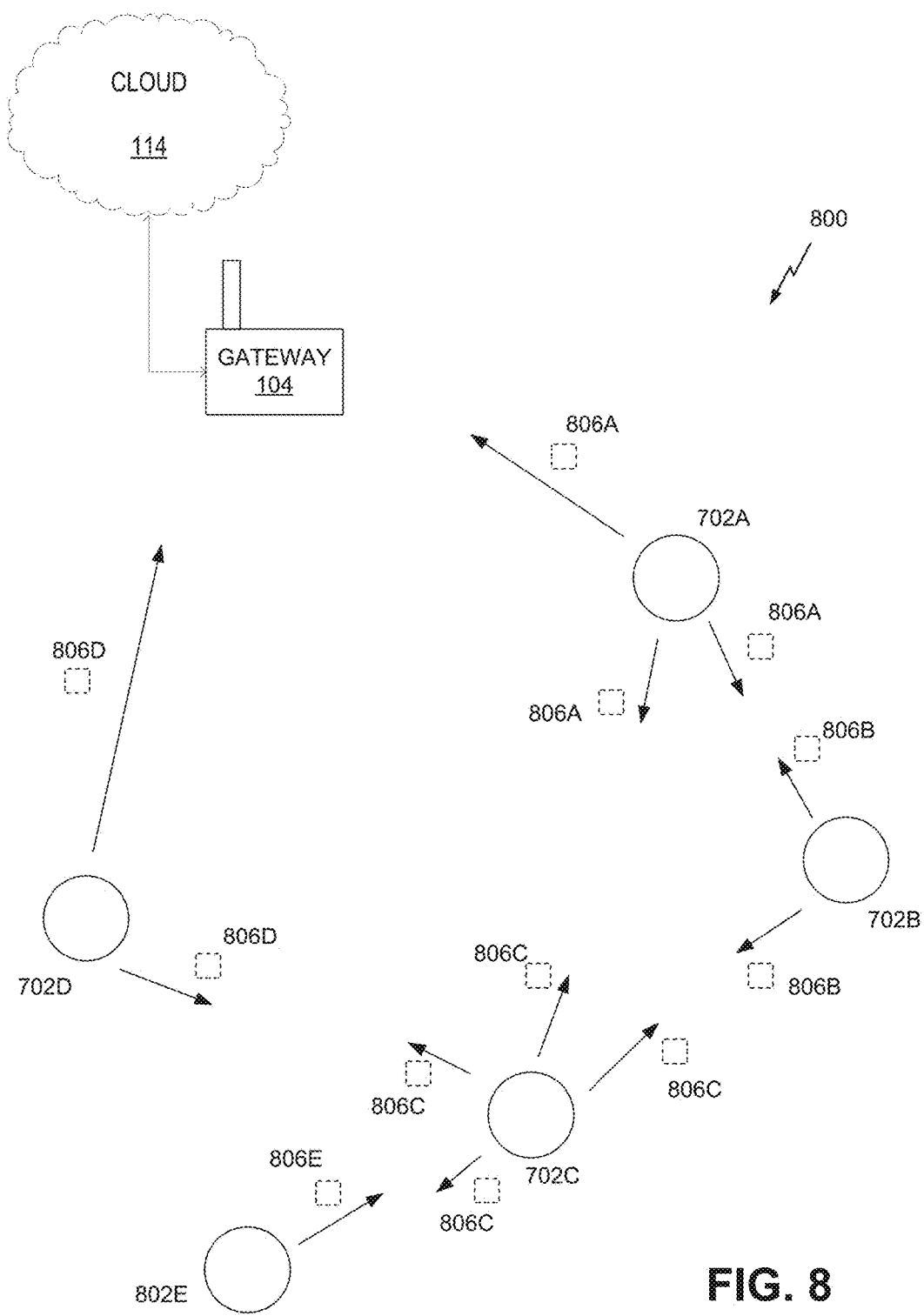
FIG. 8 illustrates a mesh network including nodes transmitting data, such as performance metrics, to each other, according to exemplary embodiments of the present invention.

FIG. 8 illustrates a mesh network 800 including nodes transmitting data, such as performance metrics, to each other, according to exemplary embodiments of the present invention. Network 800 includes mesh nodes 702A, 702B, 702C, 702D, and 802E. Mesh network 800 is similar to the topology of network 700, but further including added mesh node 802E. As shown in FIG. 7, mesh node 702A is communicatively connected to gateway 104. Mesh node 702A is also communicatively connected to mesh nodes 702B, 702C and 702D. Mesh node 702B is communicatively connected to mesh node 702A and 702C. Mesh node 702C is communicatively connected to mesh node 702B and 702D (and new mesh node 802E). Mesh node 702D is communicatively connected to gateway 104 and mesh node 702C (and new mesh node 802E). As noted, each mesh node may, in conjunction with cloud network 114 and storage, generate performance metrics based on their own performance within the network. Each mesh node may also transmit its performance metrics to other devices/nodes on the network. For example, as shown in FIG. 8, node 702A may transmit data 806A to cloud 114 and to any other nodes in the network that it is communicatively connected/coupled to (e.g. node 702B and node 702C). Furthermore, node 702B may transmit data 806B to nodes 702A and 702C. Further, node 702C may transmit data 806C to node 702A, 702B, 702D and 802E. Further, node 702D may transmit data 806D to gateway 104 and 702C.

Even if a node is not directly connected to each other node within network 800, that node may transmit its performance metrics to such nodes via one or more other intervening nodes within the network that are connected to such nodes. For example, node 802E may transmit its compiled performance metrics to node 702A by transmitting its data/metrics to, for example, node 702C. Node 802E may include a request in the same or a different transmission for the receiving node to transmit the received data directly to node 702A or to any other nodes that may be intervening between node 802E and node 702A. As such, performance metrics for each network device/node may be stored on each device.

Each node may also transmit its performance metrics to cloud network 114 for storage. Even if a node is not directly connected to cloud network 114, that node may transmit its performance metrics to cloud network 114 via one or more other nodes within the network that are connected to cloud network 114. For example, node 702C may transmit its compiled performance metrics to cloud network 114 by transmitting its data/metrics to node 702D, node 702B, or node 702A. Node 702C may include a request in the same or a different transmission for the receiving node to transmit the received data directly to cloud 114 or to any other nodes that may be intervening between that node and cloud network 114.

A node within the mesh network may also compile performance metrics about other nodes in the network based on its own experience with those nodes. For example, node 702B may receive data packets or other forms of data from node 702C, and node 702B may also transmit data packets to node 702C. Node 702B may then evaluate the performance of node 702C based on how successful such transmissions are. For example, node 702B may compile data regarding the reliability of node 702C, including how often node 702C successfully transfers data packets that node 702C received from node 702B and/or how often node 702C successfully transmits data packets to node 702B. Node 702B may also compile data regarding the latency of node 702C, including how long it takes node 702C to successfully transfer data packets that node 702C received from node 702B and/or how long it takes node 702C to successfully transmit received data packets to node 702B. To compile such data, node 702B may request an acknowledgement from node 702C after node 702C receives a packet from node 702B and successfully transmits it to a different node. Other various types of confirmations/acknowledgements are possible to help node 702B compile such performance data regarding node 702C. As noted, node 702B (or any other node compiling data about another node) may use this data to compute processed performance information or send such data to cloud network 114 where the cloud network 114 may store the performance data and compute such processed performance information for the node.

As described, each node within network 800 may compile performance metrics, whether the metrics are computed by itself or an external device, based on its own performance and based on other nodes' performance (including both data compiled by each node about other nodes and data received from those nodes themselves). Each node may transmit such information to each other node within the network and to cloud network 114. In other words, one node may assist a second node with information related to a third node that the second node may communicate with or transmit a signal to. Furthermore, each node may make frequent or semi-frequent decisions for itself regarding which node to use or communicate with. For example, a device on node 702C may communicate with (e.g. send a signal to) gateway 104 (and cloud 114) via node 702D or via nodes 702B and 702A. Therefore, node 702C may choose which path to send its signal/data based on a variety of factors. For example, node 702C may be programmed to always communicate with gateway 104 via one predetermined path. However, node 702C may choose which path to send its signal/data based on a dynamic (e.g. real time) decision making process including performance metrics compiled for each node on each path. For example, a node may use its own performance data or metrics compiled by itself and by other nodes, performance data or metrics of the other nodes on the possible paths compiled by itself (and its own experience with those nodes), performance data or metrics of the other nodes on the possible paths compiled by other nodes (either the nodes themselves or other nodes' experience with those nodes), its own priorities, among other factors. As noted, a node/network device may store a table/chart that includes the performance metrics of each node. The cloud network 114 may also store a table that includes performance metrics of each node (as of its last communication with each node).

FIG. 9 illustrates tables 900A and 900B, which include a compilation of exemplary performance metrics for nodes 802E and 702C, respectively, according to embodiments of the present invention. For example, table 900A includes performance metrics related to node 802E, including data about the node's latency for transferring/transmitting different amounts of data, reliability, number of hops from gateway 104, number of clients (e.g. devices) connected to the node, and the bandwidth that each client connected to node 802E is using. Table 900B includes performance metrics related to node 702C, including data about the node's latency for transferring/transmitting different amounts of data, reliability, number of hops from gateway 104, number of clients (e.g. devices) connected to the node, and the bandwidth that each client connected to node 702C is using.

Tables 900A and 900B may each be compiled and stored within their respective nodes (e.g. table 900A within node 802E and table 900B within node 702C). Tables 900A and 900B may also be compiled by other nodes in the network or by cloud network 114. Tables 900A and 700E may also be shared between nodes, for example from the device on one of the nodes that compiled them to another node. Tables 900A and 900B may assist a node (or a device on a node) in making a decision about which of the two nodes to use when transmitting data through the network. For example, such a node may choose to use (i.e. send signals/data to) node 802E instead of node 702C because the latency data for node 802E shows latencies of 0.01 seconds for <1 GB of data, 0.03 seconds for 1 GB-3 GB of data, and 0.06 seconds for >3 GB of data for node 802E, while node 702C shows latencies of 0.04 seconds for <1 GB of data, 0.08 seconds for 1 GB-3 GB of data, and 0.13 seconds for >3 GB of data for node 702C. Furthermore, such a node may choose to use (i.e. send signals/data to) node 802E instead of node 702C because the reliability data for node 802E shows a reliability of 96%, while the reliability data for node 702C shows a reliability of 74%. Furthermore, node 702C has significantly less bandwidth available tan node 802E. More specifically, node 702C has 9 clients connected to it, which take up a total of 62% of the node's bandwidth, while node 802E has 5 clients connected to it, which take up a total of 52% of the node's bandwidth. The performance metrics related to the number of hops that each node may be from the gateway (e.g. the network "distance" from the source of the signal at the node to the destination of the signal) show that while node 702C includes three different paths to gateway 104 (while node 802E has only 2), node 702C and node 802E each have a possible path with only 2 hops. Therefore, the number of nodes between source (the node) and destination (gateway) may not be a factor in such a decision. Therefore, such a node may choose to use (i.e. send signals/data to) node 802E instead of node 702C because the performance data/metrics show that node 802E has lower latency, higher reliability, and more bandwidth than node 702C.

The node/device may also include certain ranked priorities regarding which metrics are most important to the node/device. For example, the node may have assigned low latency as its highest priority. This may be because, for example, the node is primarily used with devices that require quick and efficient transfer of data (e.g. video streaming). On the other hand, the node may not have prioritized reliability because, while a higher reliability would benefit any device connected to the node, the devices may be able to afford lower reliability due to the nature of its needs (e.g. a video streaming application may build up buffer over time so that a lack of reliability over a short period of time would not be detrimental to the user). For example, while the tables 900A and 900B show data that may cause most nodes to choose node 802E over 702C in most circumstances, such a decision may be more difficult if, for example, the node prioritized reliability over latency and the reliability data of node 802E showed a lower reliability than the reliability data for 702C.

Figure 10:
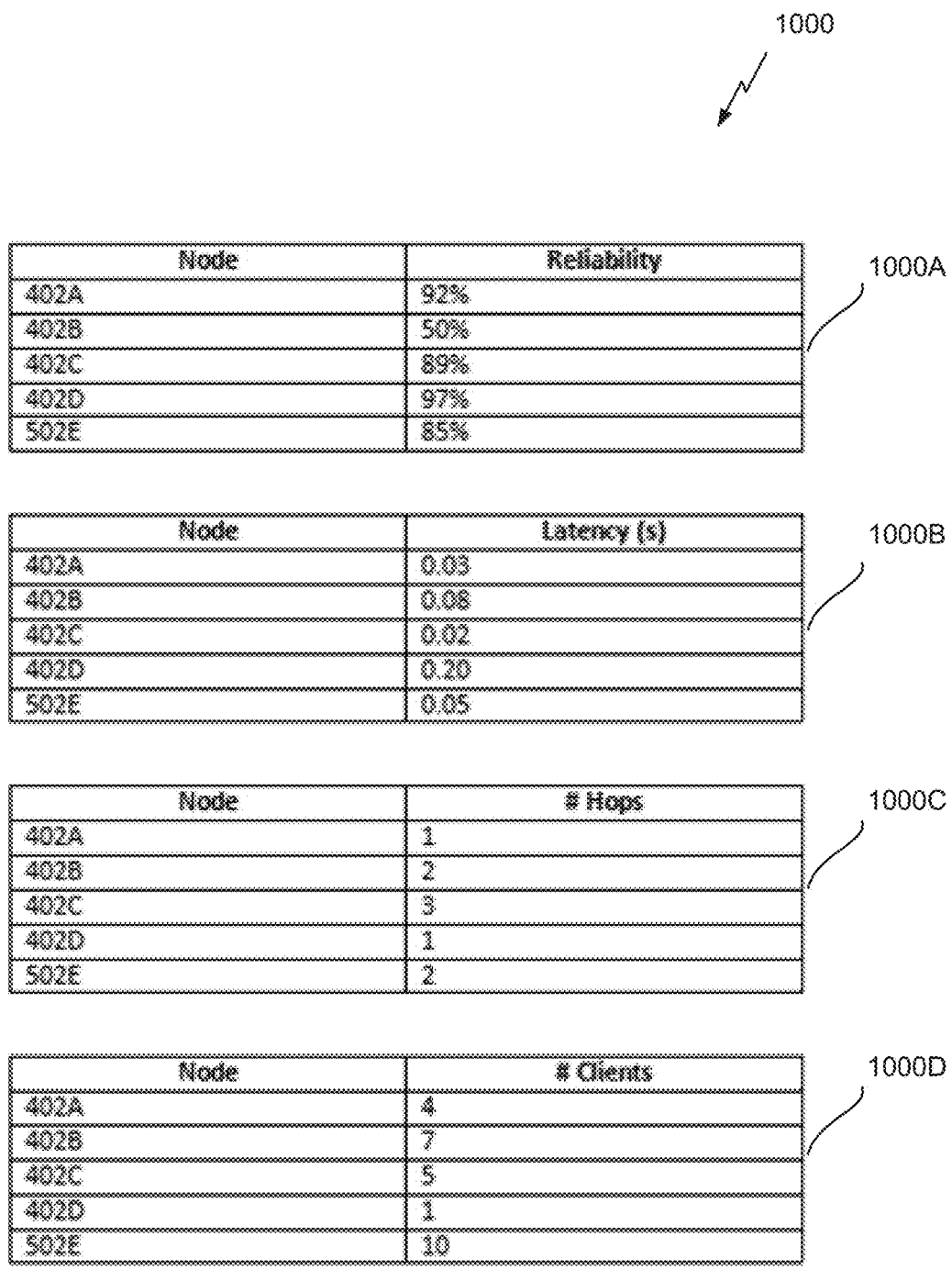
FIG. 10 illustrates tables that include a compilation of exemplary performance metrics for five nodes in a mesh network, according to embodiments of the present invention.

FIG. 10 illustrates tables 1000, which includes a compilation of exemplary performance metrics for five nodes in a mesh network, according to embodiments of the present invention. More specifically, tables 1000 include sub-tables 1000A, 1000B, 1000C and 1000D. Sub-table 1000A includes reliability metrics, sub-table 1000B includes latency performance metrics, sub-table 1000C includes performance metrics related to the number of hops a node is from the gateway of the network that includes the node, and sub-table 1000D includes performance metrics regarding the number of clients that a node has connected to it. One or more devices on a network may have one or more sub-tables stored in storage based on information generated by the devices themselves and other devices in the network. For example, each node may have received reliability, latency, hops, and clients data from each other node in the network, allowing each node to store such performance metrics to use to make decisions regarding which device/node to send its data.

In an exemplary embodiment of the present invention, nodes 702A, 702B, 702C, 702D and 802E each store sub-tables 1000A, 1000B, 1000C and 1000D in local storage. Therefore, if the network is structured as shown in, for example, FIG. 8, and if node 702C receives packets of data from node 802E, or may otherwise transmit data to gateway 104, node 702C may make a decision regarding which path to use to send the packets of data to gateway 104 based on the performance metrics stored in its local storage. Node 702C may also have stored certain priorities, as noted, that may dictate the performance metrics that node 702C gives more weight to when making such a decision. For example, if node 702C prioritizes latency as its highest priority performance metric category, then node 702C may choose to send data packets to gateway 114 via nodes 702A and 702B instead of via nodes 702D. Even though the data packets may have to travel through two nodes (e.g. two nodes within the mesh network), the data packets would experience less latency if transmitted through node 702A and node 702B (0.03 seconds for node 702A and 0.08 seconds for node 702B) than through node 702D (0.20 seconds).

Similar decisions may be performed by node 702C (or another node) based on other performance metrics, such as reliability, number of hops, or number of clients in a similar way. Furthermore, such decisions may be performed by node 702C (or another node) based on a combination of those categories. For example, if a node prioritizes reliability and latency as its top two priorities, it may assign a 50% priority to each of those priorities and the metrics that result from the reliability and latency performance metrics. If a different mixed priority exists, different percentages or weights may be applied to the two (or more) sets of performance metrics to achieve a decision based on the weighted metrics.

The priorities and data of a certain node may change dynamically over time (e.g. in real time). For example, even though the transmission path through nodes 702A and 702B would have less latency than the transmission path through node 702D at a certain time, the paths may have opposite efficiencies at a later time. Therefore, node 702C may perform dynamic decision making based on its stored performance data/metrics at the time it makes the decision.

Figure 11:
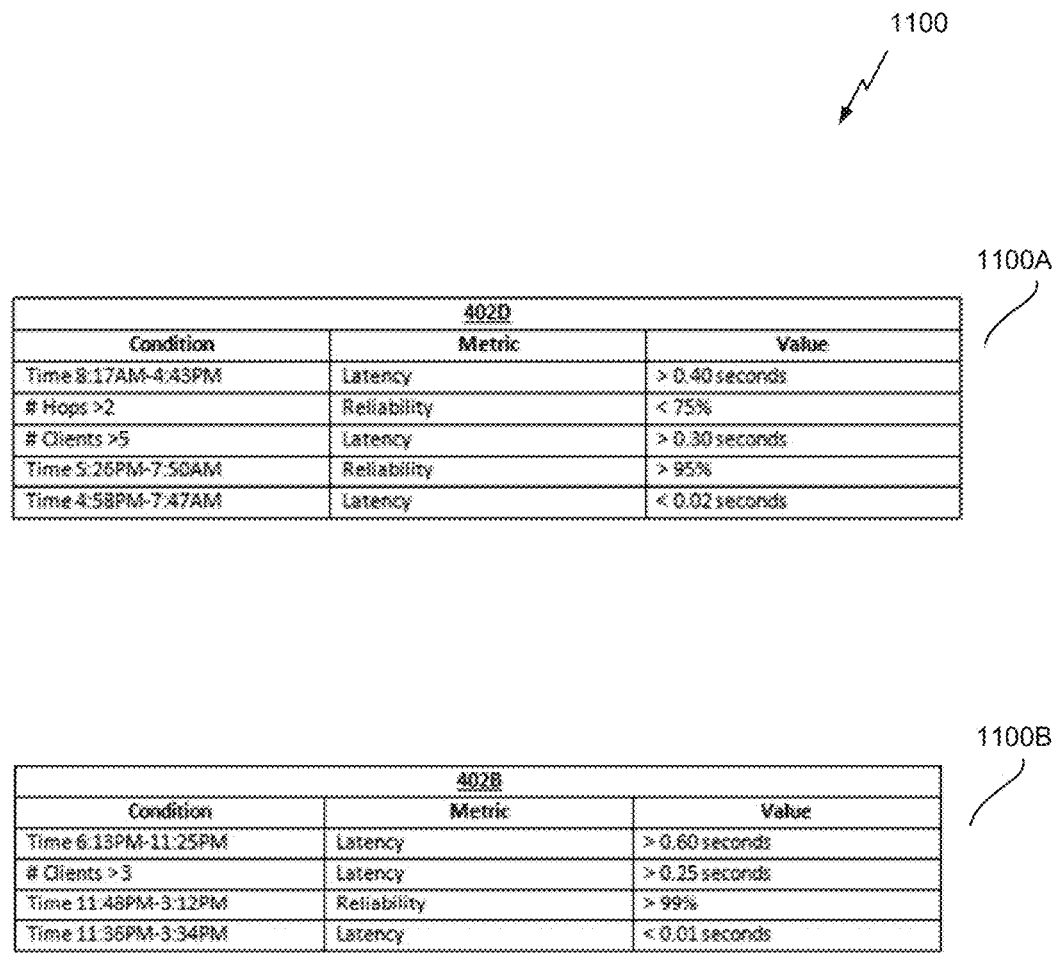
FIG. 11 illustrates tables that include a compilation of exemplary performance metrics for two nodes in a mesh network, according to embodiments of the present invention.

FIG. 11 illustrates tables 1100, which includes a compilation of exemplary performance metrics for two nodes in a mesh network, according to embodiments of the present invention. More specifically, tables 1100 include sub-tables 1100A and 1100B. Sub-table 1100A includes performance metrics for device/node 702D and sub-table 1100B includes performance metrics for device/node 702B. The performance metrics listed in tables 1100A and 1100B may be calculated by a cloud network, such as cloud network 114, or by another computing device. The processed performance information may be calculated using performance data compiled by one or more nodes within in the network. For example, as noted, each node may compile performance data related to itself and performance data related to other nodes on the network based on that device's relationship and experiences with the other nodes.

Each node may also receive performance data, from other nodes, related to itself and the other nodes based on the devices' experiences with the other nodes on the network. Each node may periodically send some or all of its compiled performance data to cloud network 114 so as to allow the cloud network to analyze the performance data and calculate processed performance information based on the performance data. The cloud network may then send the performance metrics to one or more (e.g. all) of the nodes. If updated performance data is sent to the cloud network, the cloud network may re-calculate or update the processed performance information and send the updated performance metrics (performance data, processed performance information, or both) to one or more (e.g. all) of the nodes. In other words, performance data (or metrics) may change dynamically (or in "real time") to adjust for newly generated data/metrics (for example, they may change continually or time).

The processed performance information in tables 1100 are specific to certain conditions. More specifically, unlike performance data listed in tables 1000 in FIG. 10, which include raw data (e.g. a percentage for reliability, a number of seconds for latency, etc.) for metrics categories such as reliability, latency, among others, the processed performance information in FIG. 11 include such values that change with respect to different applied conditions. For example, table 1100A includes processed performance information that shows that the latency of node 702D is greater than 0.04 seconds between the times of 8:17 AM and 4:43 PM. In other words, the processed performance information states that the latency of node 702D is greater than 0.04 seconds as long as the time is between 8:17 AM and 4:43 PM. Such a metric may have been calculated by cloud network 114, or a different computing device, by analyzing the latency data for node 702D over a period of time. This processed performance information may be shared with the other nodes, similar to any other metrics in table 1100A. Another node may also have stored performance metrics for node 702D such that the node may make its own decision regarding whether or not to send data to node 702D. In fact, the node may have had previous experiences with node 702D during that time period that may cause the node not to send data to node 702D during that time period (for example, the node may choose to give more weight to its experience with node 702D than to experiences by other nodes, including data received from node 702D itself). Alternatively or in addition, this performance metric may cause node 702D to inform another node, where the node is considering/deciding whether or not to send data to node 702D or to another node via node 702D, that the node 702D should not receive data between 8:17 AM and 4:43 PM because of its high latency. Instead, such a node may choose to transmit data through a different communication path (to a node other than device 702D), which has a lower latency during that time period.

Table 1100A includes conditional performance metrics showing that the latency of node 702D is less than 0.02 seconds between 4:58 PM and 7:47 AM. As such, a node may choose to transmit data through node 702D, instead of through a different communication path that may have a higher latency during that time period. In other words, a node may choose to analyze the network and divide up traffic via the different available transmission or communication paths so as to prevent an excess of traffic on one particular path, and in turn reduce latency, reliability, etc. on that path.

Table 1100B, on the other hand, includes performance metrics for node 702B that shows that node 702B has a latency of less than 0.01 seconds between 11:36 PM and 3:34 PM. Therefore, if another node, such as node 702C (as shown in FIG. 8, for example), transmits data at, for example, 2:00 PM, node 702C may choose to transmit data to node 702B instead of 702D. Node 702C may be more apt to make such a decision if low latency was, at the time of transmission, high on the list of priorities for node 702C.

Similarly, if node 702C, based on the performance metrics stored in its storage device (e.g. cache), notices that node 702D has 8 clients already communicating with node 702D, node 702C may conclude that node 702D has a latency of greater than 0.03 seconds (as shown in table 1100A). Therefore, in such a situation, node 702C may transmit data via node 702B, especially if node 702B has less than 3 clients connected to it (because, as shown in table 1100B, node 702B has a high latency—greater than 0.25 seconds—when it has 3 or greater than 3 clients communicating with it). Furthermore, if node 702C prioritizes reliability highly, it may prefer to transmit data via node 702B if the time of transmission is between 11:48 PM and 3:12 PM (because, as shown in table 800B, the reliability of node 702B is greater than 99% between those times).

Figure 12:
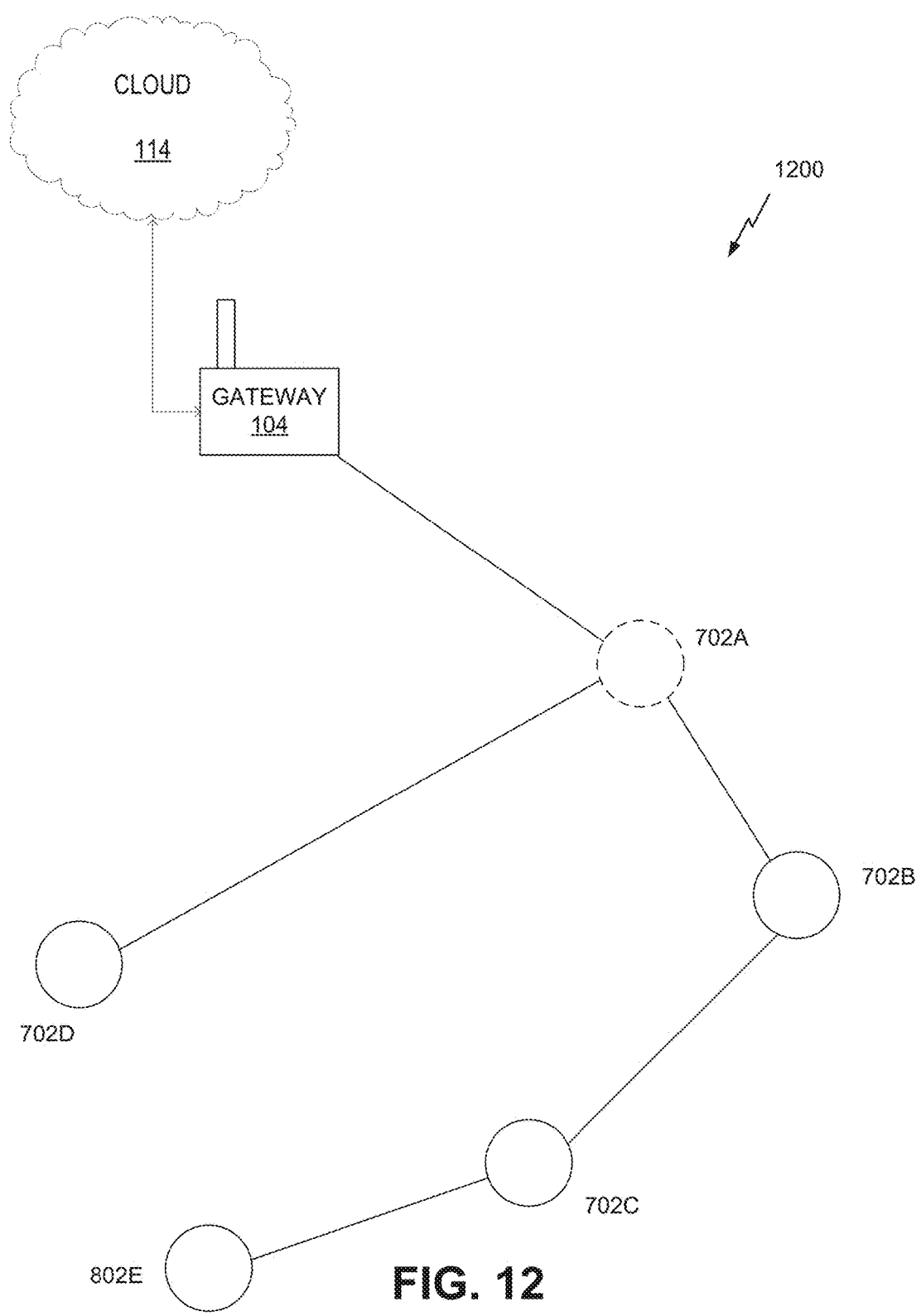
FIG. 12 illustrates a mesh network including five nodes, according to exemplary embodiments of the present invention.

FIG. 12 illustrates a mesh network 1200 including five nodes, according to exemplary embodiments of the present invention. Network 1200 includes mesh nodes 702A, 702B, 702C, 702D, and 802E. Mesh network 1200 is similar to the topology of network 800. Mesh node 702A is communicatively connected to gateway 104. Mesh node 702A is also communicatively connected to mesh nodes 702B and 702D. Mesh node 702B is communicatively connected to mesh node 702A and 702C. Mesh node 702C is communicatively connected to mesh node 702B and 802E. Mesh node 702D is communicatively connected to mesh node 702A. Mesh node 702A, as shown in FIG. 12, is represented by a circle with a dotted outline, representing that node 702A is unstable. Node 702A may be unstable as perceived by itself or by another node in mesh network 1200. The perceived instability of node 702A may be due to declining performance metrics of node 702A. For example, node 702A may have experienced poor or declining reliability, latency, etc. Such an example will be discussed further with respect to FIG. 13. Or, node 702A may be failing to work as a complimentary node in network 1200 altogether. For example, node 702A may have been turned off or powered down. Therefore, node 702A may be viewed as unstable by node 702A, because node 702A receives and generates performance metrics regarding itself, or by other devices in network 1200, because the other devices in network 1200 receive and generate performance metrics regarding node 702A.

When a node is perceived as unstable, another node in the network may request a reshaping of the mesh network. In other words, one or more nodes may request to reorganize the topology of the network. Reshaping of a mesh network may be performed so as to place each node in its best position to be efficient and so that their performance metrics are at their best after the reshaping. More specifically, such a reshaping may allow for a node with certain superior performance metrics to be used by a node/network device or other device that desires/requires such a performance metric to be superior for its transactions/transmissions. For example, as shown in FIG. 12, each of the other nodes in network 1200 depend upon node 702A for their own stability within network 1200. For example, nodes 702D and 702B are communicatively connected to gateway 104 (and therefore cloud 114 and the rest of the outside world) via node 702A. Furthermore, nodes 702C and 802E are communicatively connected to gateway 104 (and therefore cloud 114 and the rest of the outside world) via node 702B, which is communicatively connected to gateway 104 (and therefore cloud 114 and the rest of the outside world) via node 702A. Therefore, if a node in the network 1200 perceives or calculates that node 702A is unstable, the node may request that the network reshape so that the network can rely on a different (hopefully better performing) node as its access/gateway to gateway 104 and external networks. In certain embodiments, any node in the mesh network may request a reshaping of the network at any time. In other embodiments, predetermined rules or conditions (e.g. based on performance metrics or a certain amount of instability in the network) may exist for a node to request a reshaping.

FIG. 13 illustrates tables 1300, which includes a compilation of exemplary performance metrics for the nodes in a mesh network, according to embodiments of the present invention. More specifically, tables 1300 include sub-tables 1300A, 1300B, and 1300C. Sub-table 1300A includes performance metrics for nodes 702A, 702B, 702C, 702D and 802E at a specific time (10:30:25 AM). Sub-table 1300B includes performance metrics for nodes 702A, 702B, 702C, 702D and 802E at a time (10:31:13 AM) that is 48 seconds later than the time that the performance metrics in table 1300A represent. Sub-table 1300C includes performance metrics for nodes 702A, 702B, 702C, 702D and 802E at a time (10:31:32 AM) that is 19 seconds later than the time that the performance metrics in table 1300B represent. The performance metrics listed in tables 1300A, 1300B, and 1300C may be calculated by a cloud network, such as cloud network 114, or by another computing device.

The processed performance information may be calculated using performance data compiled by one or more nodes/network devices within in the network. As shown by comparing sub-tables 1300A, 1300B, and 130C, the performance metrics for node 702A decline sharply between 10:30:25 AM and 10:31:32 AM. For example, the reliability of node 702A declines from 96% at 10:30:25 AM to 85% at 10:31:13 AM to 71% at 10:31:32 AM. In other words, the reliability of node 702A decreases by 25% between 10:30:25 AM and 10:31:32 AM. Furthermore, the latency of node 702A declines from 0.01 seconds at 10:30:25 AM to 0.07 seconds at 10:31:13 AM to 0.14 seconds at 10:31:32 AM. In other words, the latency of node 702A increases by 0.13 seconds, or by a factor of 1300%, between 10:30:25 AM and 10:31:32 AM. Since each node within the network, such as network 1200, compile and/or receive updated performance data periodically, such nodes may sense within a very short amount of time that a node within their network is unstable. A node may decide to request a reshaping of the network very soon after recognizing instability, or a decline in performance data/metrics, for a node on which it relies to communicate along a communication path with a gateway in the network (or any other important communication path within the network). In other words, a node/network device may request that communication paths within the network be adjusted such that it relies on a different node, other than the unstable node, to communicate with/through.

Figure 14:
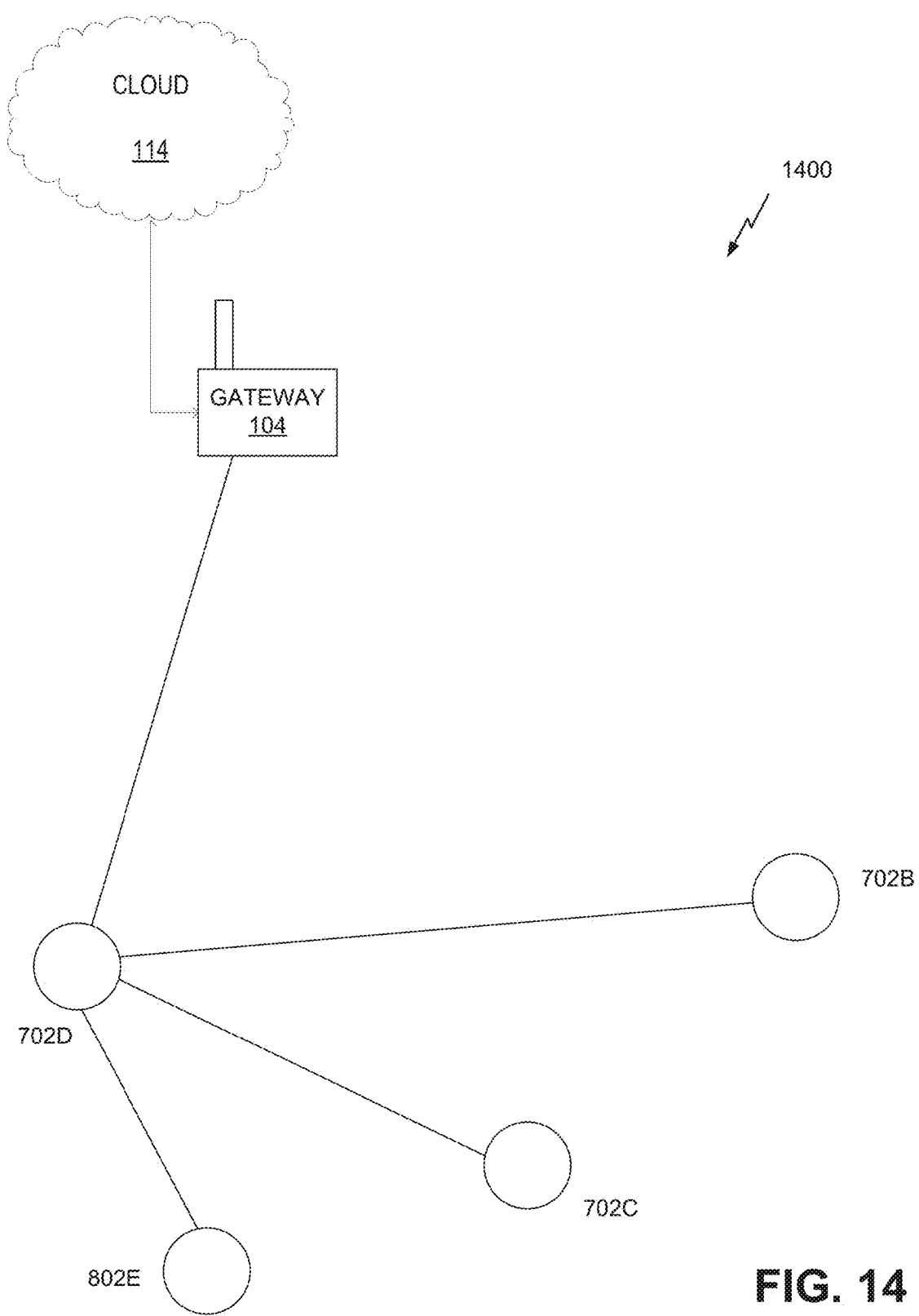
FIG. 14 illustrates a mesh network including four nodes, according to exemplary embodiments of the present invention.

FIG. 14 illustrates a mesh network 1400 including four nodes, according to exemplary embodiments of the present invention. Network 1400 includes mesh nodes 702A, 702B, 702C, 702D, and 802E. Mesh network 1400 is similar to the topology of network 900 except that node 702D is directly communicatively connected to gateway 104 (as node 702D is the "hub" for the rest of the network), and nodes 702B, 702C and 802E are each communicatively connected to gateway 104 via node 702D. In other words, the nodes within network 1400 have reshaped from their topology in network 900. As noted, one of the nodes in the network, such as node 802E, 702C, 702B or 702D, or a combination of more than one of those nodes, may have requested reshaping of the mesh network after determining that node 702A was unstable and/or was going to power down or shut off.

A node or set of nodes may determine in advance that a node is becoming unstable or may shut down or be powered down, causing the node or nodes to request a reshaping of the mesh network. However, alternatively, a node may be set to notify the rest of the nodes when the node knows it will shut down or be powered down, or when it senses that it has become unstable. For example, a node may determine before a different node that it has become unstable due to, at least, the time for performance data and/or other information to be sent from the node to other nodes in the network. More specifically, a node may generate performance data and/or processed performance information regarding itself before it sends such data and/or information to other nodes, and therefore may be able to determine its level of instability before other nodes in the network. Furthermore, the node has received a prompt or indication that it will be shut down (e.g. a user has pressed the power button on a device at the node). In either situation, the node may pre-emptively send a message or information to the other nodes indicating that it will be powered down. Receipt of such a message may cause one or more other nodes in the network to request a reshaping of the network.

Figure 15:
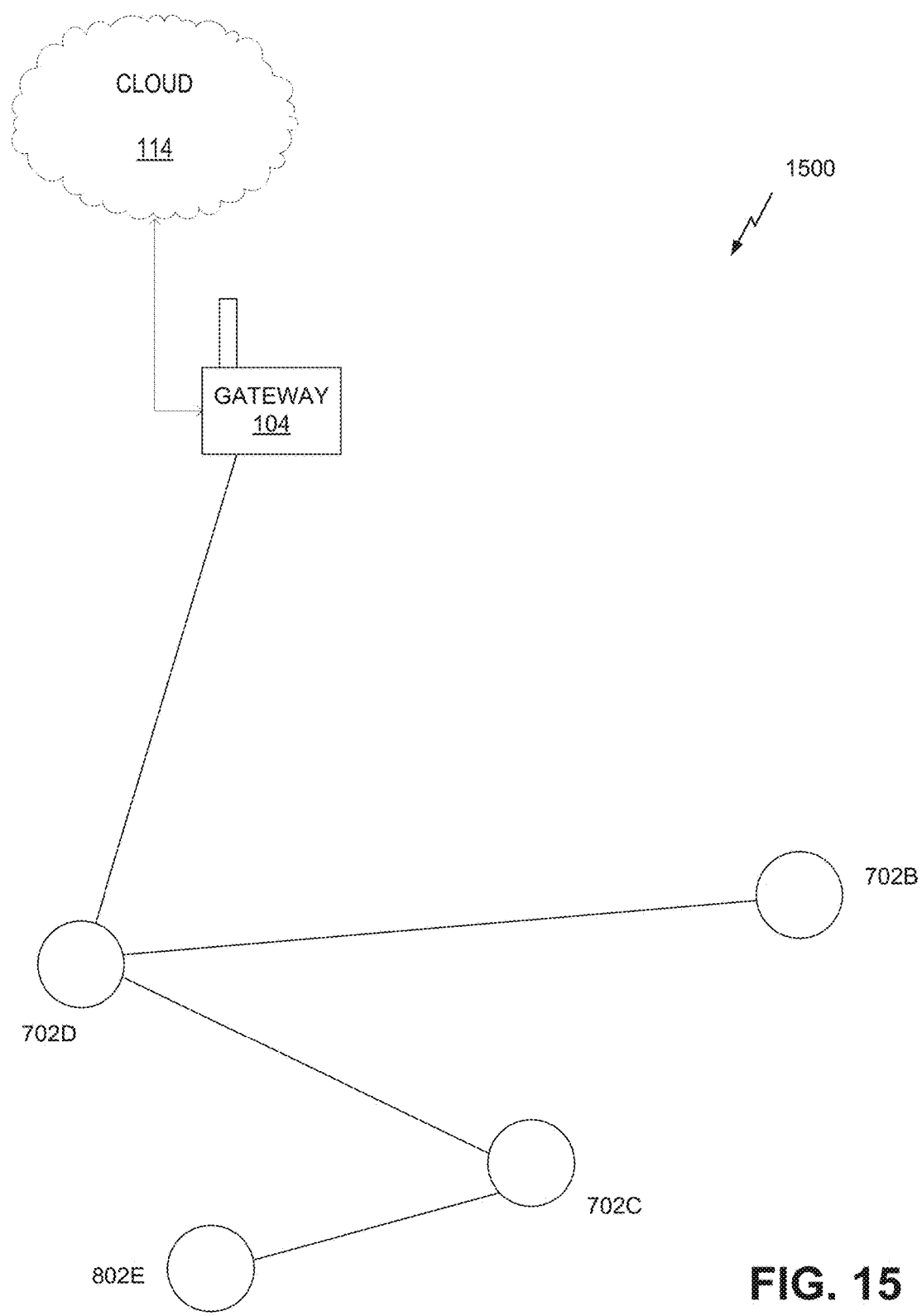
FIG. 15 illustrates a mesh network including four nodes, according to exemplary embodiments of the present invention.

FIG. 15 illustrates a mesh network 1500 including four nodes, according to exemplary embodiments of the present invention. Network 1500 includes mesh nodes 702A, 702B, 702C, 702D, and 802E. Mesh network 1500 is similar to the topology of network 1400 except that node 802E is directly connected to node 702C instead of 702D.

As noted with respect to FIG. 14, a node may request a reshaping of the network based on the instability of a node or the network as a whole. However, a node may also reject such a reshaping request. For example, a node may request a reshaping by sending a reshaping request (e.g. a message) to each node on the network. A node that receives the reshaping request may send a message back to the requesting node indicating that the node will not participate in the reshaping. The requesting node may proceed with the reshaping without the participating of the rejecting node, or the requesting node may delay or cancel the reshaping all together. For example, the requesting node may delay the reshaping for a certain amount of time, at which time a reshaping may occur automatically or after which the requesting node may send another request to the other nodes in the network. A node may refrain from participation in a reshaping if the reshaping would take place while the node is busy participating in a transaction, transmission or other communication. For example, if the reshaping may require the node to disconnect from one node and reconnect to the network at another node, such a process may cause a communication to disconnect also, causing failure or delay/latency.

For example, if, based on the performance metrics shown in FIG. 13, a node requested reshaping of the mesh network in FIG. 15 node 802E may reject the reshaping request and remain communicatively coupled/connected to node 702C. A mesh network topology where node 802E is communicatively connected to node 702C is shown in FIG. 15. If node 802E had not rejected the reshaping request (and did participate in the reshaping), node 802E may be connected to 702D as shown in FIG. 14.

If node 802E does refrain from participation in the reshaping of the mesh network, node 802E may participate in a later reshaping request. For example, the node may wait and participate in a reshaping the next time such a reshaping takes place. The node could also later request a reshaping itself. In another example, the other nodes on the network may wait until the rejecting node is available to reshape. Each node may prepare to reshape so that when the rejecting node is ready to reshape, a reshaping may take place quickly thereafter.

Figure 16:
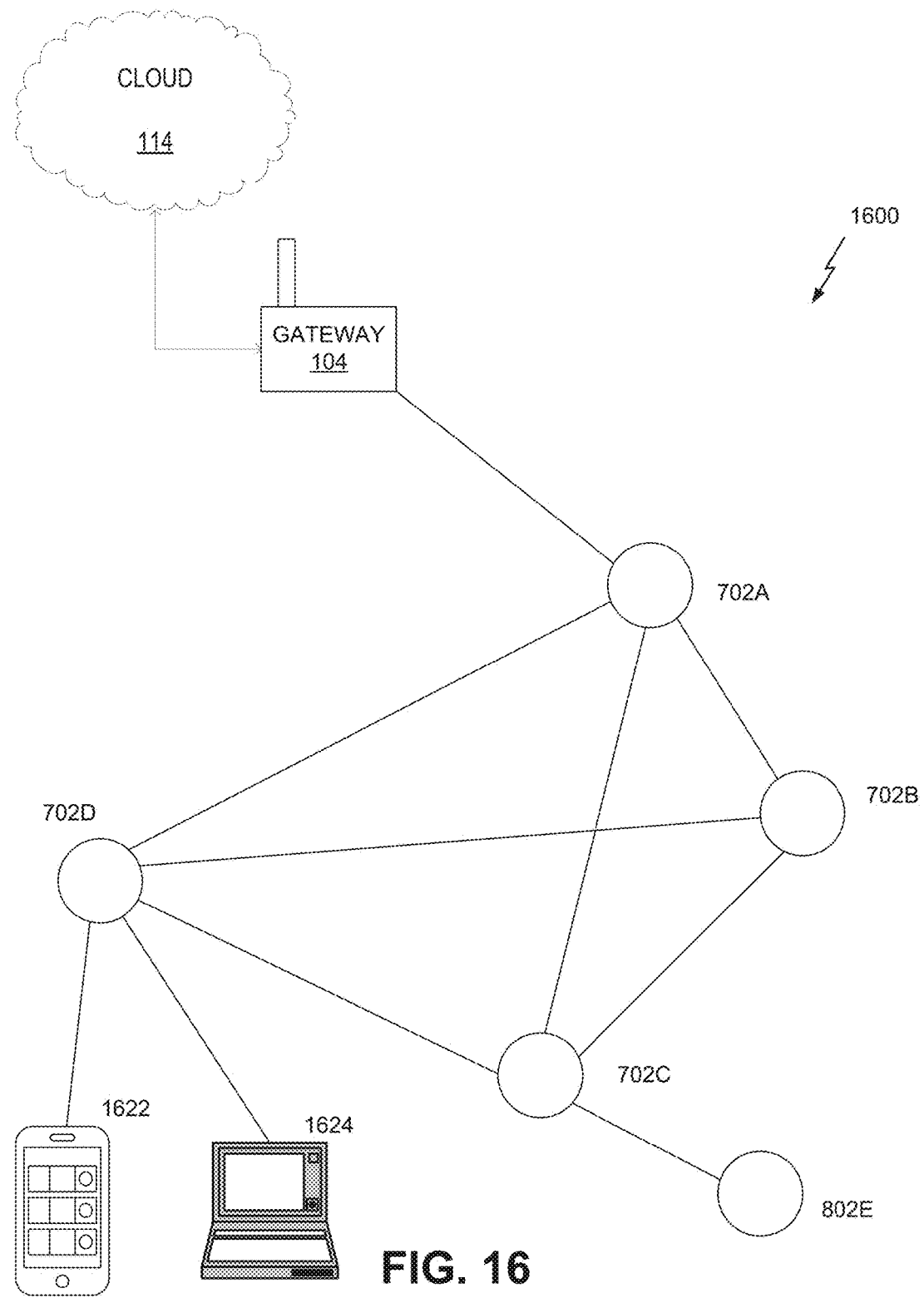
FIG. 16 illustrates a mesh network including five nodes and an access device and computer device connected to a node in the mesh network, according to exemplary embodiments of the present invention.

FIG. 16 illustrates a mesh network 1600 including five nodes and an access device and computer device connected to a node in the mesh network, according to exemplary embodiments of the present invention. Network 1600 includes mesh nodes 702A, 702B, 702C, 702D, and 802E. Connected to node 702D is access device 1622 and computer device 1624. Access device 1622 and/or computer device 1624 may be connected to node 702D via a WiFi connection, among various other types of medium (e.g. Zigbee™, Bluetooth™, WiFi™, IR, cellular, LTE, WiMax™, or the like). Although two devices, access device 1622 and computer device 1624, are connected to node 702D in the exemplary embodiment shown in FIG. 16, various other types and numbers of devices (e.g. wifi capable devices) may be connected to node 702D or any other node within network 1600.

Similar to how each mesh node receives data from other nodes within mesh network 1600, a node connected to a device may also receive data from the computing device. For example, node 702D may receive data from node 702C (and from other nodes within network 1600 via node 702C) and/or from node 702A. Node 702D may also receive data from access device 1622 and/or computer device 1624. For example, access device 1622 and/or computer device 1624 may access the internet by communicating with gateway 104 via nodes 702D and 702A. Furthermore, access device 1622 and/or computer device 1624 may communicate with a different node in network 1600, such as node 702B, 702C or 802E via node 702D. Therefore, each node within mesh network 1600 may receive data from multiple different types of connections, such as, for example, mesh network connections (e.g. between node 702D and 702C) and WiFi connections (e.g. between node 702D and access device 1622). Furthermore, each node that receives data from multiple different types of connections may treat data received from each type of connection differently.

As noted with respect to FIGS. 4-8, each node in a mesh network, according to embodiments of the present invention, may compile performance metrics regarding itself and other nodes in the network, share that data and metrics with the other nodes, and make dynamic decisions regarding which transmission path to use to transmit data through the network and/or to a location external to the network based on that data and metrics. The node may also make similar decisions based on which device sent the data to the node and which type of connection path was used to transmit the data. For example, if node 702D receives data from node 702C (which it will send to node 702A) and data from access device 1622 (which it will also send to node 702A) at the same time, node 702D may determine the order in which data will be send to node 702A based on predetermined (although sometimes dynamically changing) priorities, including the sender of the data (mesh network node vs. external access device, for example) and the type of communication path used to send the data (mesh vs. WiFi, for example).

FIG. 17 illustrates tables 1700, which includes two decision profiles, according to embodiments of the present invention. Tables 1700 include sub-tables 1700A and 1700B. Sub-table 1700A includes a mesh profile with performance metrics for mesh nodes and recommendations for device/node 702D. More specifically, sub-table 1700A includes performance metrics for node 702A, 702B, 702C and 802E for each of four different performance metric categories, including reliability, latency, number of hops, and number of clients. Sub-table 1700A also includes a recommendation including the node, based on the performance metrics for each node, that node 702D should transmit data to for each performance metric category individually, and a recommendation for which node that node 702D should transmit data based on all of the performance metric categories combined. The overall recommendation may be based on the performance metrics for each category and node, as well as predetermined priorities for node 702D related to which categories are most important to node 702D. Therefore, according to sub-table 1700A, node 702D may decide to transmit data to node 702A (for example, if the data is ultimately being transmitted to gateway 104 and a device/network external to network 1600). However, such a decision may be different based on the different type of data being sent.

Sub-table 1700B includes a profile for node 702D that includes priority decisions regarding two different types of data communications, mesh and WiFi, for each of various different kinds of data. A node, such as node 702D, may also make transmission decisions (including decisions about which data to send when) based on which device sent the data to the node and which type of connection path was used to transmit the data. Node 702D may determine the order in which data will be send to node 702A based on predetermined priorities. For example, if node 702A receives data related to streaming video from node 702C (via mesh connection) and streaming video from access device 1622 (via WiFi), table 1700B indicates that node 702D should give priority to the streaming video data for mesh over the streaming video over WiFi.

Although not shown in FIG. 1700B, node 702D may also make similar decisions (based on predetermined priorities) if the types of data received across a mesh network communication (e.g. from node 702C) and across a WiFi communication (e.g. from access device 1622) are different. For example, if the data received across the mesh network communication (e.g. from node 702C) is email traffic data and the data received across a WiFi communication (e.g. from access device 1622) is streaming video data, node 702D may choose to give priority (aka send first) the streaming video data over WiFi because latency in such a transmission may be more problematic for a user of the access device 1622 than for latency of a transmission of email traffic. Such decisions may be made based on various other types of information, including information specific to the current status of the node or any devices connected to the node. For example, if the data received across a WiFi communication (e.g. from access device 1622) is streaming video data and access device 1622 has built up significant buffer so as to allow the user of the access device to view the streaming video for a period of time even if the WiFi communication has latency due to a delay in data delivery by node 702D, then node 702D may choose to give priority to the data received via mesh network from 702C and transmit the email traffic data received across the mesh network communication from node 702C first.

Decisions made between different types of transmissions (e.g. mesh vs. WiFi) may be made dynamically based on dynamically changing circumstances/statuses. More specifically, the different constantly changing variables (e.g. performance data/metrics, location of nodes, status of nodes/network devices, etc.) in both a mesh network and a local area (WiFi) network may cause decisions to be changed from moment to moment. In other words, although the tables shown in FIG. 1700 (and others shown in FIGS. 6, 7, 8 and 10) may illustrate decisions and/or recommendations at a particular point in time, those same decisions (or set of decisions) may not be accurate for a different point in time.

As noted herein, network devices (and mesh network nodes) may share information/data regarding the device's (and node's) performance (e.g. success/failure to perform its tasks) with other devices/nodes on the network, cloud networks, other devices connected to the network device via the Internet, or other devices/networks. Similarly, devices such as access device 1622 and computer device 1624 may also compile information/data regarding its own performance and regarding the performance of the one or more nodes it has connected to (e.g. node 702D). Devices 1622 and 1624 may then share those performance metrics with node 702D and with other nodes on the network to add to the data that both node 702D and other nodes on the network have compiled regarding its own experiences and other nodes' experiences with those nodes. For example, access device 1622 may compile latency information regarding node 702D, which may indicate to access device 1622, and the rest of the network, how node 702D prioritized its data, for various different kinds of data, as compared to other types of data received by node 702D. Such information may be useful to other nodes on the network when deciding whether or not to use a transmission path including node 702D.

Figure 18:
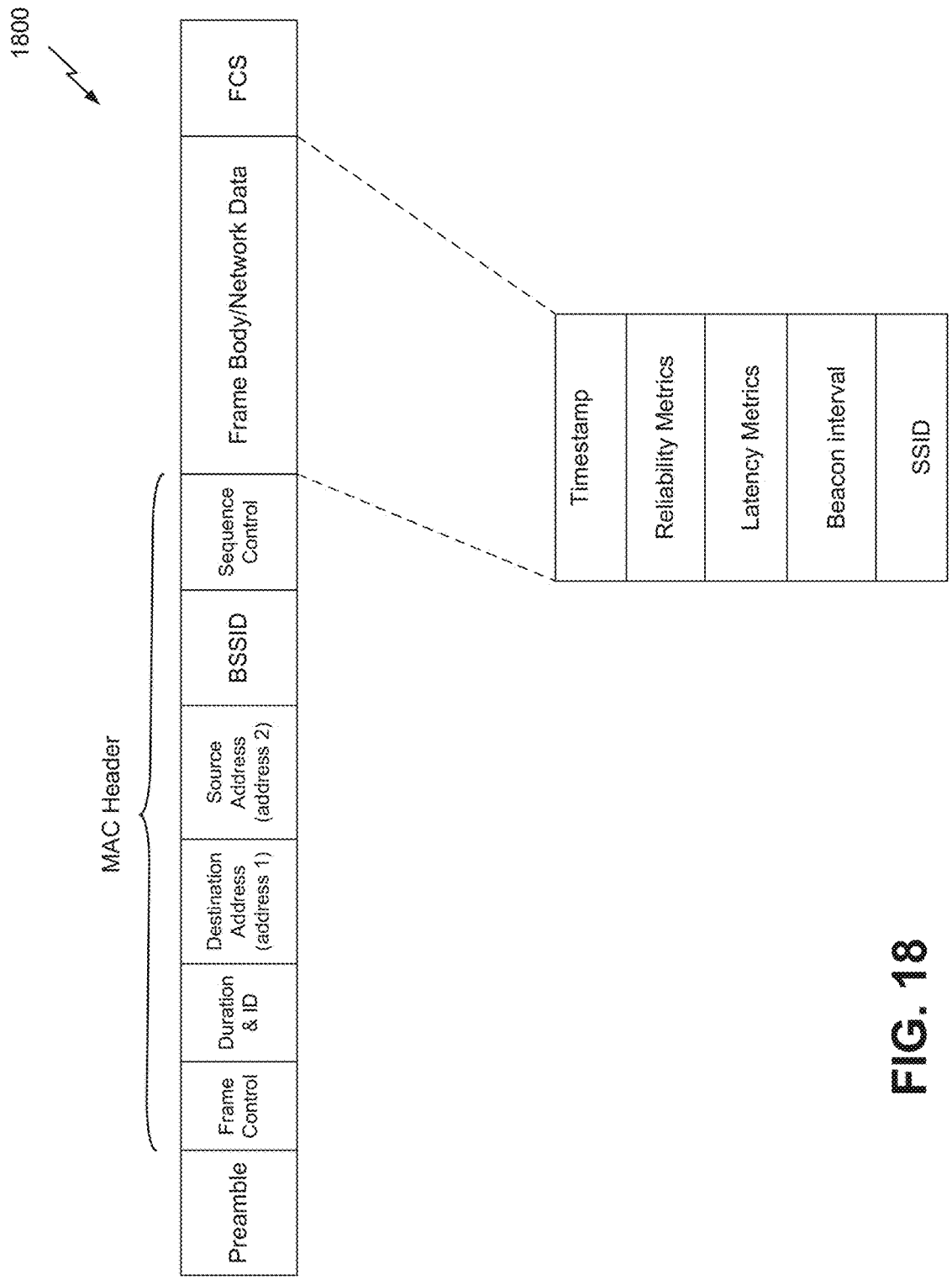
FIG. 18 illustrates a WiFi beacon frame, according to embodiments of the present invention.

FIG. 18 illustrates a WiFi beacon frame 1800, according to embodiments of the present invention. Beacon frame 1800 includes various fields, and each field includes information, such as, for example, information regarding the network in which the beacon frame is being transmitted. For example, beacon frame 1800 may include a MAC header with a destination address and a source address (e.g. the source where the beacon was sent from and the destination of the beacon frame where the beacon frame will be sent to), BSSID (e.g. MAC address of the wireless access point, or wireless AP, in the network), among other fields. Furthermore, beacon frame 1800 includes a frame body/network data field.

Although the information sent via beacon frame 1800 includes consistent, predetermined information about the network (e.g. network 1600), beacon frame 1800 may include empty space within the frame, such as in the frame body, in which nodes in the mesh network (or network devices that represent those nodes) may communicate information to other nodes/devices. For example, as a node within a mesh network compiles performance metrics related to its own performance and the performance of other nodes in the network, the node may transmit that data and/or metrics to other nodes within the network using space within beacon frame 1800. Since beacon frame 1800 carries information regarding the network, such as identification information about the network and devices on the network or to announce the presence of the source of the beacon frame (e.g. a new network device on the network), such beacon frames are sent periodically from node to node (or device to device) within the network. Therefore, any data stored within the beacon frame is "free" and does not require more bandwidth than is already being used by the beacon frame (whereas if, on the other hand, such information/data was being transmitted outside of the beacon frame, it would take up additional network/device bandwidth). Furthermore, any information transmission described herein that is sent from one device to another device within a network (e.g. data across communication paths 624A-624F as shown in FIG. 6) or from one node to another node (e.g. metrics storage 704A-704D transmitted via communication paths 724A-724F as shown in FIG. 7) may be transmitted within a field, such as in the beacon frame's frame body/network data field, of the beacon frame 1800. Although the space within beacon frame 1800 may be limited to a low number of bites (e.g. 4 bites), such data may be spread across multiple beacon frames being sent between the same source and destination. For example, reliability or latency performance metrics for a certain node may be split up into two or more portions and transmitted separately across the same number (two or more) of beacon frames. However, the amount of empty host space within a frame may vary. For example, in alternative embodiments, the "information element" (IE), which is a part of the body part, may host the information, such as performance metrics, sent by the transmitting node. The information element allows up to, for example, 253 bytes of vendor specific information to be included in the broadcast of each management frame. In some embodiments of the present invention, more than one frame may be used to host/carry all of the information being transmitted. In such cases, a sequence number may be included at the beginning of each IE so that any recipients would know whether any frame in a set sequence of frames was lost in transit or that a certain beacon frame is the first, last or another certain beacon frame within the set of beacon frames being sent. Furthermore, other codes or messages may be included in such a beacon frame to relay information to the receiving node or network device. For example, each transmitted beacon frame may include a header before the actual data (e.g. performance metrics). The header may include the type of data being carried by that beacon frame.

Headers or other messages sent before or within a beacon frame may also include requests. For example, a header may include a request for a certain type of performance metric from the receiving node(s). More specifically, if a node is interested in, for example, reliability as its top priority, it may request, in a header within its transmitted beacon frame, a reliability performance metric or set of metrics from one or more other nodes to help the node make its decision about where to send its data. Such a request may allow the node to refrain from transmitting/broadcasting a request throughout the network and/or to refrain from requesting for an unnecessary recalibration/reshaping of the network. Again, if the prioritized performance metric is latency, the node may use the time it takes for each node to respond to it as one or more of its latency performance metrics. In fact, nodes or network devices may take part in conversations between each other using such headers (or other parts) of beacon frames it is already sending, and it may transmit and/or request any information from any other nodes around the network. The transmitting node may transmit this information or request to a specific set of other nodes, or may broadcast them to any nodes that may be able to hear the transmissions.

Any information/data/requests transmitted within a beacon frame may also be secured and protected. For example, to secure the communications, secure keys may be used/required to access the information. For example, the secure keys described with respect to FIGS. 1 and 2, which are used during registration (e.g. for communications during registration) the network devices with the network, may be used. In alternative embodiments, other keys may be generated and used. Network keys (keys specific to the network that the network devices or nodes are a part of) may also be used. Such familiar keys may be used so that only other nodes or network devices that were originally registered and secured with the network registration process may decrypt or decipher them.

The location of data transmitted in a beacon frame, such as beacon frame 1800, may be predetermined such that the destination node/device may know where to look within the beacon frame to find the data stored in the predetermined field of the beacon frame. Alternatively, the source of the beacon frame may transmit, before the beacon frame itself is transmitted, a separate communication to the destination of the beacon frame to identify the location of the data within the beacon frame. Since other parties/devices may not know to look in a beacon frame for hidden/important information (e.g. performance data/metrics), not to mention to look within a specific portion of the beacon frame traditionally used for other types of data/information (e.g. network information), the transmission of such information in beacon frames may generally be secure. Different types of information may also be grouped together within different beacons. For example, one beacon may carry low latency data and another beacon may carry high reliability data.

Other aspects of a WiFi beacon, other than empty space to carry data, may be used to convey information. For example, a node or device may set a predetermined meaning to the length of a beacon, absence of a beacon, pattern of beacons being sent, among other possible indicators. For example, a device may, instead of sending information itself within empty space of a beacon frame to another device, it may send data (the substance of which may not be useful) in a specific size within the beacon frame so that the size conveys information to the recipient.

Beacons may be transmitted if, for example, the relevant network is a WiFi network (including across all known WiFi channels). However, embodiments of the present invention may be implemented within other kinds of networks, such as Bluetooth® signals, Zigbee® signals, Ultra-Wideband (UWB) signals, and/or the like. Therefore, a node or network device may transmit management frames or other protocols other than beacon frames, such as those associated with the particular type of network being used. While embodiments of the present invention may be described with respect to the use of WiFi and beacons being sent to transmit identification and other information from a setup access point to an access device and/or a network device, it is understood that such other protocols may be used with respect to those embodiments.

Figure 19:
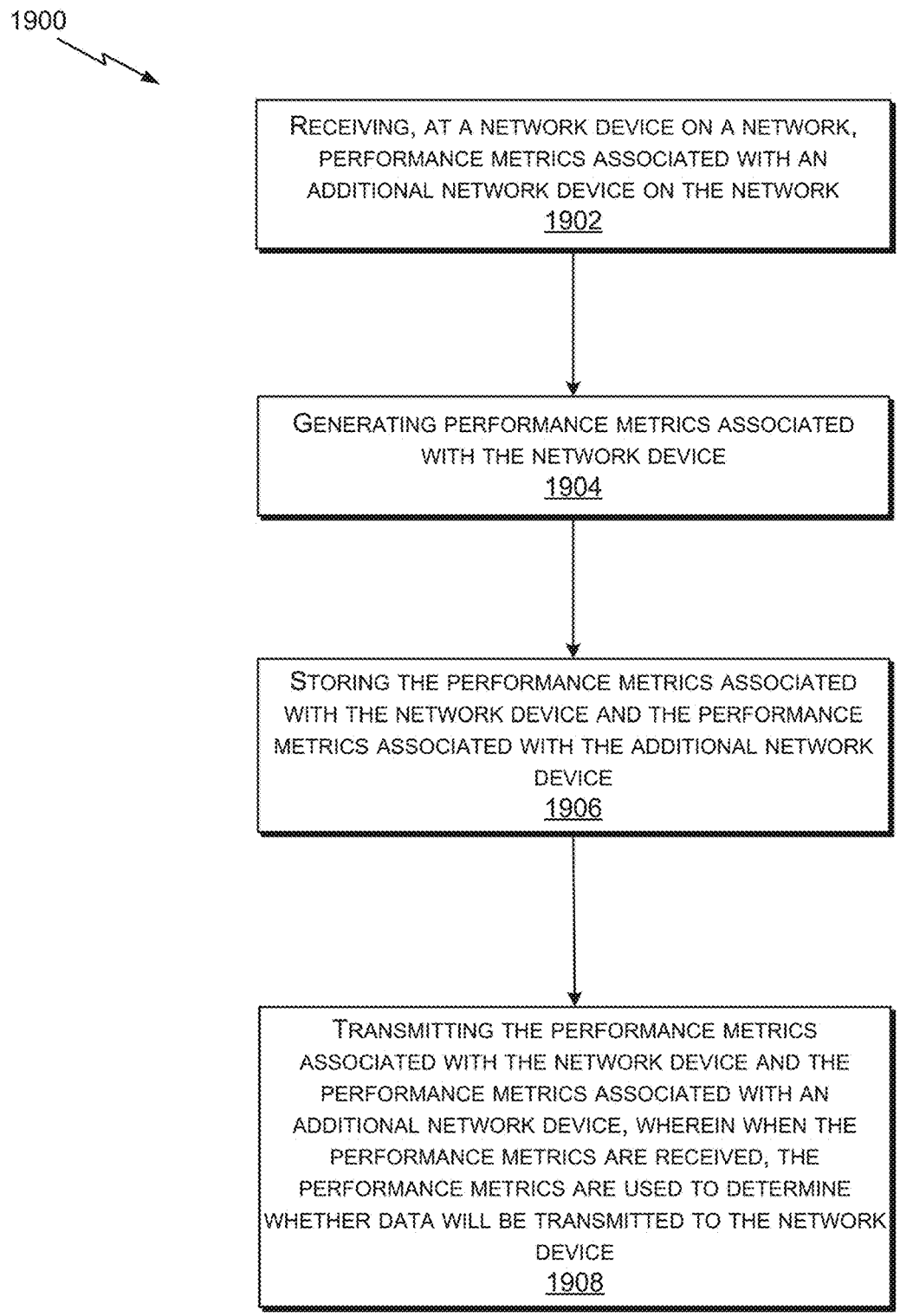
FIG. 19 illustrates a flow chart including an exemplary process for generating and sharing performance metrics among network devices, in accordance with an embodiment.

FIG. 19 illustrates a flow chart 1900 including an exemplary process for generating and sharing performance metrics among network devices, in accordance with an embodiment. Step 1902 includes receiving, at a network device on a network, performance metrics associated with an additional network device on the network. A network device may receive various types of performance metrics from other network devices in the network that the network device is connected to. For example, the performance metrics may include metrics generated by the other network devices about themselves, or received from other network devices.

Step 1904 includes generating performance metrics associated with the network device itself. In other words, a network device may generate performance metrics about itself. For example, a network device may determine the amount of time it takes it to transmit data received from another network device (latency), or how many of the packets from the data received are transmitted by the network device to its next destination (reliability), among other performance metrics categories.

Step 1906 includes storing the performance metrics associated with the network device and the performance metrics associated with the additional network device. The received and generated performance metrics may be stored in storage, e.g. cache, for retrieving at a later time. Historical performance metrics may be stored over time so that the performance metrics may be analyzed, e.g. for patterns or other information.

Step 1908 includes transmitting the performance metrics associated with the network device and the performance metrics associated with an additional network device, wherein when the performance metrics are received, the performance metrics are used to determine whether data will be transmitted to the network device. The network device may transmit performance metrics about itself and other network devices, and both generated by itself and received from other network devices, to other network devices. These performance metrics may help another network device determine whether it will send data to the network device, or to other network devices to which the transmitted performance metrics were related.

Figure 20:
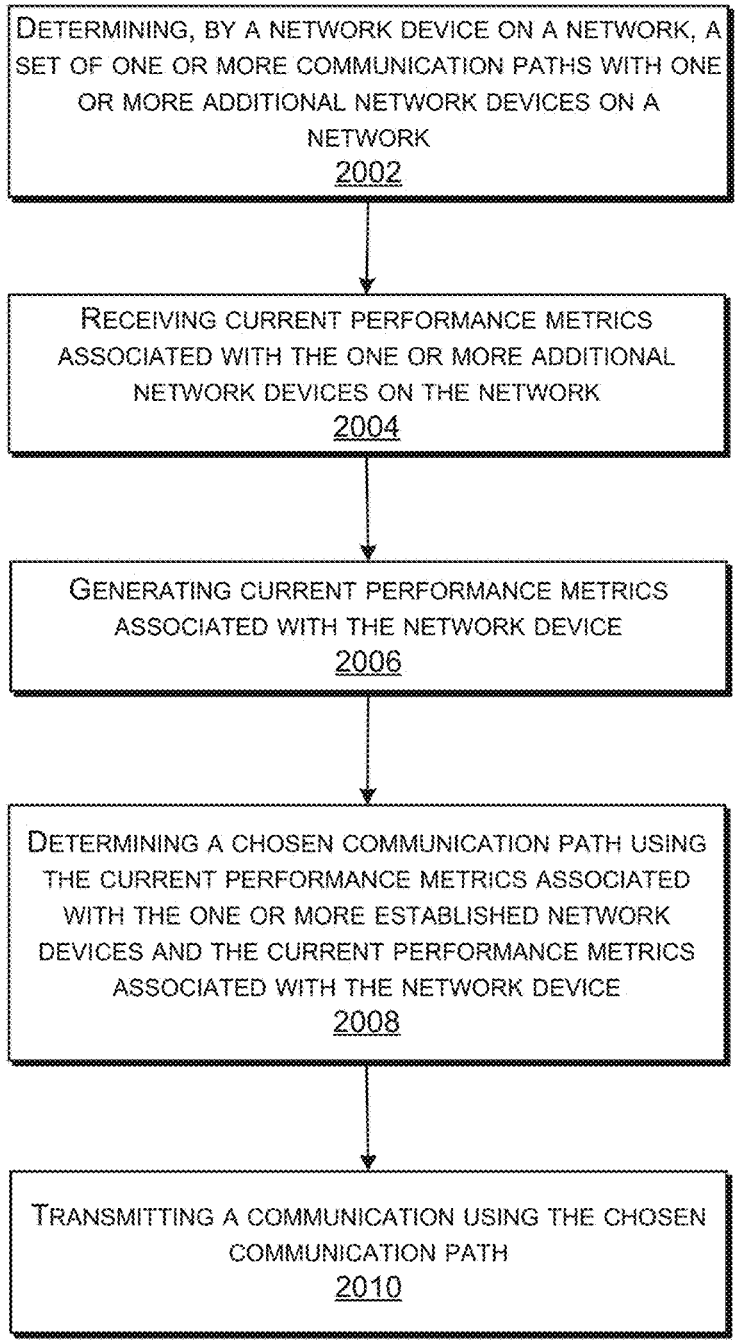
FIG. 20 illustrates a flow chart including an exemplary process for generating and sharing performance metrics among network devices, in accordance with an embodiment.

FIG. 20 illustrates a flow chart 2000 including another exemplary process for generating and sharing performance metrics among network devices, in accordance with an embodiment. Step 2002 includes determining, by a network device on a network, a set of one or more communication paths with one or more additional network devices on a network. A network device may choose to transmit data to any of several other network devices on, for example, the same network as the network device. The network device may use information, both received by it and generated by it, to determine which network device to transmit the data to. Such information may include performance metrics about itself and other network devices.

Step 2004 includes receiving current performance metrics associated with the one or more additional network devices on the network and step 2006 includes generating current performance metrics associated with the network device. As noted, the network device may receive, use and analyze performance metrics associated with itself and other network devices, to determine which network device(s) it will transmit its data to. The network device, or another device such as a cloud network connected to the network device, may analyze the performance metrics to make this determination.

Step 2008 includes determining a chosen communication path using the current performance metrics associated with the one or more established network devices and the current performance metrics associated with the network device. As noted, the network device may compile historical performance metrics over time, both related to itself and related to other devices on the network it is connected to. Such historical (and current) performance metrics may be analyzed to detect patterns, averages, or other analyzed performance metrics to determine which network device the network devices wants to send its data to. Such determinations may be based on its own preferences, its performance, the performance of other network devices, and other factors. Step 2010 includes transmitting a communication using the chosen communication path. The communication may include performance data/metrics or other information. The chosen communication path may be the network device chosen as a result of the analysis performed, either by the network device or another device, as described herein.

Figure 21:
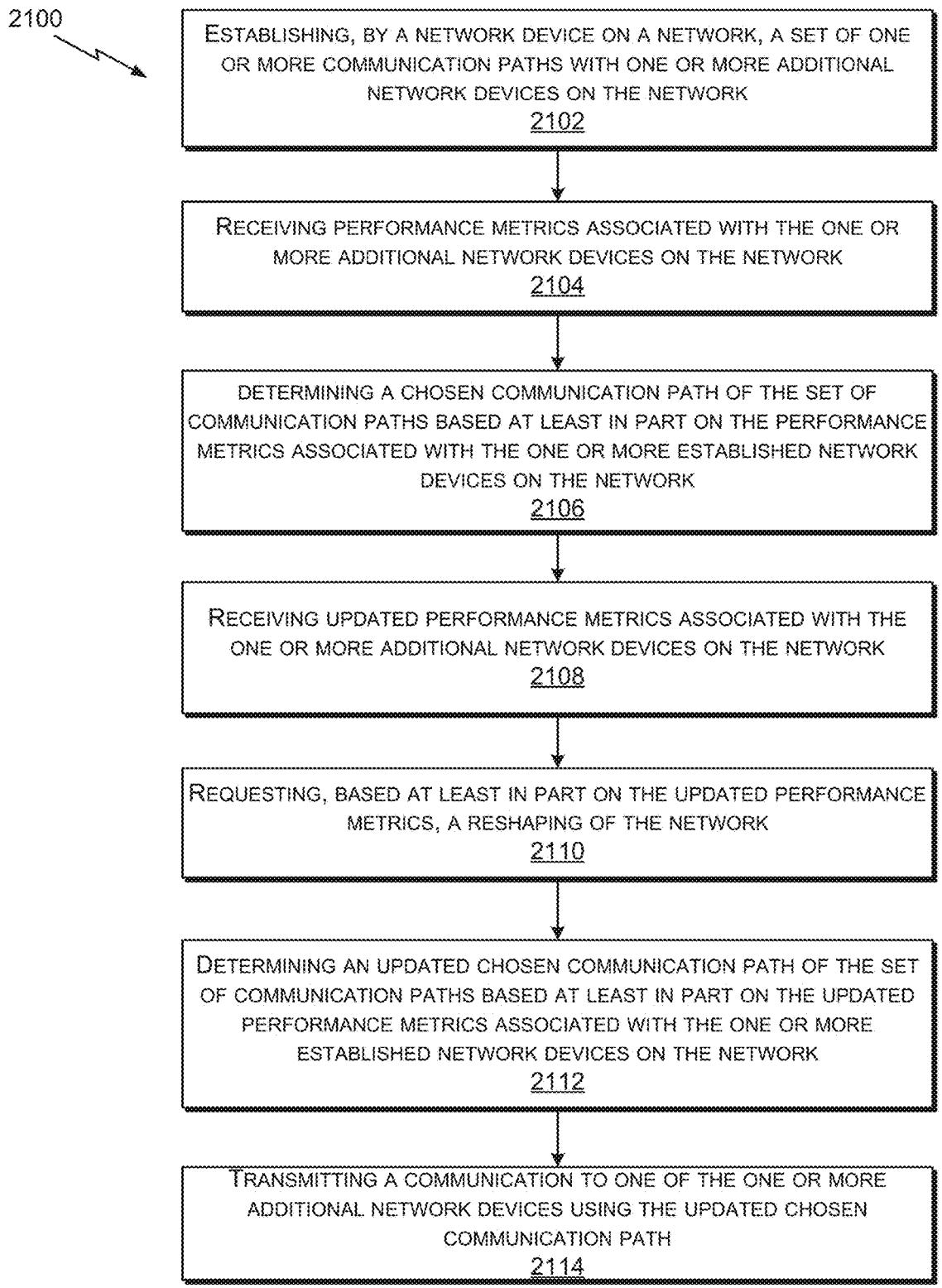
FIG. 21 illustrates a flow chart including an exemplary process for receiving and sharing performance metrics among network devices, in accordance with an embodiment.

FIG. 21 illustrates a flow chart 2100 including another exemplary process for generating and sharing performance metrics among network devices, in accordance with an embodiment. Step 2102 includes establishing, by a network device on a network, a set of one or more communication paths with one or more additional network devices on the network, and step 2102 includes receiving performance metrics associated with the one or more additional network devices on the network. Step 2106 includes determining a chosen communication path of the set of communication paths based at least in part on the performance metrics associated with the one or more established network devices on the network. This determined path may be chosen based on the received performance metrics and other factors related to itself and other network devices. For example, the network device may take into account its preferences and performance metrics associated with and generated by itself.

Step 2108 includes receiving updated performance metrics associated with the one or more additional network devices on the network, and step 2110 includes requesting, based at least in part on the updated performance metrics, a reshaping of the network. The received updated performance metrics, along with other performance metrics received or generated in the past, may cause a network device to request a reshaping of part of all of the network devices in the network because of its analysis of the state of itself, other network devices, or the network as a whole. Each network device may decide to accept the reshaping, deny the reshaping for itself or as a whole, or request a delay in the reshaping, among other options.

Step 2112 includes determining an updated chosen communication path of the set of communication paths based at least in part on the updated performance metrics associated ith the one or more established network devices on the network, and step 2114 includes transmitting a communication to one of the one or more additional network devices using the updated chosen communication path. One or more of the steps in flow chart 2100 (or in any of flow charts 1900, 2000 or 2200) may be optional, or may occur in different orders based on the particular embodiment at issue.

Figure 22:
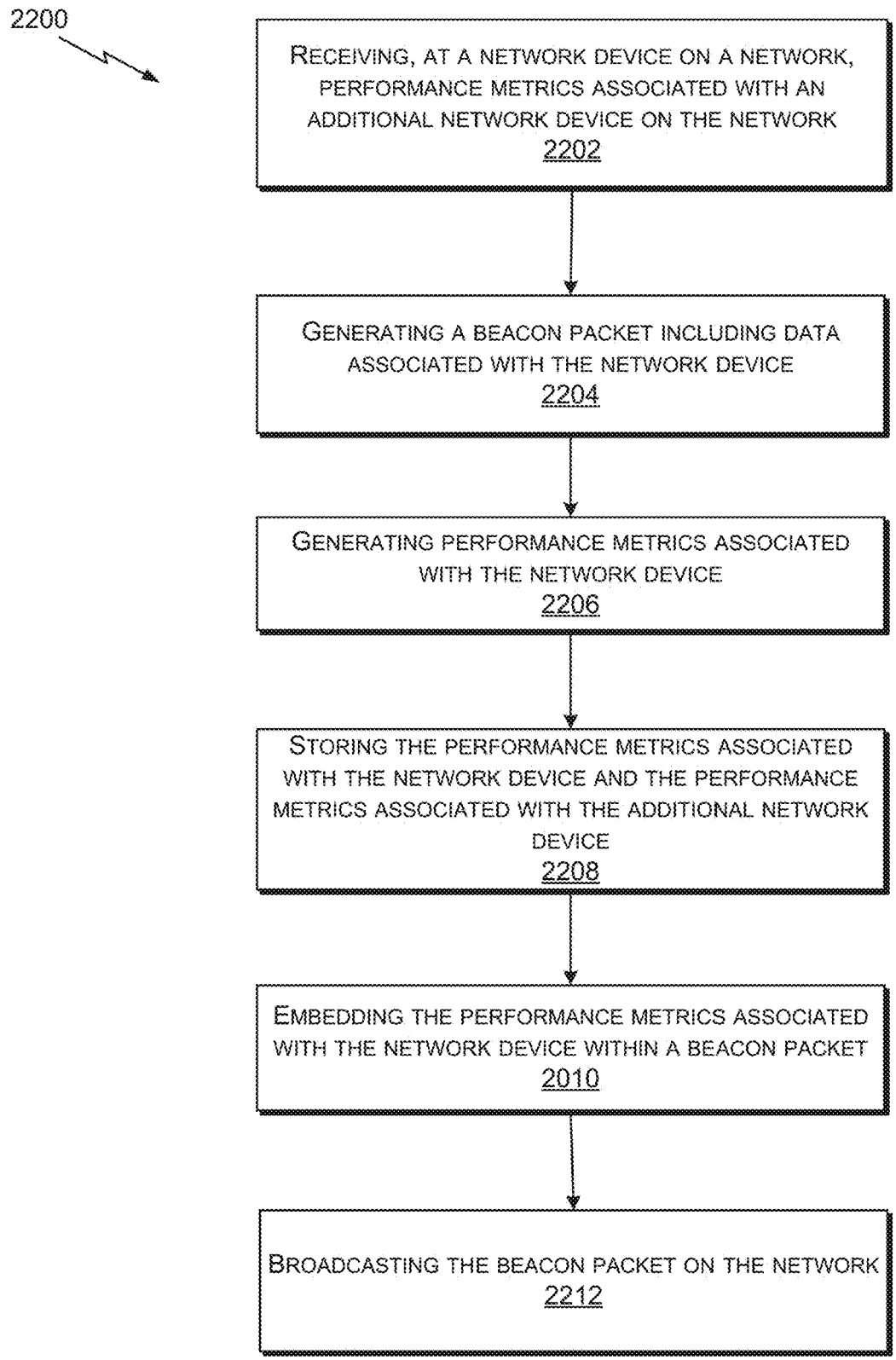
FIG. 22 illustrates a flow chart including an exemplary process for generating and sharing performance metrics among network devices, in accordance with an embodiment.

FIG. 22 illustrates a flow chart 2200 including another exemplary process for generating and sharing performance metrics among network devices, in accordance with an embodiment. Step 2202 includes receiving, at a network device on a network, performance metrics associated with an additional network device on the network. Step 2204 includes generating a beacon packet including data associated with the network device. The beacon packet, which may be generally sent to notify other network devices of the existence of the transmitting network device, may be used to transmit information as well. The beacon packet may be replaced by a different entity for different transmission methods.

Step 2206 includes generating performance metrics associated with the network device, step 2208 includes storing the performance metrics associated with the network device and the performance metrics associated with the additional network device, and step 2010 includes embedding the performance metrics associated with the network device within the beacon packet, such as the beacon packet generated in step 2204. As noted, a beacon packet may be used to transmit information/data to other network devices, for example using empty space within the beacon packet.

After the beacon packet includes information meant by the network device to be transmitted, the network device may transmit the beacon packet on the network (e.g. to other network device(s) on the network). The network device may also receive similar beacon packets with information from other network devices around the network.

Figure 23:
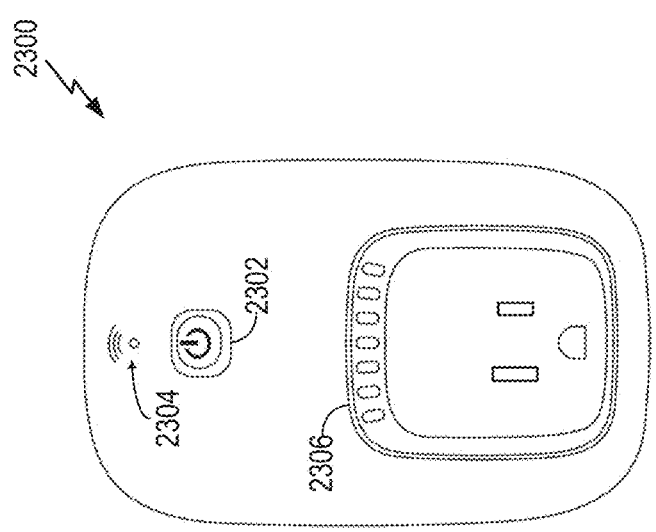
FIG. 23 is an illustration of an example of a front view of a network device in accordance with an embodiment of the present invention.
Figure 24:
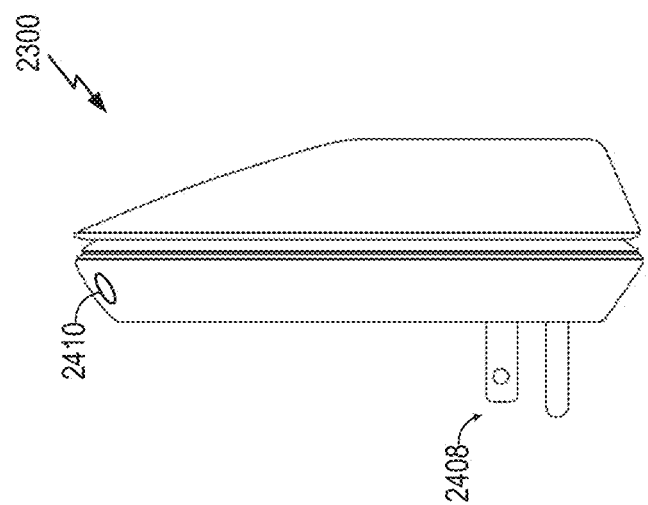
FIG. 24 is an illustration of an example of a side view of a network device in accordance with an embodiment.

FIG. 23 illustrates an example of a front view of a network device 2300. FIG. 24 illustrates an example of a side view of the network device 2300. The network device 2300 may include any of the network devices 102, 104, or 106 described herein. In some embodiments, the network device 2300 may be a home automation network device. For example, the network device 2300 may include a home automation switch that may be coupled with a home appliance. A user may wirelessly access the network device 2300 in order to access, control, and/or configure various home appliances located within the user's home. For instance, the user may remotely control appliances such as a television, radio, light, microwave, iron, space heater, wall A/C unit, washer, dryer, fan, and/or the like.

In some embodiments, the network device 2300 may include a WiFi enabled switch that connects home appliances and other electronic devices to a compatible 802.11b/g/n/ac WiFi network. The network device 2300 may thus allow users to locally or remotely turn devices on or off from anywhere, program customized notifications, and/or change device status. The network device 2300 may further allow a user to create custom schedules or have devices respond to sunrise or sunset.

The network device 2300 includes an power switch 2302 that may be depressed in order to turn the network device 2300 on and off. In some embodiments, a light source may be integrated with or located behind the power switch. For example, a light-emitting diode (LED) may be located on a circuit board under the power button 2302. The light source may be illuminated when the network device 2300 is powered on, and may not be illuminated when the network device 2300 is powered off.

The network device 2300 further includes a communications signal indicator 2304. The signal indicator 2304 may indicate whether the network device 2300 has access to a communications signal, such as a WiFi signal. For example, the signal indicator 2304 may include a light source (e.g., a LED) that illuminates when the network device 2300 is connected to a communications signal. The light source may depict different colors or other characteristics (e.g., flashing, dimming, or the like) to indicate different levels of signal strength or mode of operation.

The network device 2300 includes a restore button 2410. The restore button 2410 may allow a user to reset the network device 2300 to factory default settings. For example, upon being depressed, the restore button 2410 may cause all software on the device to be reset to the settings that the network device 2300 included when purchased from the manufacturer.

The network device 2300 further includes a plug 2408 and an outlet 2306. The plug 2408 allows the network device 2300 to be plugged into a wall socket, such as a socket providing 120V, 220V, or the like. In turn, an appliance may be plugged into the outlet 2306. Once the network device 2300 is registered according to the techniques described above, an appliance plugged into the socket 2306 may be controlled by a user using an access device (e.g., access device 108).

Figure 25:
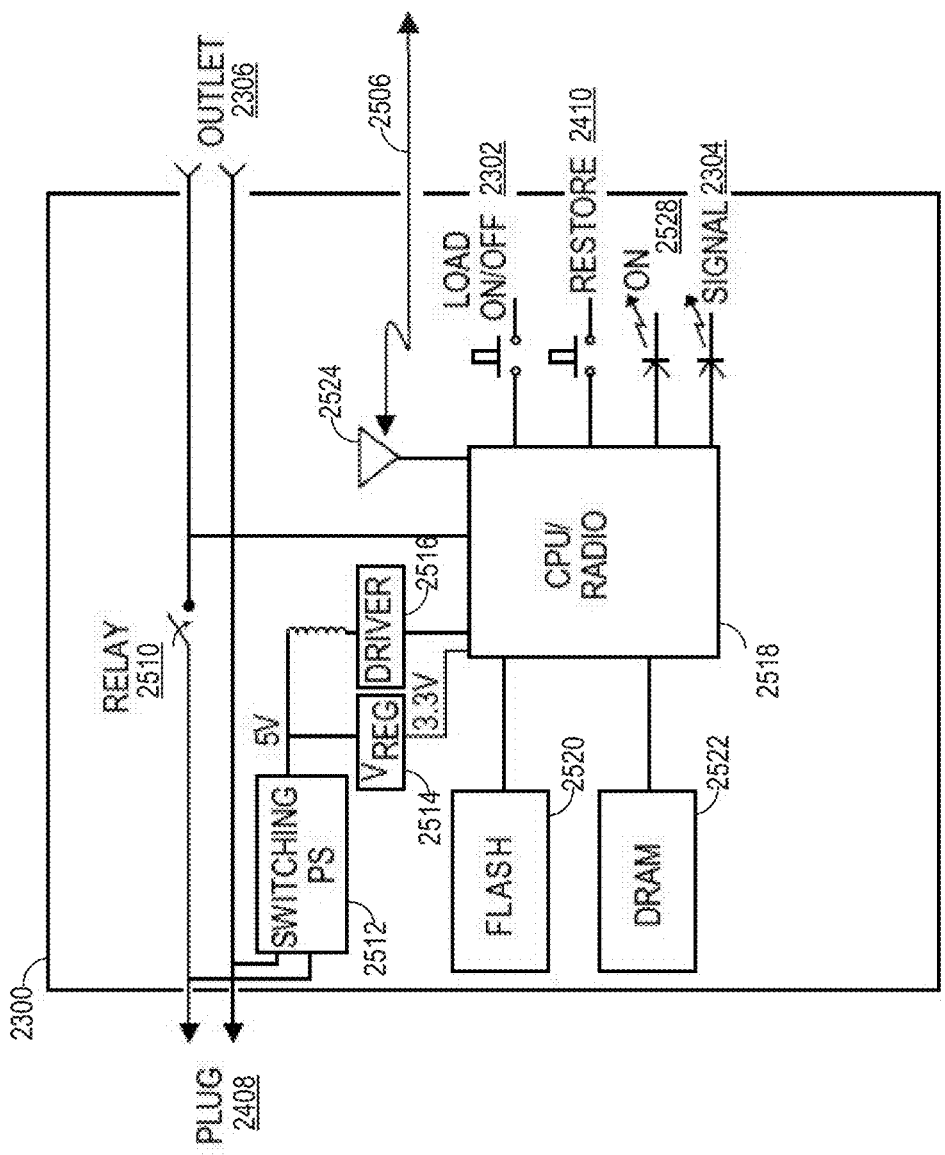
FIG. 25 is an example of a block diagram of a network device, in accordance with an embodiment.

FIG. 25 is an example of a block diagram of the network device 2300 depicting different hardware and/or software components of the network device 2300. As described above with respect to FIGS. 23 and 24, the network device 2300 includes the outlet 2306, the plug 2408, the power button 2302, the restore button 2410, and the communications signal indicator 2304. The network device 2300 also includes light source 2528 associated with the power button 2302. As previously described, the light source 2528 may be illuminated when the network device 2300 is powered on.

The network device 2300 further includes a relay 2510. The relay 2510 is a switch that controls whether power is relayed from the plug 2408 to the outlet 2306. The relay 2510 may be controlled either manually using the power button 2302 or remotely using wireless communication signals. For example, when the power button 2302 is in an ON position, the relay 2510 may be closed so that power is relayed from the plug 2408 to the outlet 2306. When the power button 2302 is in an OFF position, the relay 2510 may be opened so that current is unable to flow from the plug 2408 to the outlet 2306. As another example, an application or program running on an access device may transmit a signal that causes the relay 2510 to be opened or closed. For instance, an access application may display a graphical interface on the access device that includes a power button. The user may tap or otherwise select the power button, and the access application may send a communication signal (e.g., over a WiFi network) to the network device 2300 instructing the network device 2300 to open or close the relay 2510.

The network device 2300 further includes flash memory 2520 and dynamic random access memory (DRAM) 2522. The flash memory 2520 may be used to store instructions or code relating to an operating system, one or more applications, and any firmware. The flash memory 2520 may include nonvolatile memory so that any firmware or other program can be can updated. In the event the network device 2300 loses power, information stored in the flash memory 2520 may be retained. The DRAM 2522 may store various other types of information needed to run the network device 2300, such as all runtime instructions or code.

The network device 2300 further includes a CPU/Radio 2518. The CPU/Radio 2518 controls the operations of the network device 2300. For example, the CPU/Radio 2518 may execute various applications or programs stored in the flash memory 2520 and/or the dynamic random access memory (DRAM) 2522. The CPU/Radio 2518 may also receive input from the various hardware and software components, interpret the input, and perform one or more functions in response to the input. As one example, the CPU/Radio 2518 may determine whether the power button 2302 has been pressed, and determines whether the relay 2510 needs to be opened or closed. The CPU/Radio 2518 may further perform all communications functions in order to allow the network device 2300 to communicate with other network devices, one or more gateways, a cloud network, and/or one or more access devices. While the CPU and radio of the network device 2300 are shown to be combined in the CPU/Radio 2518, one of ordinary skill in the art will appreciate that, in some embodiments, the CPU and radio may be separately located within the network device 2300. For example, CPU circuitry may be situated at a separate location on a circuit board from the location of radio circuitry, the CPU circuitry may be located on a different circuit board from the radio circuitry, or the like.

The network device 2300 may communicate with other devices and/or networks via antenna 2524. For example, antenna 2524 may include a 2.4 GHz antenna, a 5 GHz antenna, or the like, that can transmit and receive WiFi communications signals. The antenna 2524 may include other types of antennas that can communicate Bluetooth® signals, Zigbee® signals, Ultra-Wideband (UWB) signals, and/or the like. In some embodiments, the network device 2300 may include multiple antennas for communicating different types of communication signals. As one example, the network device 2300 may include both a 2.4 GHz antenna and a 5 GHz antenna.

The network device 2300 further includes a driver 2516, a switching power supply 2512, and a voltage regulator 2514. The driver 2516 may include instructions or code that can be used to translate control signals or commands received from applications running on the DRAM 2522 to commands that the various hardware components in the network device 2300 can understand. In some embodiments, the driver 2516 may include an ambient application running on the DRAM 2522. The switching power supply 2512 may be used to transfer power from the outlet in which the plug 2408 is connected to the various loads of the network device 2300 (e.g., CPU/Radio 2518). The switching power supply 2512 may efficiently convert the voltage and current characteristics of the electrical power to a level that is appropriate for the components of the network device 2300. For example, the switching power supply 2512 may perform AC-DC conversion. In some embodiments, the switching power supply 2512 may be used to control the power that is relayed from the plug 2408 to the outlet 2306. The voltage regulator 2514 may be used to convert the voltage output from the switching power supply 2512 to a lower voltage usable by the CPU/Radio 2518. For example, the voltage regulator 2514 may regulate the DC voltage from 5V to 3.3V.

In various embodiments, functions may be stored as one or more computer-program products, such as instructions or code, in a non-transitory machine-readable storage medium, such as the flash memory 2520 and/or the DRAM 2522. The network device 2300 can also comprise software elements (e.g., located within the memory), including, for example, an operating system, device drivers, executable libraries, and/or other code, such as one or more application programs, which may comprise computer programs implementing the functions provided by various embodiments, and/or may be designed to implement methods and/or configure systems, as described herein. Merely by way of example, one or more procedures described with respect to the processes discussed above, for example as described with respect to FIG. 2, may be implemented as code and/or instructions executable by a computer (and/or a processor within a computer); in an aspect, then, such code and/or instructions can be used to configure and/or adapt a general purpose computer (or other device) to perform one or more operations in accordance with the described methods. Such functions or code may include code to perform the steps described above with respect to FIG. 2. The memory, such as the flash memory 2520 and/or the DRAM 2522, may be a processor-readable memory and/or a computer-readable memory that stores software code (programming code, instructions, etc.) configured to cause a processor(s) within the CPU/Radio 2518 to perform the functions described. In other embodiments, one or more of the functions described may be performed in hardware.

A set of these instructions and/or code might be stored on a non-transitory machine-readable storage medium, such as the flash memory 2520 and/or the DRAM 2522. In some cases, the storage medium might be incorporated within a computer system, such as the CPU/Radio 2518. In other embodiments, the storage medium might be separate from a computer system (e.g., a removable medium, such as a compact disc), and/or provided in an installation package, such that the storage medium can be used to program, configure and/or adapt a general purpose computer with the instructions/code stored thereon. These instructions might take the form of executable code, which is executable by the network device 2300 and/or might take the form of source and/or installable code, which, upon compilation and/or installation on the network device 2300 (e.g., using any of a variety of generally available compilers, installation programs, compression/decompression utilities, etc.) then takes the form of executable code.

Substantial variations may be made in accordance with specific requirements. For example, customized hardware might also be used, and/or particular elements might be implemented in hardware, software (including portable software, such as applets, etc.), or both. Further, connection to other access or computing devices such as network input/output devices may be employed.

It should be appreciated that the network device 2300 may have other components than those depicted in FIGS. 24-25. Further, the embodiment shown in the figures are only one example of a network device that may incorporate an embodiment of the invention. In some other embodiments, network device 2300 may have more or fewer components than shown in the figure, may combine two or more components, or may have a different configuration or arrangement of components.

Figure 26:
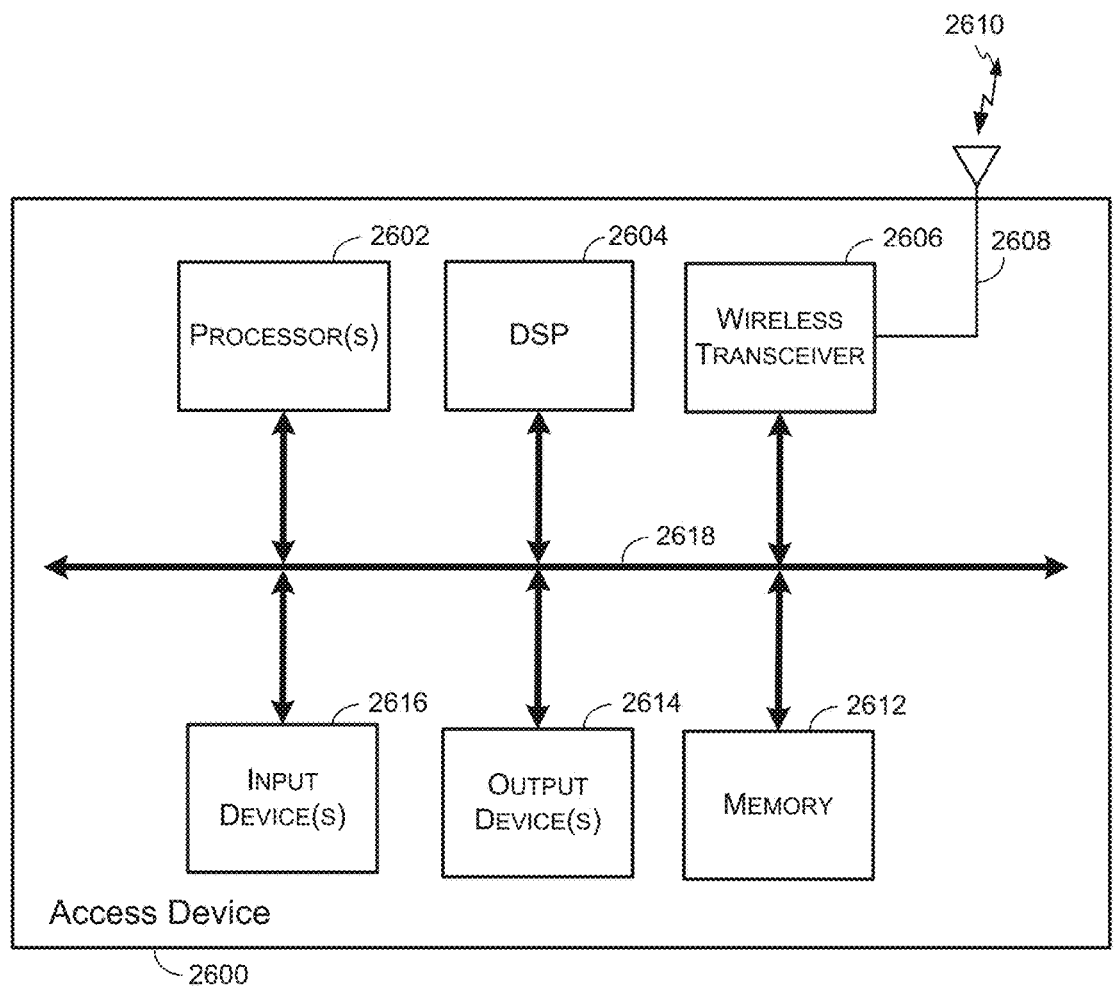
FIG. 26 is a block diagram illustrating an example of an access device, in accordance with some embodiments.

FIG. 26 illustrates an example of an access device 2600. The access device 2600 may include any human-to-machine interface with network connection capability that allows access to a network. For example, the access device 2600 may include a stand-alone interface (e.g., a cellular telephone, a smartphone, a home computer, a laptop computer, a tablet, a personal digital assistant (PDA), a computing device, a wearable device such as a smart watch, a wall panel, a keypad, or the like), an interface that is built into an appliance or other device (e.g., television, refrigerator, security system, game console, browser, or the like), a speech or gesture interface (e.g., Kinect™ sensor, Wiimote™, or the like), an internet of things (IoT) device interface (e.g., an Internet enabled appliance such as a wall switch, a control interface, or the like). The access device 2600 includes hardware elements that can be electrically coupled via a bus 2618 (or may otherwise be in communication, as appropriate). In one embodiment, the bus 2618 can be used for the processor(s) 2602 to communicate between cores and/or with the memory 2612. The hardware elements may include one or more processors 2602, including without limitation one or more general-purpose processors and/or one or more special-purpose processors (such as digital signal processing chips, graphics acceleration processors, and/or the like); one or more input devices 2616, which can include without limitation a camera, a mouse, a keyboard, a touch sensitive screen, a touch pad, a keypad, and/or the like; and one or more output devices 2614, which can include, without limitation, a display, a printer, and/or the like.

The access device 2600 may include one or more wireless transceivers 2606 connected to the bus 2618. The wireless transceiver 2606 may be operable to receive wireless signals (e.g., signal 2610) via antenna 2608. The wireless signal 2610 may be transmitted via a wireless network. In some embodiments, the wireless network may be any wireless network such as a wireless local area network (e.g., local area network 100), such as WiFi, a Personal Access Network (PAN), such as Bluetooth® or Zigbee®, or a cellular network (e.g. a GSM, WCDMA, LTE, CDMA2000 network). Wireless transceiver 2606 may be configured to receive various radio frequency (RF) signals (e.g., signal 2610) via antenna 2608 from one or more gateways, network devices, other access devices, cloud networks, and/or the like. Access device 2600 may also be configured to decode and/or decrypt, via the DSP 2604 and/or processor(s) 2602, various signals received from one or more gateways, network devices, other access devices, cloud networks, and/or the like.

The access device 2600 may further include (and/or be in communication with) one or more non-transitory machine-readable storage mediums or storage devices (e.g., memory 2612), which can comprise, without limitation, local and/or network accessible storage, and/or can include, without limitation, a disk drive, a drive array, an optical storage device, a solid-state storage device such as a random access memory ("RAM") and/or a read-only memory ("ROM"), which can be programmable, flash-updateable and/or the like. Such storage devices may be configured to implement any appropriate data storage, including without limitation, various file systems, database structures, and/or the like.

In various embodiments, functions may be stored as one or more computer-program products, such as instructions or code, in memory 2612, such as RAM, ROM, FLASH, or disc drive, and executed by processor(s) 2602 or DSP 2604. The access device 2600 can also comprise software elements (e.g., located within the memory 2612), including, for example, an operating system, device drivers, executable libraries, and/or other code, such as one or more application programs, which may comprise computer programs implementing various functions. Memory 2612 may be a non-transitory machine-readable storage medium, processor-readable memory, and/or a computer-readable memory that stores the one or more computer-program products configured to cause the processor(s) 2602 and/or DSP 2604 to perform the various functions. In other embodiments, the various functions described may be performed in hardware.

Figure 27:
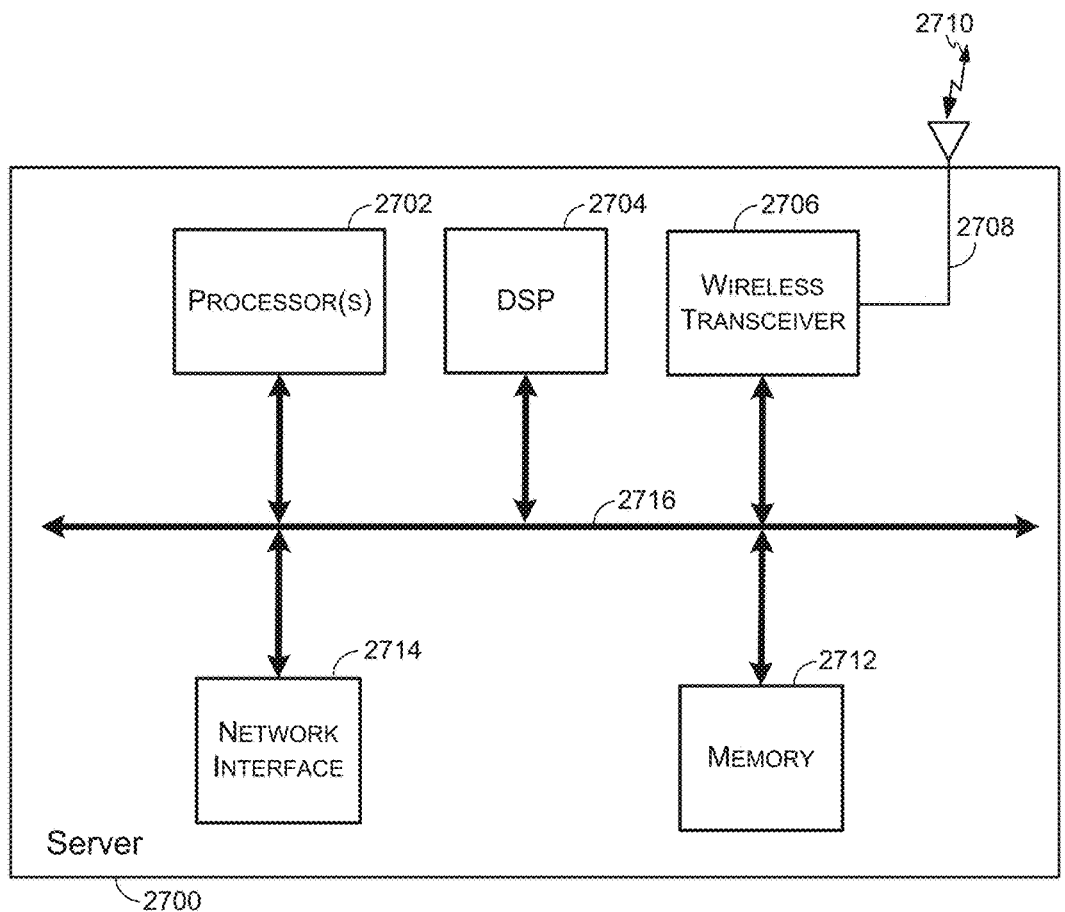
FIG. 27 is a block diagram illustrating an example of a server, in accordance with some embodiments.

FIG. 27 illustrates an example of a server 2700. The server 2700 includes hardware elements that can be electrically coupled via a bus 2716 (or may otherwise be in communication, as appropriate). In one embodiment, the bus 2716 can be used for the processor(s) 2702 to communicate between cores and/or with the memory 2712. The hardware elements may include one or more processors 2702, including without limitation one or more general-purpose processors and/or one or more special-purpose processors (such as digital signal processing chips, graphics acceleration processors, and/or the like), memory 2712, DSP 2704, a wireless transceiver 2706, a bus 2716, and antenna 2708. Furthermore, in addition to the wireless transceiver 2706, server 2700 can further include a network interface 2714 to communicate with a network (e.g., a local area network, a network of a preferred carrier, Internet, etc.).

The server 2700 may further include (and/or be in communication with) one or more non-transitory machine-readable storage mediums or storage devices (e.g., memory 2712), which can comprise, without limitation, local and/or network accessible storage, and/or can include, without limitation, a disk drive, a drive array, an optical storage device, a solid-state storage device such as a random access memory ("RAM") and/or a read-only memory ("ROM"), which can be programmable, flash-updateable and/or the like. Such storage devices may be configured to implement any appropriate data storage, including without limitation, various file systems, database structures, and/or the like.

In various embodiments, functions may be stored as one or more one or more computer-program products, such as instructions or code, in memory 2712. The server 2700 can also comprise software elements (e.g., located within the memory), including, for example, an operating system, device drivers, executable libraries, and/or other code, such as one or more application programs, which may comprise computer programs implementing the functions provided by various embodiments, and/or may be designed to implement methods and/or configure systems, as described herein. Merely by way of example, one or more procedures described with respect to the processes discussed above may be implemented as code and/or instructions executable by a computer (and/or a processor within a computer); in an aspect, then, such code and/or instructions can be used to configure and/or adapt a general purpose computer (or other device) to perform one or more operations in accordance with the described methods. Such functions or code may include code to perform the steps described above with respect to FIG. 2. The memory 2712 may be a non-transitory machine-readable storage medium, processor-readable memory, and/or a computer-readable memory that stores the one or more computer-program products configured to cause the processor(s) 2702 to perform the functions described. In other embodiments, one or more of the functions described may be performed in hardware.

A set of these instructions and/or code might be stored on a non-transitory machine-readable storage medium, such as the memory 2712. In some cases, the storage medium might be incorporated within a computer system. In other embodiments, the storage medium might be separate from a computer system (e.g., a removable medium, such as a compact disc), and/or provided in an installation package, such that the storage medium can be used to program, configure and/or adapt a general purpose computer with the instructions/code stored thereon. These instructions of one or more computer-program products might take the form of executable code, which is executable by the server 2700 and/or might take the form of source and/or installable code, which, upon compilation and/or installation on the server 2700 (e.g., using any of a variety of generally available compilers, installation programs, compression/decompression utilities, etc.) then takes the form of executable code.

Figure 28:
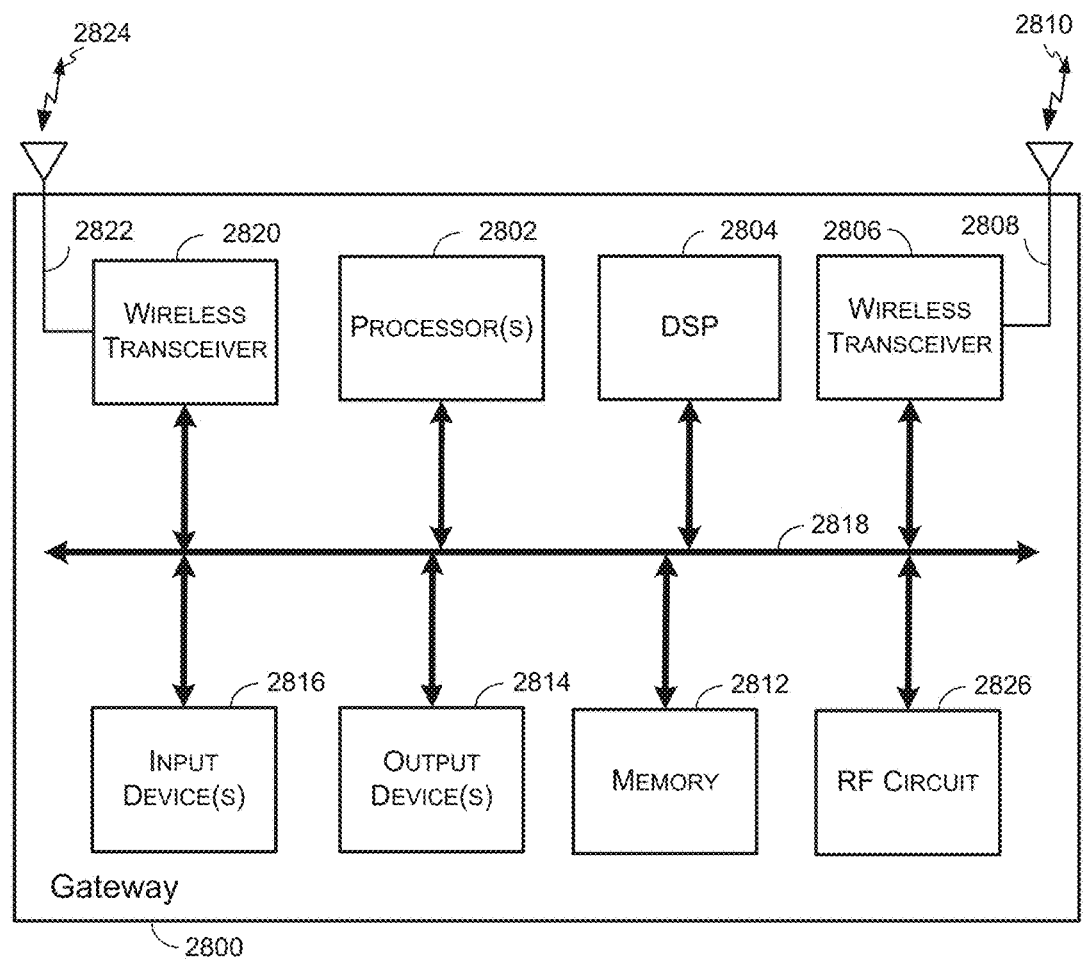
FIG. 28 is a block diagram illustrating an example of a gateway, in accordance with some embodiments.

FIG. 28 illustrates an example of a gateway 2800. The gateway 2800 may include a range extending device, a router, an access point, a modem, and/or any other device that provides network access among one or more computing devices and/or external networks. For example, the gateway 2800 may include a router gateway with access point and router functionality, and may further include an Ethernet switch and/or a modem. As another example, the gateway 2800 may include a range extending gateway that may be used to improve signal range and strength within a network by taking an existing signal from another gateway (e.g., a router gateway, an access point, or the like) and rebroadcasting the signal to create a second logical network.

The gateway 2800 includes hardware elements that can be electrically coupled via a bus 2818 (or may otherwise be in communication, as appropriate). In one embodiment, the bus 2818 can be used for the processor(s) 2802 to communicate between cores and/or with the memory 2812. The hardware elements may include one or more processors 2802, including without limitation one or more general-purpose processors and/or one or more special-purpose processors (such as digital signal processing chips, graphics acceleration processors, and/or the like); one or more input devices 2816, which can include without limitation one or more buttons, a keyboard, a keypad, a touch sensitive screen, a touch pad, and/or the like; and one or more output devices 2814, which can include, without limitation, a display, light or sound indicators, and/or the like.

The gateway 2800 may include one or more wireless transceivers 2806 and 2820 connected to the bus 2818. The wireless transceiver 2806 may be operable to receive wireless signals (e.g., a wireless signal 2810) via an antenna 2808. The wireless transceivers 2820 may be operable to receive wireless signals (e.g., a wireless signal 2814) via an antenna 2822. The wireless transceivers 2806 and 2820 may each include a WiFi transceiver radio designed to transmit and receive signals using frequencies of a specific frequency band, which may be referred to herein as "WiFi circuits." For example, wireless transceiver 2806 may include a 2.4 GHz WiFi circuit, and wireless transceiver 2820 may include a 5 GHz WiFi circuit. Accordingly, the gateway 2800 may include a single WiFi circuit for a first WiFi frequency band, and a single WiFi circuit for a second WiFi frequency band. In some embodiments, the gateway 2800 may include multiple wireless transceivers (not shown) for each available frequency band. The antennas 2808 and 2822 may include multiple band antennas that can transmit and/or receive signals over different frequency bands.

The gateway 2800 may further include radio frequency (RF) circuit 2826. In some embodiments, the wireless transceivers 2806 and 2820 may be integrated with or coupled to the RF circuit 2826 so that the RF circuit 2826 includes the wireless transceivers 2806 and 2820. In some embodiments, the wireless transceivers 2806 and 2820 and the RF circuit 2826 are separate components. The RF circuit 2826 may include a RF amplifier that may amplify signals received over antennas 2808 and 2822. The RF circuit 2826 may also include a power controller that may be used to adjust signal amplification by the RF amplifier. The power controller may be implemented using hardware, firmware, software, or any combination thereof.

The wireless signals 2810 and 2824 may be transmitted via a wireless network. In some embodiments, the wireless network may be any wireless network such as a wireless local area network (e.g., local area network 100), such as WiFi™, a Personal Access Network (PAN), such as Bluetooth® or Zigbee®, or a cellular network (e.g. a GSM, WCDMA, LTE, CDMA2000 network). Wireless transceivers 2806 and 2820 may be configured to receive various radio frequency (RF) signals (e.g., signals 2810 and 2824) via antennas 2808 and 2824, respectively, from one or more other gateways, access devices, network devices, cloud networks, and/or the like. Gateway 2800 may also be configured to decode and/or decrypt, via the DSP 2804 and/or processor(s) 2802, various signals received from one or more gateways, network devices, cloud networks, and/or the like.

The gateway 2800 may include a power supply (not shown) that can power the various components of the gateway 2800. The power supply may include a switch-mode power supply, a linear power supply, a push-pull power supply, or any other suitable type of power supply. In some embodiments, the gateway 2800 may include multiple power supplies. For example, a switch-mode power supply may be used to condition input power, and a linear power supply may be used to power the RF circuit 2826. The power supply may be configured to operate over various ranges of appropriate input voltages.

The gateway 2800 may further include (and/or be in communication with) one or more non-transitory machine-readable storage mediums or storage devices (e.g., memory 2812), which can comprise, without limitation, local and/or network accessible storage, and/or can include, without limitation, a disk drive, a drive array, an optical storage device, a solid-state storage device such as a random access memory ("RAM") and/or a read-only memory ("ROM"), which can be programmable, flash-updateable and/or the like. Such storage devices may be configured to implement any appropriate data storage, including without limitation, various file systems, database structures, and/or the like.

In various embodiments, functions may be stored as one or more computer-program products, such as instructions or code, in memory 2812, such as RAM, ROM, FLASH, or disc drive, and executed by processor(s) 2802 or DSP 2804. The gateway 2800 can also comprise software elements (e.g., located within the memory 2812), including, for example, an operating system, device drivers, executable libraries, and/or other code, such as one or more application programs, which may comprise computer programs implementing the functions provided by various embodiments, and/or may be designed to implement methods and/or configure systems, as described herein. Merely by way of example, one or more procedures described with respect to the processes discussed above, for example as described with respect to FIG. 14, may be implemented as code and/or instructions executable by a computer (and/or a processor within a computer); in an aspect, then, such code and/or instructions can be used to configure and/or adapt a general purpose computer (or other device) to perform one or more operations in accordance with the described methods. Such functions or code may include code to perform the steps described above with respect to FIG. 14. The memory 2812 may be a non-transitory machine-readable storage medium, processor-readable memory, and/or a computer-readable memory that stores the one or more computer-program products configured to cause the processor(s) 2802 to perform the functions described. In other embodiments, one or more of the functions described may be performed in hardware.

A set of these instructions and/or code might be stored on a non-transitory machine-readable storage medium, such as the memory 2812. In some cases, the storage medium might be incorporated within a computer system. In other embodiments, the storage medium might be separate from a computer system (e.g., a removable medium, such as a compact disc), and/or provided in an installation package, such that the storage medium can be used to program, configure and/or adapt a general purpose computer with the instructions/code stored thereon. These instructions of one or more computer-program products might take the form of executable code, which is executable by the gateway 2800 and/or might take the form of source and/or installable code, which, upon compilation and/or installation on the gateway 2800 (e.g., using any of a variety of generally available compilers, installation programs, compression/decompression utilities, etc.) then takes the form of executable code.

Substantial variations may be made in accordance with specific requirements. For example, customized hardware might also be used, and/or particular elements might be implemented in hardware, software (including portable software, such as applets, etc.), or both. Further, connection to other access or computing devices such as network input/output devices may be employed.

In the foregoing specification, aspects of the invention are described with reference to specific embodiments thereof, but those skilled in the art will recognize that the invention is not limited thereto. Various features and aspects of the above-described invention may be used individually or jointly. Further, embodiments can be utilized in any number of environments and applications beyond those described herein without departing from the broader spirit and scope of the specification. The specification and drawings are, accordingly, to be regarded as illustrative rather than restrictive.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Where components are described as being configured to perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

While illustrative embodiments of the application have been described in detail herein, it is to be understood that the inventive concepts may be otherwise variously embodied and employed, and that the appended claims are intended to be construed to include such variations, except as limited by the prior art.

What is claimed is:

1. A computer-implemented method, comprising:
    determining, by a network device on a network, two or more communication paths including one or more additional network devices on the network, wherein the network includes a wireless network;
    generating, by the network device, current performance metrics, wherein current performance metrics include device metrics associated with the network device and link metrics associated with one or more communication links between the network device and the one or more additional network devices on the network, wherein the device metrics indicate a current performance of a functionality of the network device;
    generating, by the network device, metrics priority rankings for the generated current performance metrics, wherein the metrics priority rankings assign rankings to each performance metric of the current performance metrics based on a priority of each performance metric to the network device;
    receiving, by the network device, additional device metrics associated with the one or more additional network devices on the network, wherein the additional device metrics indicate current performance of the one or more additional network devices, and wherein the additional device metrics were generated by the one or more additional network devices;
    comparing performances of the two or more communication paths over a period of time using the device metrics, the metrics priority rankings, and the additional device metrics;
    determining a first chosen communication path of the two or more communication paths using the comparison of the performances of the two or more communications paths;
    transmitting a communication using the first chosen communication path;
    receiving updated additional device metrics associated with the one or more additional network devices on the network;
    generating updated device metrics and updated metrics priority rankings associated with the network device;
    determining a new chosen communication path using the updated device metrics, the updated metrics priority rankings, and the updated additional device metrics; and
    transmitting a communication using the new chosen communication path.

2. The method of claim 1, wherein the device metrics are continually stored and updated.

3. The method of claim 1, further comprising:
    generating a beacon packet including data associated with the network; and
    embedding the device metrics associated with the network device within the beacon packet.

4. The method of claim 1, wherein transmitting the communication includes transmitting a beacon packet.

5. The method of claim 1, further comprising:
    generating a beacon packet including data associated with the network; and
    embedding the additional device metrics associated with the one or more additional network devices on the network within the beacon packet.

6. The method of claim 1, further comprising:
    generating, by the network device, second additional device metrics associated with the one or more additional network devices on the network using communications between the network device and the one or more additional network devices on the network; and
    determining the first chosen communication path of the two or more communication paths using the second additional device metrics.

7. The method of claim 1, further comprising:
    storing historical performance metrics associated with the network device and the additional network devices,
    wherein determining the first chosen communication path includes using the historical performance metrics.

8. The method of claim 1, further comprising:
    requesting a reshaping of network devices on the network based on the received updated additional device metrics.

9. The method of claim 1, further comprising:
    transmitting the device metrics associated with the network device generated by the network device to the additional network devices.

10. A network device, comprising:
    one or more processors; and
    a memory having instructions stored thereon, which when executed by the one or more processors, cause the computing device to perform operations including:
    determining, by the network device on a network, two or more communication paths including one or more additional network devices on the network, wherein the network includes a wireless network;
    generating, by the network device, current performance metrics, wherein current performance metrics include device metrics associated with the network device and link metrics associated with one or more communication links between the network device and the one or more additional network devices on the network, wherein the device metrics indicate a current performance of a functionality of the network device;

generating, by the network device, metrics priority rankings for the generated current performance metrics, wherein the metrics priority rankings assign rankings to each performance metric of the current performance metrics based on a priority of each performance metric to the network device;

receiving, by the network device, additional device metrics associated with the one or more additional network devices on the network, wherein the additional device metrics indicate current performance of the one or more additional network devices, and wherein the additional device metrics were generated by the one or more additional network devices;

comparing performances of the two or more communication paths over a period of time using the device metrics, the metrics priority rankings, and the additional device metrics;

determining a first chosen communication path of the two or more communication paths using the comparison of the performances of the two or more communications paths;

transmitting a communication using the first chosen communication path;

receiving updated additional device metrics associated with the one or more additional network devices on the network;

generating updated device metrics and updated metrics priority rankings associated with the network device;

determining a new chosen communication path using the updated device metrics, the updated metrics priority rankings, and the updated additional device metrics; and transmitting a communication using the new chosen communication path.

11. The network device of claim 10, wherein the device metrics are continually stored and updated.

12. The network device of claim 10, further comprising instructions, which when executed by the one or more processors, cause the computing device to perform operations including:
generating a beacon packet including data associated with the network; and
embedding the device metrics associated with the network device within the beacon packet.

13. The network device of claim 10, wherein transmitting the communication includes transmitting a beacon packet.

14. The network device of claim 10, further comprising instructions, which when executed by the one or more processors, cause the computing device to perform operations including:
generating a beacon packet including data associated with the network; and
embedding the additional device metrics associated with the one or more additional network devices on the network within the beacon packet.

15. The network device of claim 10, further comprising instructions, which when executed by the one or more processors, cause the computing device to perform operations including:
generating, by the network device, second additional device metrics associated with the one or more additional network devices on the network using communications between the network device and the one or more additional network devices on the network; and
determining the first chosen communication path of the two or more communication paths using the second additional device metrics.

16. The network device of claim 10, further comprising instructions, which when executed by the one or more processors, cause the computing device to perform operations including:
storing historical performance metrics associated with the network device and the additional network devices,
wherein determining the first chosen communication path includes using the historical performance metrics.

17. The network device of claim 10, further comprising instructions, which when executed by the one or more processors, cause the computing device to perform operations including:
requesting a reshaping of network devices on the network based on the received updated additional device metrics.

18. The network device of claim 10, further comprising instructions, which when executed by the one or more processors, cause the computing device to perform operations including:
transmitting the device metrics associated with the network device generated by the network device to the additional network devices.

19. A non-transitory computer-readable storage medium having instructions stored thereon, which when executed by a computing device, cause the computing device to:
determine, by a network device on a network, two or more communication paths including one or more additional network devices on the network, wherein the network includes a wireless network;
generate, by the network device, current performance metrics, wherein current performance metrics include device metrics associated with the network device and link metrics associated with one or more communication links between the network device and the one or more additional network devices on the network, wherein the device metrics indicate a current performance of a functionality of the network device;
generate, by the network device, metrics priority rankings for the generated current performance metrics, wherein the metrics priority rankings assign rankings to each performance metric of the current performance metrics based on a priority of each performance metric to the network device;
receive, by the network device, additional device metrics associated with the one or more additional network devices on the network, wherein the additional device metrics indicate current performance of the one or more additional network devices, and wherein the additional device metrics were generated by the one or more additional network devices;
compare performances of the two or more communication paths over a period of time using the device metrics, the metrics priority rankings, and the additional device metrics;
determine a first chosen communication path of the two or more communication paths using the comparison of the performances of the two or more communications paths;
transmit a communication using the first chosen communication path;

receive updated additional device metrics associated with the one or more additional network devices on the network;

generate updated device metrics and updated metrics priority rankings associated with the network device;

determine a new chosen communication path using the updated device metrics, the updated metrics priority rankings, and the updated additional device metrics; and transmit a communication using the new chosen communication path.

20. The non-transitory computer-readable storage medium of claim 19, wherein the device metrics are continually stored and updated.

21. The non-transitory computer-readable storage medium of claim 19, further comprising instructions configured to cause the computing device to:

generate a beacon packet including data associated with the network; and embed the device metrics associated with the network device within the beacon packet.

22. The non-transitory computer-readable storage medium of claim 19, wherein transmitting the communication includes transmitting a beacon packet.

23. The non-transitory computer-readable storage medium of claim 19, further comprising instructions configured to cause the computing device to:

generate a beacon packet including data associated with the network; and embed the additional device metrics associated with the one or more additional network devices on the network within the beacon packet.

24. The non-transitory computer-readable storage medium of claim 19, further comprising instructions configured to cause the computing device to:

generate, by the network device, second additional device metrics associated with the one or more additional network devices on the network using communications between the network device and the one or more additional network devices on the network; and determine the first chosen communication path of the two or more communication paths using the second additional device metrics.

25. The non-transitory computer-readable storage medium of claim 19, further comprising instructions configured to cause the computing device to:

store historical performance metrics associated with the network device and the additional network devices, wherein determining the first chosen communication path includes using the historical performance metrics.

26. The non-transitory computer-readable storage medium of claim 19, further comprising instructions configured to cause the computing device to:

request a reshaping of network devices on the network based on the received updated additional device metrics.

27. The non-transitory computer-readable storage medium of claim 19, further comprising instructions configured to cause the computing device to:

transmit the device metrics associated with the network device generated by the network device to the additional network devices.

* * * * *